US012780428B2

(12) United States Patent

Carle et al.

(10) Patent No.: US 12,780,428 B2

(45) Date of Patent: Nov. 3, 2026

(54) AIRCRAFT WITH AN UNDUCTED FAN PROPULSOR

(71) Applicant: General Electric Company, Evendale, OH (US)

(72) Inventors: Sara Elizabeth Carle, Columbus, OH (US); Daniel L. Tweedt, West Chester, OH (US); Syed Arif Khalid, West Chester, OH (US); Andrew Breeze-Stringfellow, Montgomery, OH (US); William Bowden, Cleves, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 19/386,976

(22) Filed: Nov. 12, 2025

(65) Prior Publication Data

US 2026/0125158 A1 May 7, 2026

Related U.S. Application Data

(63) Continuation-in-part of application No. PCT/US2024/040754, filed on Aug. 2, 2024, which is (Continued)

(51) Int. Cl.

*B64D 27/18* (2006.01)

*F02K 3/02* (2006.01)

(52) U.S. Cl.

CPC ................ *B64D 27/18* (2013.01); *F02K 3/02* (2013.01); *F05D 2220/323* (2013.01); *F05D 2260/964* (2013.01)

(58) Field of Classification Search

CPC ....... B64D 27/12; B64C 11/305; B64C 11/48; F01D 5/022

See application file for complete search history.

(56) References Cited

U.S. PATENT DOCUMENTS

| | | | |
|---|---|---|---|
| 3,981,466 | A | 9/1976 | Shah |
| 5,079,916 | A | 1/1992 | Johnson |

(Continued)

FOREIGN PATENT DOCUMENTS

| | | |
|---|---|---|
| CN | 108603442 | 9/2018 |
| EP | 2615275 | 7/2013 |

(Continued)

OTHER PUBLICATIONS

Allam, Effect of Ambient Gradients on Sound Transmission in Narrow Permeable Rectangular Pipes with Application to Heat Exchangers, Advances in Powertrains and Automotives, vol. 1, No. 1, pp. 24-33, 2015.

(Continued)

*Primary Examiner* — Joshua J Michener

*Assistant Examiner* — Cindi M Curry

(74) *Attorney, Agent, or Firm* — Fitch, Even, Tabin & Flannery LLP

(57) ABSTRACT

The present disclosure is generally related to aircraft having one or more unducted fan propulsors at locations within specific regions relative to an airfoil, such as a wing or horizontal stabilizer. More specifically, the specific regions are located where there is a relatively higher pressure air flow beneath the wings or above a horizontal stabilizer. That higher pressure air flow can be utilized to provide increased thrust from the unducted fan propulsor.

20 Claims, 29 Drawing Sheets

Related U.S. Application Data a continuation-in-part of application No. 18/652,052, filed on May 1, 2024, now Pat. No. 12,384,522, which is a continuation-in-part of application No. 18/230,609, filed on Aug. 4, 2023, now Pat. No. 12,365,471.

(56) References Cited

U.S. PATENT DOCUMENTS

| | | | | |
|---|---|---|---|---|
| 5,135,185 | A | 8/1992 | Adamson | |
| 5,136,185 | A | 8/1992 | Fleming | |
| 5,386,689 | A | 2/1995 | Bozich | |
| 7,607,308 | B2 | 10/2009 | Kraft | |
| 8,702,378 | B2 | 4/2014 | Foster | |
| 8,714,475 | B2 | 5/2014 | Gall | |
| 8,844,264 | B2 | 9/2014 | Khalid | |
| 9,242,721 | B2 | 1/2016 | Neuteboom | |
| 9,410,482 | B2 | 8/2016 | Krautheim | |
| 9,567,090 | B2 | 2/2017 | Gallet | |
| 9,677,501 | B2 | 6/2017 | Pierluissi | |
| 9,759,160 | B2 | 9/2017 | Sankrithi | |
| 9,845,768 | B2 | 12/2017 | Pesyna | |
| 10,036,329 | B2 | 7/2018 | Suciu | |
| 10,040,559 | B2 | 8/2018 | Hoisington | |
| 10,227,950 | B1 | 3/2019 | Dyson, Jr. | |
| 10,442,541 | B2 | 10/2019 | Miller | |
| 10,507,934 | B1 | 12/2019 | Dyson, Jr. | |
| 10,544,737 | B2 | 1/2020 | Bowden | |
| 10,669,881 | B2 | 6/2020 | Breeze-Stringfellow | |
| 10,677,166 | B2 | 6/2020 | Pesyna | |
| 10,907,495 | B2 | 2/2021 | Breeze-Stringfellow | |
| 11,136,109 | B2 | 10/2021 | Wood | |
| 11,262,144 | B2 * | 3/2022 | Breeze-Stringfellow | F02K 3/06 |
| 11,378,009 | B2 | 7/2022 | Roberge | |
| 11,492,918 | B1 | 11/2022 | Ostdiek | |
| 11,614,037 | B2 | 3/2023 | Rambo | |
| 11,927,134 | B1 | 3/2024 | Schimmels | |
| 12,000,344 | B2 | 6/2024 | Levisse | |
| 12,280,883 | B2 * | 4/2025 | Bowden | B64D 27/402 |
| 12,305,579 | B2 | 5/2025 | Taillant | |
| 12,313,081 | B2 | 5/2025 | Frantz | |
| 12,320,305 | B2 | 6/2025 | Martinez Luque | |
| 12,359,588 | B1 * | 7/2025 | Khalid | F01D 21/003 |
| 12,365,446 | B2 | 7/2025 | Carle | |
| 12,365,471 | B2 | 7/2025 | Carle | |
| 12,378,933 | B2 | 8/2025 | Fefermann | |
| 12,384,522 | B2 | 8/2025 | Carle | |
| 12,448,139 | B2 * | 10/2025 | Bowden | B64D 29/02 |
| 2010/0155016 | A1 | 6/2010 | Wood | |
| 2012/0119023 | A1 | 5/2012 | Moore | |
| 2012/0216506 | A1 | 8/2012 | Eleftheriou | |
| 2016/0017810 | A1 | 1/2016 | Lord | |
| 2016/0146025 | A1 | 5/2016 | Miller | |
| 2016/0312702 | A1 | 10/2016 | Thomas | |
| 2017/0284303 | A1 | 10/2017 | Johnson | |
| 2018/0230911 | A1 | 8/2018 | Pastouchenko | |
| 2018/0231027 | A1 | 8/2018 | Pastouchenko | |
| 2018/0362170 | A1 * | 12/2018 | Stuart | B64D 27/12 |
| 2019/0003390 | A1 | 1/2019 | Ramos | |
| 2019/0040795 | A1 | 2/2019 | Regnard | |
| 2019/0128189 | A1 | 5/2019 | Rambo | |
| 2019/0185170 | A1 | 6/2019 | Schelfaut | |
| 2020/0122843 | A1 | 4/2020 | Porte | |
| 2023/0021836 | A1 | 1/2023 | Riddle | |
| 2023/0043809 | A1 | 2/2023 | Schimmels | |
| 2024/0410319 | A1 | 12/2024 | Becoulet | |
| 2025/0018895 | A1 | 1/2025 | Howell | |
| 2025/0052165 | A1 | 2/2025 | Becoulet | |
| 2025/0075636 | A1 | 3/2025 | Frantz | |
| 2025/0101930 | A1 | 3/2025 | Auriol | |
| 2025/0116203 | A1 | 4/2025 | Belmonte | |
| 2025/0129724 | A1 | 4/2025 | Millier | |
| 2025/0137407 | A1 | 5/2025 | Becoulet | |
| 2025/0188951 | A1 | 6/2025 | Lebeault | |
| 2025/0197014 | A1 | 6/2025 | Gea Aguilera | |
| 2026/0008550 | A1 | 1/2026 | Carle | |
| 2026/0015090 | A1 | 1/2026 | Carle | |

FOREIGN PATENT DOCUMENTS

| | | | |
|---|---|---|---|
| EP | 3130539 | A1 | 2/2017 |
| EP | 3735518 | A1 | 11/2020 |
| FR | 3129428 | A1 | 5/2023 |
| FR | 3129436 | A1 | 5/2023 |
| FR | 3129690 | A1 | 6/2023 |
| FR | 3129970 | A1 | 6/2023 |
| FR | 3129972 | A1 | 6/2023 |
| FR | 3130313 | A1 | 6/2023 |
| FR | 3130747 | A1 | 6/2023 |
| FR | 3130874 | A1 | 6/2023 |
| FR | 3130875 | A1 | 6/2023 |
| FR | 3130895 | A1 | 6/2023 |
| FR | 3130897 | A1 | 6/2023 |
| FR | 3132729 | A1 | 8/2023 |

OTHER PUBLICATIONS

Munjal, Acoustics of Ducts and Mufflers with Application to Exhaust and Ventilation System Design, ISBN 0471847380, Wiley, 1987, pp. 58-60. Obtained from Wikipedia Transmission Loss (Duct Acoustics) acknowledged in References.

Wikipedia, Thermal Conductivity, 2019, 20 pages.

"Could an open fan engine cut carbon emissions for more sustainable aviation?"; https:// www.airbus.com/en/newsroom/stories/2022-07-could-an-open-fan-engine-cut-carbon-emissions-for- more-sustainable; Jul. 19, 2022; 3 pgs.

Antonov An-70 - Price, Specs, Photo Gallery, History - Aero Corner; https://aerocorner.com/aircraft/ antonov-an-70/#lg=1&slide=5; Site was known as early as Dec. 2021; 5 pgs.

Attariwala, Joetey; "Coming to a Theatre near You"; published Feb./Mar. 2016 Issue (Oct. 26, 2017); https://www.armadainternational.com/2017/10/airbus-a400m-strategic-turboprop-freighter-programme/; 9 pgs.

* cited by examiner

| L | FLOW RATE | POROSITY | UA | TL |
|---|---|---|---|---|
| 3.00 | 30 | 0.23 | 14637 | 3.00 |
| 3.00 | 30 | 0.24 | 14583 | 2.76 |
| 3.00 | 30 | 0.25 | 14530 | 2.54 |
| 3.00 | 30 | 0.32 | 11862 | 1.59 |
| 3.00 | 30 | 0.33 | 11813 | 1.49 |
| 3.00 | 30 | 0.34 | 11756 | 1.40 |
| 6.00 | 30 | 0.23 | 24476 | 4.99 |
| 6.00 | 30 | 0.24 | 24400 | 4.65 |
| 6.00 | 30 | 0.32 | 20226 | 2.92 |
| 6.00 | 30 | 0.33 | 20154 | 2.75 |
| 6.00 | 30 | 0.42 | 20699 | 1.73 |
| 6.00 | 30 | 0.43 | 20552 | 1.59 |
| 6.00 | 30 | 0.49 | 13611 | 1.11 |
| 6.00 | 30 | 0.50 | 13526 | 1.06 |
| 6.00 | 30 | 0.51 | 13419 | 1.02 |
| 9.00 | 30 | 0.23 | 32677 | 3.70 |
| 9.00 | 30 | 0.24 | 32586 | 3.41 |
| 9.00 | 30 | 0.32 | 27292 | 2.04 |
| 9.00 | 30 | 0.33 | 27204 | 1.9 |
| 9.00 | 30 | 0.42 | 27543 | 1.1 |
| 9.00 | 30 | 0.43 | 27367 | 1.0 |

| L | FLOW RATE | POROSITY | UA | TL |
|---|---|---|---|---|
| 3.00 | 100 | 0.23 | 18524 | 3.00 |
| 3.00 | 100 | 0.24 | 18477 | 2.76 |
| 3.00 | 100 | 0.25 | 18428 | 2.54 |
| 3.00 | 100 | 0.32 | 15773 | 1.59 |
| 3.00 | 100 | 0.33 | 15721 | 1.49 |
| 3.00 | 100 | 0.34 | 15659 | 1.40 |
| 6.00 | 100 | 0.23 | 29917 | 4.99 |
| 6.00 | 100 | 0.24 | 29854 | 4.65 |
| 6.00 | 100 | 0.32 | 25802 | 2.92 |
| 6.00 | 100 | 0.33 | 25732 | 2.75 |
| 6.00 | 100 | 0.42 | 24910 | 1.73 |
| 6.00 | 100 | 0.43 | 24776 | 1.59 |
| 6.00 | 100 | 0.49 | 18694 | 1.11 |
| 6.00 | 100 | 0.50 | 18586 | 1.06 |
| 6.00 | 100 | 0.51 | 18446 | 1.02 |
| 9.00 | 100 | 0.23 | 39184 | 3.70 |
| 9.00 | 100 | 0.24 | 39112 | 3.41 |
| 9.00 | 100 | 0.32 | 34066 | 2.04 |
| 9.00 | 100 | 0.33 | 33983 | 1.91 |
| 9.00 | 100 | 0.42 | 32559 | 1.16 |
| 9.00 | 100 | 0.43 | 32404 | 1.06 |

| L | FLOW RATE | POROSITY | UA | TL |
|---|---|---|---|---|
| 3.00 | 250 | 0.23 | 20884 | 3.00 |
| 3.00 | 250 | 0.24 | 20844 | 2.76 |
| 3.00 | 250 | 0.25 | 20799 | 2.54 |
| 3.00 | 250 | 0.32 | 18288 | 1.59 |
| 3.00 | 250 | 0.33 | 18237 | 1.49 |
| 3.00 | 250 | 0.34 | 18174 | 1.40 |
| 6.00 | 250 | 0.23 | 33073 | 4.99 |
| 6.00 | 250 | 0.25 | 32963 | 4.34 |
| 6.00 | 250 | 0.32 | 29237 | 2.92 |
| 6.00 | 250 | 0.33 | 29170 | 2.75 |
| 6.00 | 250 | 0.42 | 27341 | 1.73 |
| 6.00 | 250 | 0.43 | 27218 | 1.59 |
| 6.00 | 250 | 0.49 | 22160 | 1.11 |
| 6.00 | 250 | 0.50 | 22042 | 1.06 |
| 6.00 | 250 | 0.51 | 21888 | 1.02 |
| 9.00 | 250 | 0.23 | 42808 | 3.70 |
| 9.00 | 250 | 0.24 | 42749 | 3.41 |
| 9.00 | 250 | 0.32 | 38076 | 2.04 |
| 9.00 | 250 | 0.33 | 38000 | 1.91 |
| 9.00 | 250 | 0.42 | 35361 | 1.16 |
| 9.00 | 250 | 0.43 | 35223 | 1.06 |

AIRCRAFT WITH AN UNDUCTED FAN PROPULSOR

CROSS-REFERENCE TO RELATED APPLICATIONS

This application is a continuation-in-part of International Appl. No. PCT/US2024/040754, filed Aug. 2, 2024, which claims priority to U.S. patent application Ser. No. 18/230,609, filed on Aug. 4, 2023, and Ser. No. 18/652,052, filed May 1, 2024, the latter of which is a continuation-in-part of the former, the disclosures of which are hereby incorporated by reference in their entireties.

FIELD

The present disclosure relates generally to an aircraft with a fan propulsor.

BACKGROUND

Winged aircraft have undermounted propulsors in the form of a turboprop engine. The addition of a propulsor to a wing can lead to installation penalties, including increased drag. As the size of the undermounted propulsor increases, installation penalties can also increase, such as increased weight.

BRIEF DESCRIPTION OF THE DRAWINGS

A full and enabling disclosure of the aspects of the present description, including the best mode thereof, directed to one of ordinary skill in the art, is set forth in the specification, which refers to the appended figures, in which.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required.

DETAILED DESCRIPTION

Aspects and advantages of the present disclosure will be set forth in part in the following description or may be learned through practice of the present disclosure.

The word "or" when used herein shall be interpreted as having a disjunctive construction rather than a conjunctive construction unless otherwise specifically indicated.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The terms "forward" and "aft" refer to relative positions within an unducted fan propulsor or vehicle, and refer to the normal operational attitude of the unducted fan propulsor or vehicle. For example, with regard to an unducted fan propulsor, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "leading edge" refers to components and/or surfaces which are oriented predominately upstream relative to the fluid flow of the system, and the term "trailing edge" refers to components and/or surfaces which are oriented predominately downstream relative to the fluid flow of the system.

"Airfoil section" and "effective quarter chord point (QC)" are defined as follows.

Figure 6A:
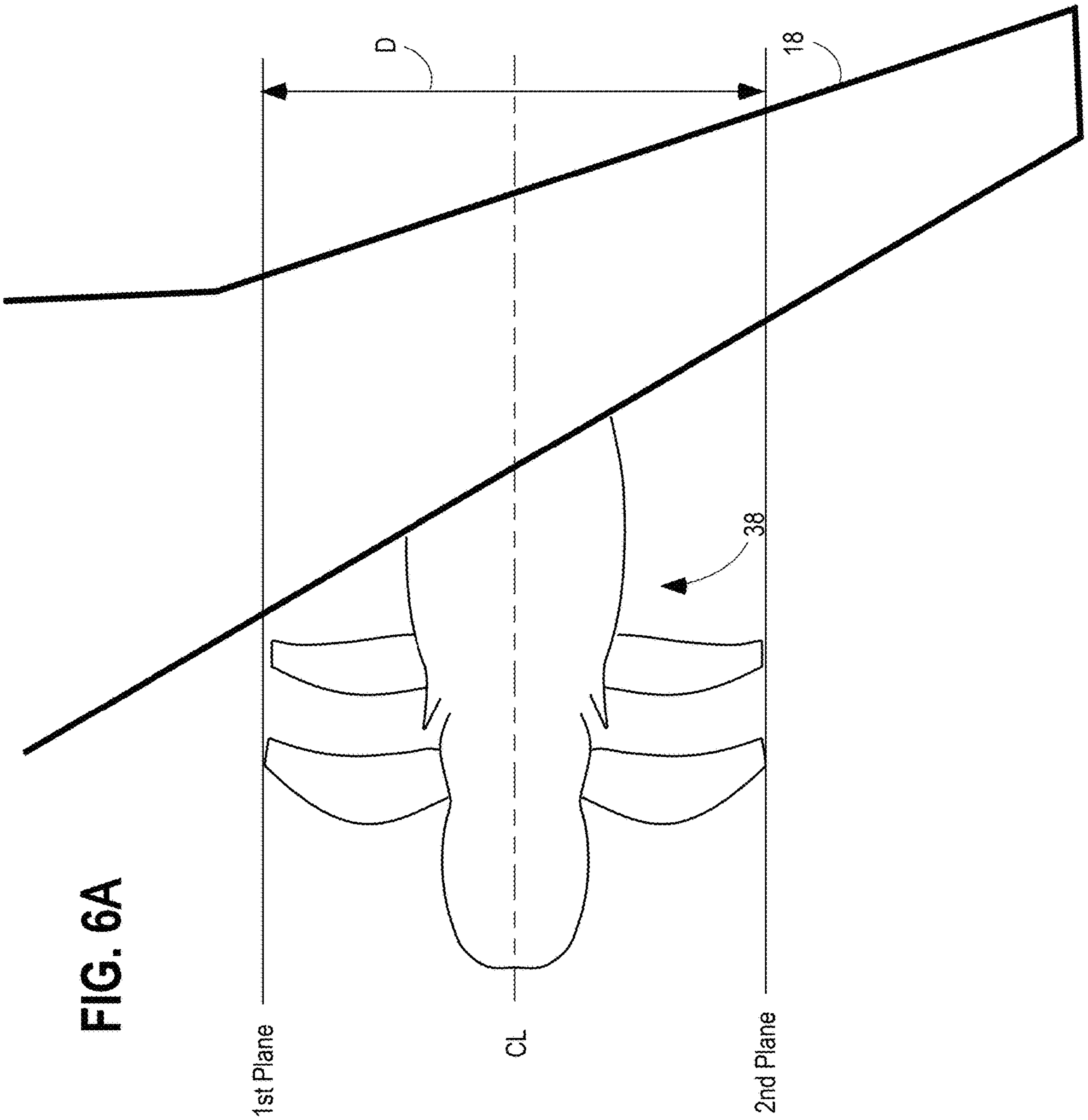
FIG. 6A comprises a top plan view of the propulsor of FIG. 4 and inboard and outboard locations of the wing relative to an unducted fan propulsor centerline, with the inboard and outboard locations in FIG. 6A used to determine a chord length (C) of the airfoil section in FIG. 4.
Figure 6B:
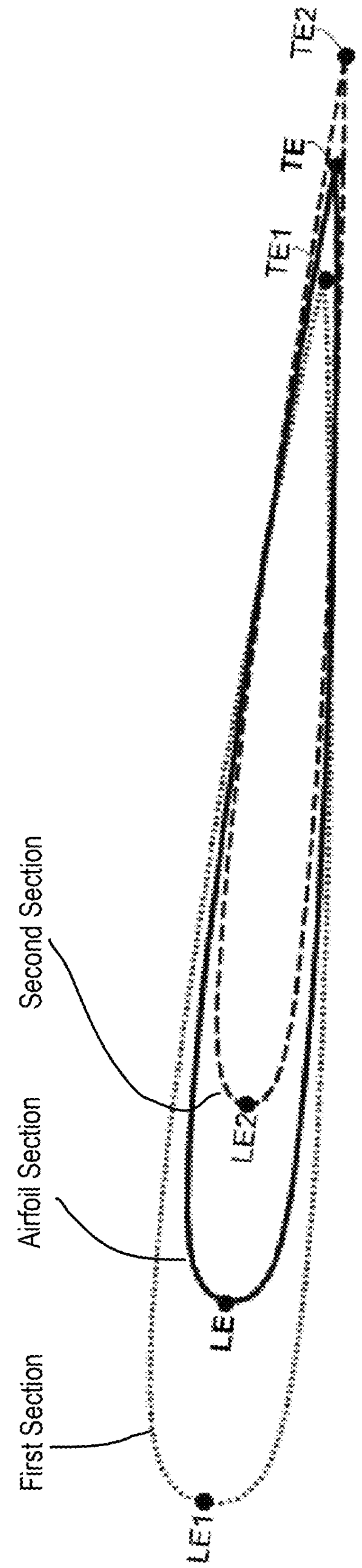
FIG. 6B comprises a schematic side elevation view of a first section and a second section of the aircraft wing, which sections are used to determine an effective quarter chord point (QC) of the airfoil section in FIG. 4.

"Airfoil section" is defined as the average of a first offset plane section and a second offset plane section of an airfoil (e.g., an airfoil associated with a horizontal stabilizer or wing of an aircraft), where the first offset plane section is the section of the airfoil taken at a first plane and the second offset plane section is the section of the airfoil taken at a second plane, the first and second planes each being offset in a direction perpendicular to, and equidistant from a central plane by a distance of ½ of a fan diameter (D) of rotating blades of a propulsor mounted to the portion of the aircraft body associated with the airfoil section (wing or horizontal stabilizer). The first plane is inboard of the central plane (towards the fuselage) and the second plane is outboard of the central plane. When the aircraft is on the ground, both the gravity vector and axis of rotation of the rotating blades lie in the central plane. The intersection of the first offset plane with the airfoil defines a first section having a first section leading edge (LE1) and a first section trailing edge (TE1), with the LE1 at the forward-most point of the first section and the TE1 at the aft-most point of the first section. The intersection of the second offset plane with the airfoil defines a second section having a second section leading edge (LE2) and a second section trailing edge (TE2), with the LE2 at the forward-most point of the section and the TE2 at the aft-most point of the second section. Averaging the coordinates of LE1 and LE2 yields a representative LE location for the airfoil section. Averaging the coordinates of TE1 and TE2 yields a representative TE location for the airfoil section. The LE and TE points obtained this way are indicated in FIGS. 6 and 6B. An "Airfoil Section" defined herein has its leading and trailing edges TE, LE determined in this manner. "Effective Quarter-chord point" ("QC") is defined as ¼ of the distance from the leading edge LE of the airfoil section determined in the foregoing manner, measured along the chord of this airfoil section. QC is dependent on the fan diameter (D) because the airfoil section LE and TE values change if D for the unducted fan propulsor changes.

"Cruise Speed" refers to aircraft speed and applies to a vehicle with a cruising altitude up to approximately 65,000 ft. In certain embodiments, cruise altitude is between approximately 28,000 ft. and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

It is understood that the plurality blades, whether forward or rearward, may have a variation of root forward-most points and root rearward-most points. This can be due to both installed position as well as orientation in the case of variable pitch blades. For purposes of defining the distances TRL, RTL, and VTL it is understood that a rotating blade or rotating array of blades are orientated such that the respective leading edges of the blades are in their most forward position, e.g., a feathered position. The respective trailing edge position is also obtained when the leading edge is in the most forward position. For purposes of defining the distances TRL, RTL, and VTL it is understood that the forward or leading edge or rearward or trailing edge of a stationary blade (or vane) or array of stationary blades (or vanes) is the most forward or leading edge position across the array of vanes or the most rearward or trailing edge position across the array of vanes.

"Blade" can refer to a stationary or rotating blade. "Stationary blade(s)" has the same meaning as "vane(s)".

Figure 3:
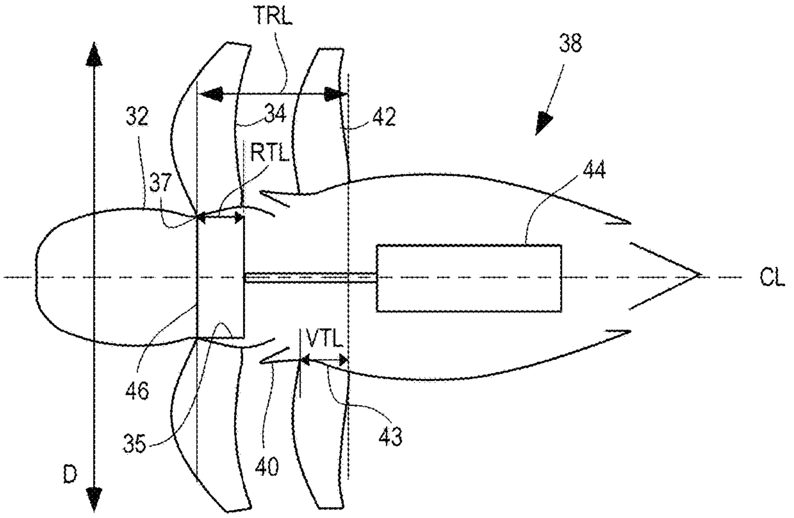
FIG. 3 comprises an elevational cross-sectional view of an exemplary unducted fan propulsor having a plurality of blades arranged in a forward array and a rearward array.

"Unducted fan propulsor" as used herein means an aircraft engine characterized by an array of rotating fan blades and static (or non-rotating), outlet guide vanes (OGV) aft of the array of rotating fan blades, or an array of rotating fan blades and static, unducted inlet guide vanes (IGV) forward of the rotating fan blades. In either case, neither the fan blades nor the IGV or OGV is surrounded by a duct or fan nacelle. FIG. 3 depicts an unducted fan propulsor. Additionally, the term unducted fan propulsor means an unducted, fan driven aircraft engine capable of providing thrust to an aircraft to enable cruise flight speeds between 0.7 Mach and 0.90 Mach, or 0.75 to 0.85 Mach.

"Aircraft" means a vehicle having a wing (and/or horizontal stabilizer), an airfoil defined by the wing (and/or horizontal stabilizer), and one or two unducted fan propulsors mounted to the wing, and the aircraft is operable at cruise flight speeds between 0.7 Mach and 0.90 Mach, or 0.75 to 0.85 Mach.

"Fuselage centerplane" ("FCP") is defined as a plane that is located equidistant from the wingtips, intersecting the fuselage, and containing the gravity vector when the aircraft is on the ground.

Approximating language, as used herein throughout the specification and claims, is applied to modify any quantitative representation that could permissibly vary without resulting in a change in the basic function to which it is related. Accordingly, a value modified by a term or terms such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, the term "proximate" refers to being closer to one side or end than an opposite side or end.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The term "fluid" may be a gas or a liquid. The term "fluid communication" means that a fluid is capable of making the connection between the areas specified.

"Substantially annular" with respect to a duct or flowpath, such as a duct or flowpath with a heat exchanger positioned therein, refers to a duct or flowpath that is fully annular (i.e., extends continuously and uninterrupted in a circumferential direction with the exception of only the heat exchanger), or partially annular with at least 50% volume percent of void with the exception of the heat exchanger (such as at least 60%, such as at least 70%, such as at least 80%, such as at least 90% volume percent of void with the exception of the heat exchanger). For example, in certain embodiments, "substantially annular" describes a duct or flowpath that includes struts or other similar structure extending therethrough to occupy 30% of the annular space (with 70% of the annular space being void in the absence of the heat exchanger) resulting in a partially annular duct.

"Transmission Loss" or "TL" as used herein means a measurement of a reduction in sound level as sound from a sound source passes through an acoustic barrier. TL is expressed in units of decibels (dB) and indicates a reduction in sound intensity (at given frequencies) as sound-producing pressure waves encounter structure, or an acoustic barrier, such as a heat exchanger located within an annular flow path.

"Effective Transmission Loss" or "ETL" for a component of an unducted fan propulsor refers to an amount of TL that is expected for the component of the unducted fan propulsor during specified operating conditions. ETL is defined in more detail below. The ETL and TL for embodiments disclosed are more specifically expressed as an average ETL or TL, respectively, over a frequency bandwidth, such as between 300 Hertz ("Hz") and 12,500 Hz, or if the text indicates, as ETL or TL, respectively, at a particular frequency. According to the disclosure, a range for ETL and TL is at least 1 dB and less than 5 dB.

"UA" as used herein means the product of an overall heat transfer coefficient (U) of the portion of a heat exchanger exposed to a fluid (e.g., air) passing through a flowpath in which the heat exchanger is positioned and the total surface area (A) of the heat exchanger positioned within the flowpath. The units may be expressed in British thermal units per hour per degrees Fahrenheit (Btu/(hr-° F.)). The ability of the portion of the heat exchanger to reject or accept heat to or from the fluid relates to the heat transfer characteristics of the material forming the portion exposed to the fluid (e.g., aluminum, steel, metal alloys, etc.), or more particularly to an overall heat transfer coefficient (CTE) of the portion of the heat exchanger exposed to the fluid, and the surface area of this portion. The parameter "UA" represents the effect of both the CTE and the surface area exposed to the fluid.

"Porosity" as used herein refers to a void fraction of the heat exchanger positioned within a flowpath. For example, the heat exchanger may define a flow area at a location and the flowpath may define a flow area at the same location (i.e., a flow area without the heat exchanger). Porosity of the heat exchanger is the ratio of the flow area of the heat exchanger to the flow area of the flowpath at the location.

"Blade passing frequency" of a stage of rotor blades, as used herein, means the product of a rotation rate (in revolutions per minute or RPM) and the number of rotor blades of the stage of rotor blades. As will be discussed in more detail below, when described relative to a heat exchanger of the present disclosure in a substantially annular duct or flowpath, the blade passing frequency refers to the blade passing frequency of an upstream rotor (located immediately upstream of the heat exchanger) calculated using the number of rotor blades of the rotor located immediately upstream of the heat exchanger. The units for blade passing frequency is hertz (Hz) or kilohertz (kHz), as indicated. For example, with reference to a fan of a turbofan or open rotor engine, the blade passing frequency refers to a product of a rotation rate (in RPM) of the fan rotor and the number of fan blades in the fan. The fan may refer to a fan exterior to a turbomachine (e.g., a fan located within a duct of a turbofan, e.g., in a flowpath of an open rotor engine, e.g., fan assembly 350 of FIG. 12), or internal, such as a fan that is located downstream of an inlet to the turbomachine and upstream of at least one compressor of the turbomachine (e.g., fan 384 of FIG. 12). The rotor, rotation rate and rotor blades can also refer to a stage of a low pressure compressor or low pressure turbine (e.g., LP compressor 222, 326 and LP turbine 230, 334 respectively) when the stage is the respective rotor immediately upstream of the heat exchanger contained within the substantially annular duct.

"Rotor assembly" refers to a plurality of rotating airfoils at a given axial location within the unducted fan propulsor, such as the rotating airfoils within a given stage of an unducted fan propulsor. For example, the term rotor assembly may refer to a primary fan of a fan assembly of a turbofan or open rotor engine (e.g., an upstream-most fan located within a duct of a turbofan engine, e.g., or located within a flowpath of an open rotor engine, e.g., fan assembly 350 of FIG. 12). Additionally or alternatively, the term rotor assembly may refer to the rotating airfoils within a stage of a turbomachine of an unducted fan propulsor, such as the LP turbine rotor blades within a stage of an LP turbine (e.g., LP turbine 334 in FIG. 12).

"Mass flow" or "mass flow rate" as used herein means the rate of mass flow of a fluid through a heat exchanger, mass flow through a duct upstream or downstream of the heat exchanger, or mass flow through a closed area volume. The units are pounds mass per second (lbm/sec.).

"Pressure drop" across an obstacle refers to the change in fluid pressure that occurs when the fluid passes through the obstacle. A pressure drop means the fluid's static pressure immediately upstream of the obstacle minus the fluid's static pressure immediately downstream of the obstacle divided by the fluid's static pressure immediately upstream of the obstacle, and is expressed as a percentage.

The disclosure provides examples of a variety of heat exchangers, examples of which include a "plate fin" heat exchanger, a "tube" heat exchanger, a "counter-flow" heat exchanger, an "onion" style heat exchanger, and "any dedicated channels" for heat exchange.

As used herein, the term "fin-based" heat exchanger refers to a heat exchanger that uses one or more fins extending into a cooling fluid flow or a heating fluid flow to increase a surface area exposed to the cooling or heating fluid flow to increase an efficiency of the heat exchanger. Examples of fin-based heat exchangers include a plate fin heat exchanger and a pin-fin heat exchanger.

A "plate fin" heat exchanger as used herein refers to a heat exchanger having a surface with fins extending therefrom configured to increase a heat transfer between the surface and a fluid passing over the fins. An example of this type of heat exchanger is described below with reference to FIG. 15.

A "pin-fin" heat exchanger as used herein refers to a heat exchanger having a first surface and a second surface. Fins and pins extend from the first surface, the second surface, or both surfaces to increase a heat transfer between the first and/or second surfaces and a fluid passing over the fins and pins.

A "tube" heat exchanger as used herein means a heat exchanger that includes one or more tubes or other conduit extending through a fluid flowpath. Such a heat exchanger may facilitate heat transfer from a fluid through the tube or other conduit and a fluid through the fluid flowpath. An example of this type of heat exchanger is described in reference to FIG. 14.

A "tube-sheet" heat exchanger as used herein means a heat exchanger having a plurality of tubes and a sheet with a plurality of holes through which the plurality of tubes extend.

A "shell-and-tube" heat exchanger refers to a heat exchanger that includes an outer shell housing a large number of tubes. Examples of this type of heat exchanger are described in reference to FIGS. 18 through 20.

A "counter-flow" heat exchanger as used herein means a heat exchanger wherein a direction of a flow of one of the working fluids is opposite a direction of a flow of another of the working fluids.

An "onion" style heat exchangers as used herein means a heat exchanger having a diverging section and a converging section with heat exchange features extending through these sections. An example of this type of heat exchanger is provided in FIGS. 21 through 23 and 30 through 33.

The term "heat transfer section" of a heat exchanger refers to a portion of the heat exchanger having unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned. This term is explained in more detail with reference to the exemplary embodiment of FIG. 21.

The term "any dedicated channel" heat exchangers as used herein means any channel created specifically to transport fluid for the purpose of exchanging thermal energy.

The term "length," as used herein with respect to a heat exchanger, refers to a measurement along a centerline through the heat exchanger from an upstream-most edge of the heat exchanger to a downstream-most edge of the heat exchanger positioned within a fluid flowpath. The centerline is a geometric centerline and takes into account a swirl of the fluid flow through the heat exchanger, if present (e.g., a circumferential swirl in the embodiment of FIG. 21). The term "length" in the context of a heat exchanger generally refers to a combined length of each of the one or more heat transfer sections. In such a manner, the length refers to the average distance a flow stream follows through the heat exchanger. In some embodiments, the heat exchanger may include multiple channels, in which case the centerline is the geometric mean of the plurality of channels.

The term "acoustic length" as used herein with respect to a heat transfer section of a heat exchanger refers to a measurement along a centerline through the heat transfer section of the heat exchanger. The centerline is a geometric centerline and takes into account any swirl of the fluid flow through the heat transfer section of the heat exchanger, if present (e.g., a circumferential swirl in the embodiment of FIG. 21). For a heat exchanger including a single heat transfer section, such as the exemplary heat exchangers depicted in FIGS. 14 through 20, the acoustic length of the heat transfer section is equal to the length of the heat exchanger. For a heat exchanger including a plurality of heat transfer sections, the length of the heat exchanger is equal to a sum of the acoustic lengths of the respective heat transfer sections. In such a manner, the acoustic length of a heat transfer section refers to the average distance a flow stream follows through the heat transfer section of the heat exchanger. In some embodiments, the heat exchanger may include multiple channels through a heat transfer section, in which case, the centerline of the heat transfer section is the geometric mean of the plurality of channels through the heat transfer section.

For example, in embodiments wherein the heat transfer sections of the heat exchanger are symmetrical about a reference line extending from a center of an inlet to a center of an outlet (see, e.g., FIG. 2), the centerlines used to determine the acoustic lengths are each straight lines (assuming no swirl in a circumferential direction). By contrast, in embodiments wherein the heat transfer sections of the heat exchanger are asymmetrical about a reference line extending from a center of an inlet to a center of an outlet (see, e.g., FIG. 33), the centerlines used to determine the acoustic lengths will have a curve, such as an arc, extending through the respective heat transfer sections. In the case where a centerline is an arc, the arc length may be calculated to determine the desired length for tuning to the blade passing frequency, as disclosed herein.

The term "medium power operating condition" refers to an operating condition of an engine for a flight phase that occurs when the aircraft levels after a climb to a set altitude and before it begins to descend (i.e., a cruise operating condition). Additionally, medium power operating condition may refer to a descent operating condition.

The phrase "low power operating condition" refers to an operating condition of an engine at a power level less than a cruise power level during a cruise operating condition. For example, low power operating condition may refer to a flight idle operating condition, a ground idle operating condition, an approach idle operating condition, etc., where the engine is operating at a power level less than about 85% of a rated power of the engine, such as less than about 80% of a rated power of the engine.

The phrase "high power operating condition" refers to an operating condition of an engine at a power level greater than a cruise power level during a cruise operating condition. For example, high power operating condition may refer to a takeoff operating condition, a climb operating condition, etc.

The term "bypass ratio" of a turbofan engine or open rotor engine refers to a ratio bypass airflow to engine airflow, each measured as a mass flowrate. The engine airflow refers to an airflow provided through an upstream-most engine inlet downstream of a primary fan of the turbofan engine or of the open rotor engine (e.g., engine inlet 382 in FIG. 12). The bypass airflow refers to a remainder of an airflow from the primary fan not considered engine airflow.

The terms "first stream" and "second stream" as used herein mean a working gas flowpath of a turbomachine that passes through a core of a turbomachine (high pressure compressor, combustor, and high pressure turbine) and a fan stream or bypass stream, respectively.

A "third stream" as used herein means a non-primary air stream capable of increasing fluid energy to produce a minority of total propulsion system thrust. A pressure ratio of the third stream is higher than that of the primary propulsion stream (e.g., a bypass or propeller driven propulsion stream). The thrust may be produced through a dedicated nozzle or through mixing of an airflow through the third stream with a primary propulsion stream or a core air stream, e.g., into a common nozzle.

In certain exemplary embodiments an operating temperature of the airflow through the third stream may be less than a maximum compressor discharge temperature for the engine, and more specifically may be less than 350 degrees Fahrenheit (such as less than 300 degrees Fahrenheit, such as less than 250 degrees Fahrenheit, such as less than 200 degrees Fahrenheit, and at least as great as an ambient temperature). In certain exemplary embodiments these operating temperatures may facilitate heat transfer to or from the airflow through the third stream and a separate fluid stream. Further, in certain exemplary embodiments, the airflow through the third stream may contribute less than 50% of the total engine thrust (and at least, e.g., 2% of the total engine thrust) at a takeoff condition, or more particularly while operating at a rated takeoff power at sea level, static flight speed, 86 degrees Fahrenheit ambient temperature operating conditions.

Furthermore in certain exemplary embodiments, aspects of the airflow through the third stream (e.g., airstream, mixing, or exhaust properties), and thereby the aforementioned exemplary percent contribution to total thrust, may passively adjust during engine operation or be modified purposefully through use of engine control features (such as fuel flow, electric machine power, variable stators, variable inlet guide vanes, valves, variable exhaust geometry, or fluidic features) to adjust or optimize overall system performance across a broad range of potential operating conditions.

References to "noise", "noise level", or "perceived noise", or variations thereof, are understood to include sound pressure levels (SPL) outside a fuselage, fuselage exterior noise levels, perceived noise levels, effective perceived noise levels (EPNL), instantaneous perceived noise levels (PNL(k)), or tone-corrected perceived noise levels (PNLT(k)), or one or more duration correction factors, tone correction factors, or other applicable factors, as defined by the Federal Aviation Administration (FAA), the European Union Aviation Safety Agency (EASA), the International Civil Aviation Organization (ICAO), Swiss Federal Office of Civil Aviation (FOCA), or committees thereof, or other equivalent regulatory or governing bodies. Where certain ranges of noise levels (e.g., in decibels, or dB) are provided herein, it will be appreciated that one skilled in the art will understand methods for measuring and ascertaining of such levels without ambiguity or undue experimentation. Methods for measuring and ascertaining one or more noise levels as provided herein by one skilled in the art, with reasonable certainty and without undue experimentation, include, but are not limited to, understanding of measurement systems, frames of reference (including, but not limited to, distances, positions, angles, etc.) between the engine and/or aircraft relative to the measurement system or other perceiving body, or atmospheric conditions (including, but not limited to, temperature, humidity, dew point, wind velocity and vector, and points of reference for measurement thereof), as may be defined by the FAA, EASA, ICAO, FOCA, or other regulatory or governing body.

As used herein, the term “community noise” refers to an amount of noise produced by an engine and/or aircraft that is observed on the ground, typically in the community around an airport during a takeoff or landing.

As provided herein, embodiments of the engine included herein define noise levels between 5 decibels (dB) and 10 dB below ICAO’s Annex 16 Volume 1 Chapter 14 noise standards applicable on or after 31 Dec. 2017 for airplanes with a maximum takeoff weight of at least 55 tons. Additionally, or alternatively, embodiments of the engine provided herein may attenuate low frequency noise, such as those that may propagate to the ground while an engine is at cruise altitude, or as may be referred to as en-route noise or community noise.

The inventors were faced with a problem of how to improve thrust delivered to an aircraft by an unducted fan propulsor without increasing the required engine power delivered to the unducted fan of the unducted fan propulsor.

It was surprisingly found that the solution to this problem is heavily dependent on the location of the unducted fan propulsor relative to the aircraft wing.

The inventors found that installing an unducted fan propulsor presents the challenge of addressing penalties that can result due to the interaction with the rest of the aircraft. The manner in which these penalties are addressed according to the claimed subject matter is unique for this type of engine.

An unducted fan propulsor is particularly challenged due to the scrubbing and interference drags relative to a ducted turbofan. That additional drag then results in a higher thrust needed from the propulsor. Generally, higher thrust for a ducted turbofan comes with a larger power requirement and thus more fuel flow. For the unducted fan propulsor it was surprisingly found by placing the engine so that it can take advantage of the high pressure flow induced by the wing (and/or a horizontal stabilizer), engine thrust may increase without increasing the power requirement on the engine. This placement of the engine relative to the wing then acts to offset the scrubbing and interference drag, thus not increasing the required fuel (or reducing the increased fuel flow required for a non-optimum engine placement). The inventors found that increased drag effects associated with an unducted fan propulsor, rather than addressed directly, may instead be offset by placing the engine at a more optimal location relative to the wing.

Additionally, the inventors found that the installed engine’s improved position also positively influences the noise produced by the wing-engine interaction during flight at cruise conditions.

It was surprisingly found that by adapting a particular location on an unducted fan propulsor relative to an aircraft wing’s effective quarter chord point (QC), the desired result of offsetting interference and scrubbing drag without increasing the power delivered to the fan could be achieved for an unducted fan propulsor.

It was also found that the improved position is dependent on the fan blade size of the unducted fan propulsor.

As explained below, after recognizing the novel flow characteristics associated with an unducted fan propulsor installed on an aircraft, taking into account the limitations on where to place this propulsor, the inventors were surprisingly able to establish criteria for positioning the propulsor relative to an aircraft wing to offset interference and scrubbing effects by defining a midpoint (P) location between external output guide vanes (OGV) or input guide vanes (IGV) and a forward or aft rotating array of fan blades, respectively, and additionally defining the distance from the effective quarter chord point (QC) to P. The position of P relative to QC and QC itself were found dependent on the rotating fan diameter. The correlation of these parameters to offset interference and scrubbing effects was not used before and was the surprising finding of the inventors for an unducted fan propulsor. Thus, mounting unducted fan propulsors relative to the effective quarter-chord point (QC) and fan blade size as described in embodiments provided herein offsets interference and scrubbing effects associated with an unducted fan propulsor and is an improvement over other mounting locations, including conventional mounting locations that are more forward of, and more in line with, a wing chord line.

Various aspects of the present disclosure describe aspects of an aircraft characterized in part by a specific relation between an effective quarter chord point (QC) of an airfoil section associated with a wing (or horizontal stabilizer) and the unducted fan propulsor, which is believed to result in improved aircraft performance and/or fuel efficiency. According to the disclosure, an aircraft includes a fuselage and an unducted fan propulsor installed relative to a section of the wing or the horizontal stabilizer.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

Figure 1:
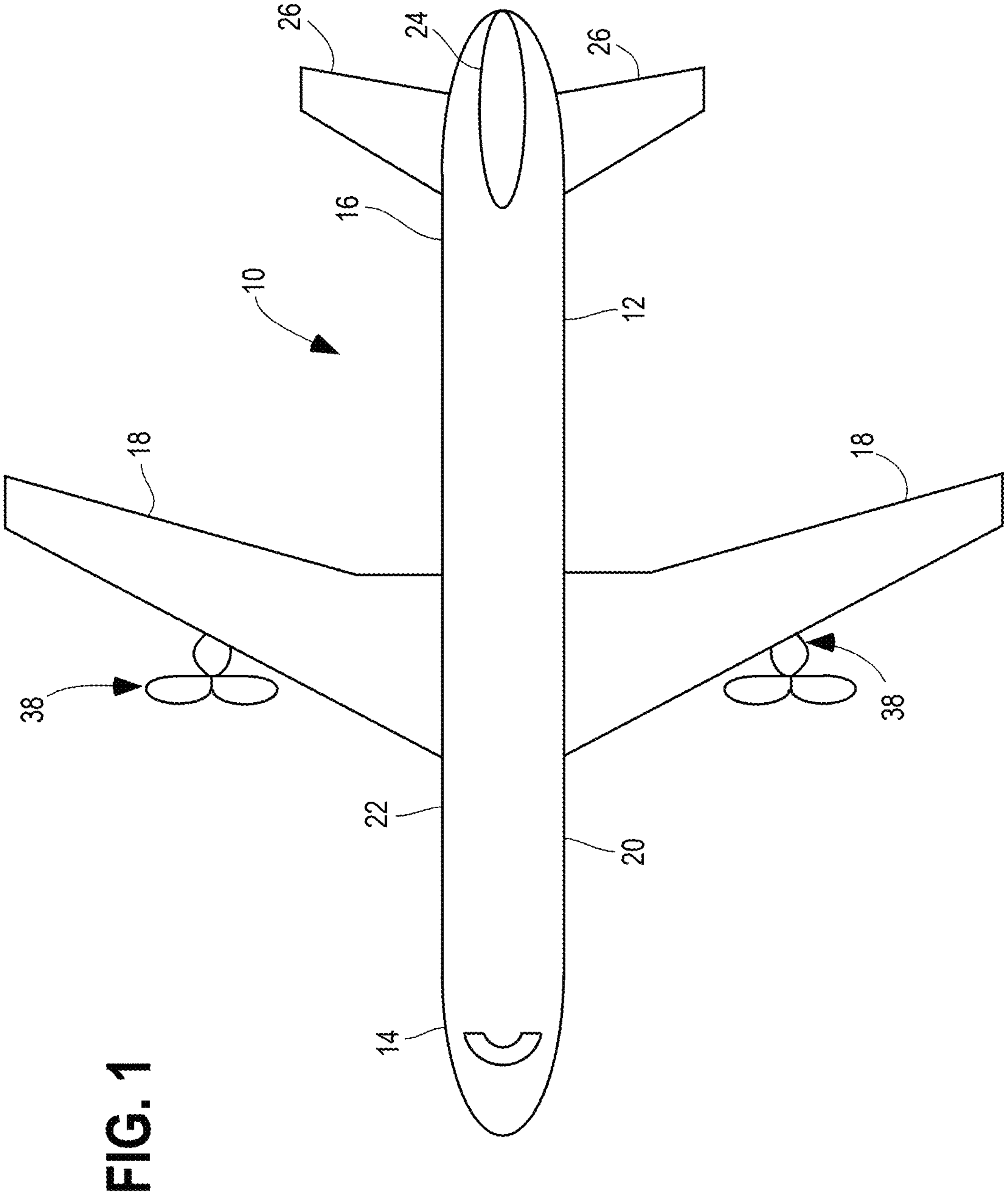
FIG. 1 comprises a top plan view of an aircraft as configured in accordance with various embodiments of these teachings, with undermounted, unducted fan propulsors mounted on forward wings of the aircraft.
Figure 2:
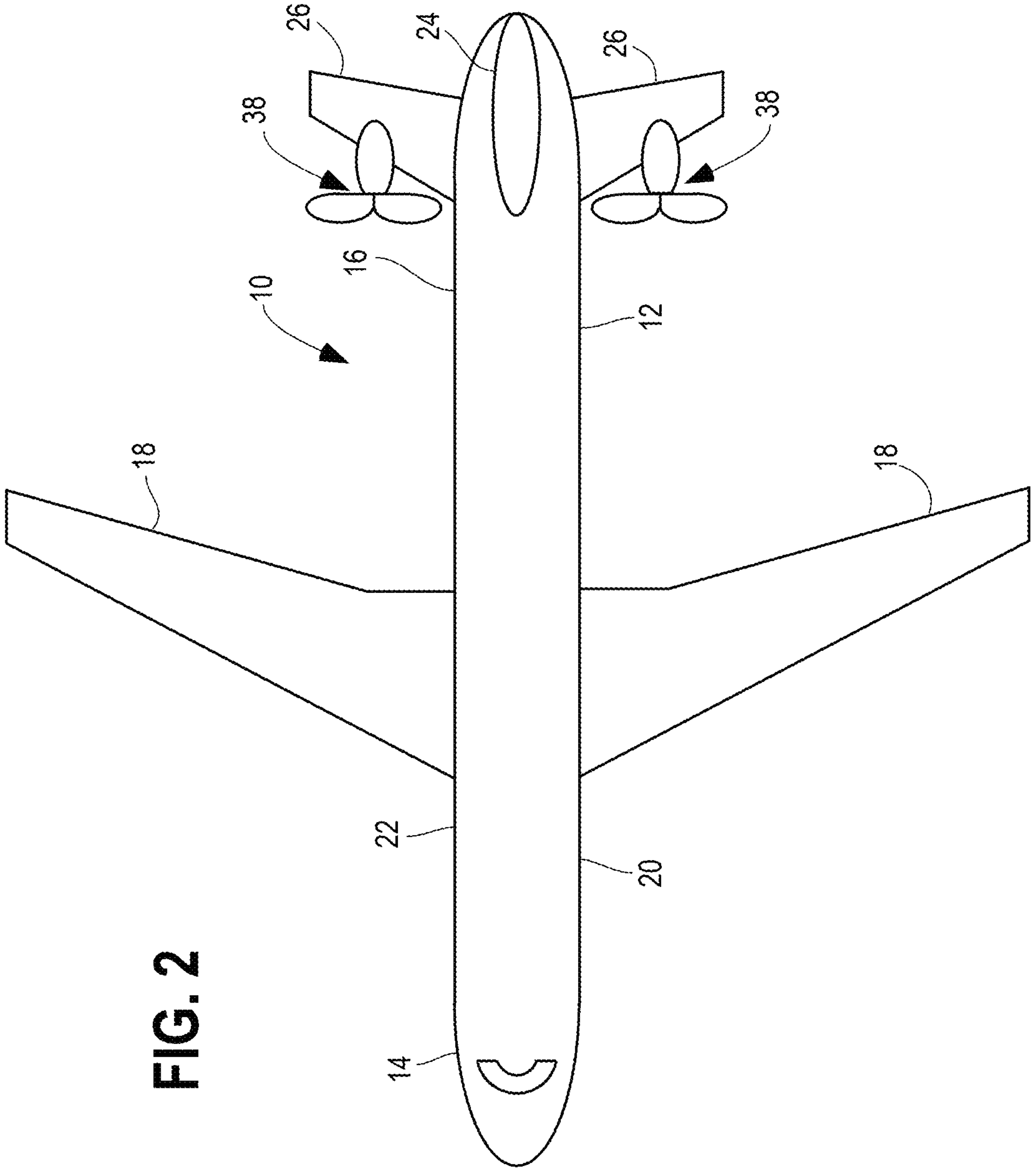
FIG. 2 comprises a top plan view of an aircraft as configured in accordance with various embodiments of these teachings, with unducted fan propulsors mounted on top of horizontal stabilizers of the aircraft.

As shown in FIGS. 1 and 2, the aircraft 10 includes a fuselage 12 that extends longitudinally from a forward or nose section 14 and an aft or tail section 16 of the aircraft 10. The aircraft 10 further includes airfoils including a first wing 18 that extends laterally outwardly from a port side 20 and a second wing 18 that extends laterally outwardly from a starboard side 22 of the fuselage 12. The tail section 16 of the aircraft 10 includes a vertical stabilizer 24, a first airfoil of the horizontal stabilizer 26 that extends laterally outwardly from the port side 20, and a second airfoil of the horizontal stabilizer 26 that extends laterally outward from the starboard side 22 of the fuselage 12. An unducted fan propulsor 38 is undermounted relative to each of the wings 18, as shown in the embodiment of FIG. 1. Alternatively, the unducted fan propulsor 38 is mounted relative to the top of each of the horizontal stabilizers 26, as shown in FIG. 2. In some embodiments, more than one of the unducted fan propulsors 30 or 38 may be mounted to each of the wings 18 or each of the horizontal stabilizers 26.

FIG. 3 shows an elevational cross-sectional view of an embodiment of one of the unducted fan propulsors 38. As is seen from FIG. 3, the unducted fan propulsor 38 takes the form of an open fan propulsion system and has a rotating element in the form of rotatable propeller assembly 32 on which is mounted a first array of blades 34 around a centerline (CL) of the unducted fan propulsor 38. The first array of blades 34 defines a diameter D representing the tip-to-tip diameter of the blades and a maximum radial extent from CL. This diameter D is measured along a radial direction perpendicular to CL. The unducted fan propulsor 38 of FIG. 3 includes a second array of blades or vanes, which are non-rotating or static. In some embodiments, a non-rotating stationary element in the form of vane assembly 40 includes an array of vanes 42 disposed around CL.

Each of the blades 34 has a root 35 where the blade 34 is attached to the rotatable propeller assembly 32, and each blade 34 defines a root length (RTL). The root length (RTL) is defined as the axial extent (in a direction parallel to CL) from the radially innermost leading edge (LE) of the blade 34 airfoil, e.g., closest to CL, to the axial location of the radially innermost trailing edge (TE) of the blade 34 airfoil.

Figure 4:
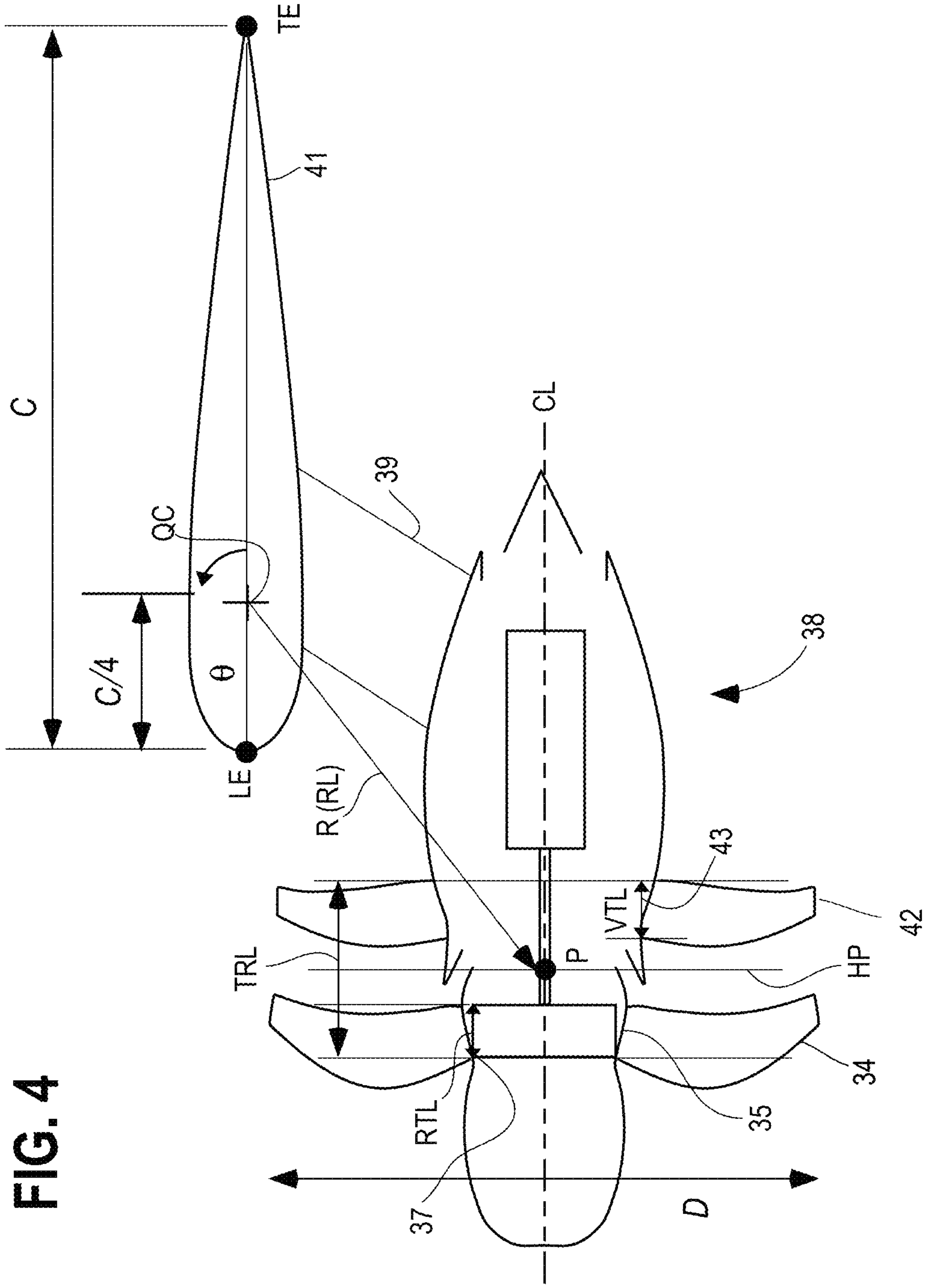
FIG. 4 comprises a schematic side elevation view showing the location of the unducted fan propulsor of FIG. 3 relative to an airfoil section.

Each of the vanes 42 also has a root 43 with a vane root distance VTL where the vane 42 is attached to the non-rotating vane assembly 40. The total root length (TRL) is the distance between the leading edge (LE) of the blade 34 airfoil (radially nearest to CL) of the blades 34 and the trailing edge (LE) of the root 43 of the vanes 42, as shown in FIGS. 3 and 4. TRL is a measured axial distance from the radial innermost LE of the foremost row of blades/vanes and the trailing edge (TE) of the vanes 42. In some embodiments, the second array may instead be a second rotating elements and the TRL is the measured axial distance from the radially innermost LE of the blades 34 of the first rotating element and the TE of the root of the blades of the second rotating elements. In some embodiments, the vanes 42 may be forward of the rotating blades, and the TRL is the distance between the LE edge of the root of the vanes and the TE of the root of the rotating blades. In some embodiments, an unducted fan propulsor having rotating elements (e.g., rotating blades) and stationary elements (e.g. vanes) may be mounted according to the relationship described in the present disclosure. In unducted fan propulsors having multiple rows of blade and/or vanes, the TRL of an unducted fan propulsor is defined as the distance between the LE of the root of the foremost row of blades/vanes and the rearward edge of the root of the aftmost row of blades/vanes of the unducted fan propulsor.

Referring to FIG. 4, for purposes explained more later, the unducted fan propulsor 38 has a point P. For the unducted fan propulsor 38 with a first array of blades or vanes 34 and a second array of blades or vanes 42, as shown in FIGS. 3 and 4, the point P is located at the intersection of CL and a line HP perpendicular to CL and that passes through an axial midpoint of the total root length TRL between a forward end at the root of one of the blades 34 of the forward array and a rearward end at the root of one of the blades 42 of the rearward array when aligned with the one of the blades 34 of the forward array, as shown in FIG. 6. Either the forward or rearward array can be vanes or blades. In other words, the line HP is located equidistant from a forward end of the root of one of the forward vanes or blades 34 and a rearward end of the root of one of the rearward blades or vanes 42. The TRL of an unducted fan propulsor is defined as the distance between the LE of the root of the forward row of blades/vanes and the rearward edge of the root of the aftmost blade/vane.

Referring again to FIG. 3, the exemplary unducted fan propulsor 38 includes a drive mechanism 44 that provides torque and power to the propeller assembly 32 through a transmission 46. The drive mechanism 44 may be a gas turbine engine and associated transmission 46. Transmission 46 delivers torque from the drive mechanism 44 to the propeller assembly 32. The transmission system can be configured as a direct drive engine, transferring power from a power turbine or low pressure turbine (LPT) to the propeller assembly, or an indirect drive system where torque from the LPT is transferred to the propeller assembly 32 through a gearbox. The gearbox reduces a rotation speed of the drive shaft to match a desired rotational speed for the propeller assembly 32. The gas turbine engine includes in serial order a compressor, combustor, high pressure turbine and the LPT. In other embodiments the drive mechanism may generate power partially or fully by an electric motor. In the former case the drive mechanism is a hybrid electric drive mechanism including a gas turbine engine where a drive shaft includes an electric motor-generator for generating torque. In the latter case the drive mechanism is an electric motor.

The unducted fan propulsor 38 is attached relative to the wings 18 or horizontal stabilizer 26 through one or more intermediate components or features, e.g., a pylon 39, as shown in FIG. 4.

Each of the wings 18 shown in FIG. 1, and horizontal stabilizers 26 shown in FIG. 2, has an airfoil section 41 associated with it, where the airfoil section 41 is defined above.

As depicted in FIG. 4, a chord line C of the airfoil section, length C as shown, is a straight line extending from LE to TE of the airfoil section (it will be understood that the airfoil section as shown and defined herein is not meant to indicate any particular camber associated with an aircraft wing). The effective quarter-chord point (QC) of the airfoil section is located on the chord line. QC is located at a distance of C/4 from the LE of the airfoil section 41.

Figure 5B:
FIG. 5B defines a pitch angle (D for the unducted fan propulsor relative to a chord line of the airfoil section in FIG. 4.
Figure 5A:
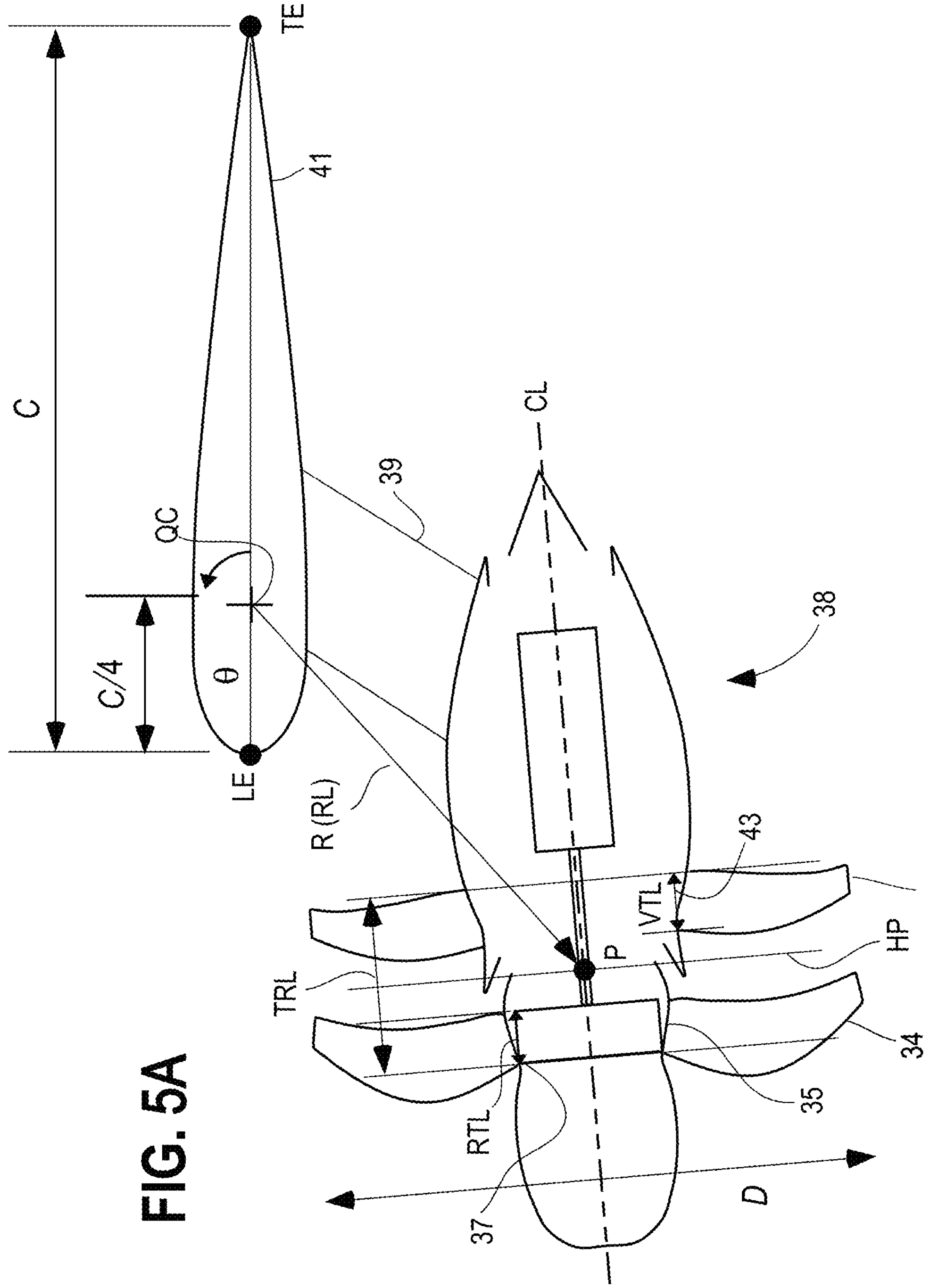
FIG. 5A is a schematic side elevation view similar to FIG. 4 and showing the unducted fan propulsor pitched downward relative to the airfoil section.

As shown in FIG. 4, the CL of the propulsor 38 and the chord line C are parallel to each other, corresponding to a zero pitch of the propulsor relative to the chord line C. The propulsor 38 can be pitched at different angles relative to the chord line, such as pitched downward as shown in FIG. 5A. FIG. 5B defines a pitch angle Φ for the propulsor 38, which is the angle spanned between the propulsor centerline CL and chord line C. Positive pitch corresponds to a clockwise rotation of CL relative to C. The pitch angle Φ can be fixed or variable during flight. For underwing installations, the pitch angle Φ can vary between −5 and +2 degrees, or it can vary between −3 and 0 degrees. During cruise conditions, propulsor pitch and toe angle (FIG. 6E, defined below) provide for an improved installed aerodynamic performance for the unducted fan propulsor in terms of reduced cabin noise and reduced off-axis loading of the unducted fan propulsor's drive shaft. For aft horizontal stabilizer or aft fuselage installations, the angle Φ can vary between −2 and +5 degrees to more align with downwash created by the wing.

The position of the open fan propulsor 38 is defined relative to QC. The airfoil section, as defined above, is the average of a first offset plane section and a second offset plane section of the airfoil (of the wing), where the first offset plane section is the section of the airfoil taken at a first plane and the second offset plane section is the section of the airfoil taken at a second plane, the first and second planes being offset in a direction perpendicular to, and equidistant from a central plane by a distance of ½ the maximum fan diameter (D) for the rotating blades, as shown in FIG. 6A. Both the gravity vector and axis of rotation of the rotating blades of the propulsor lie in this central plane when the aircraft is on the ground.

Figure 6C:
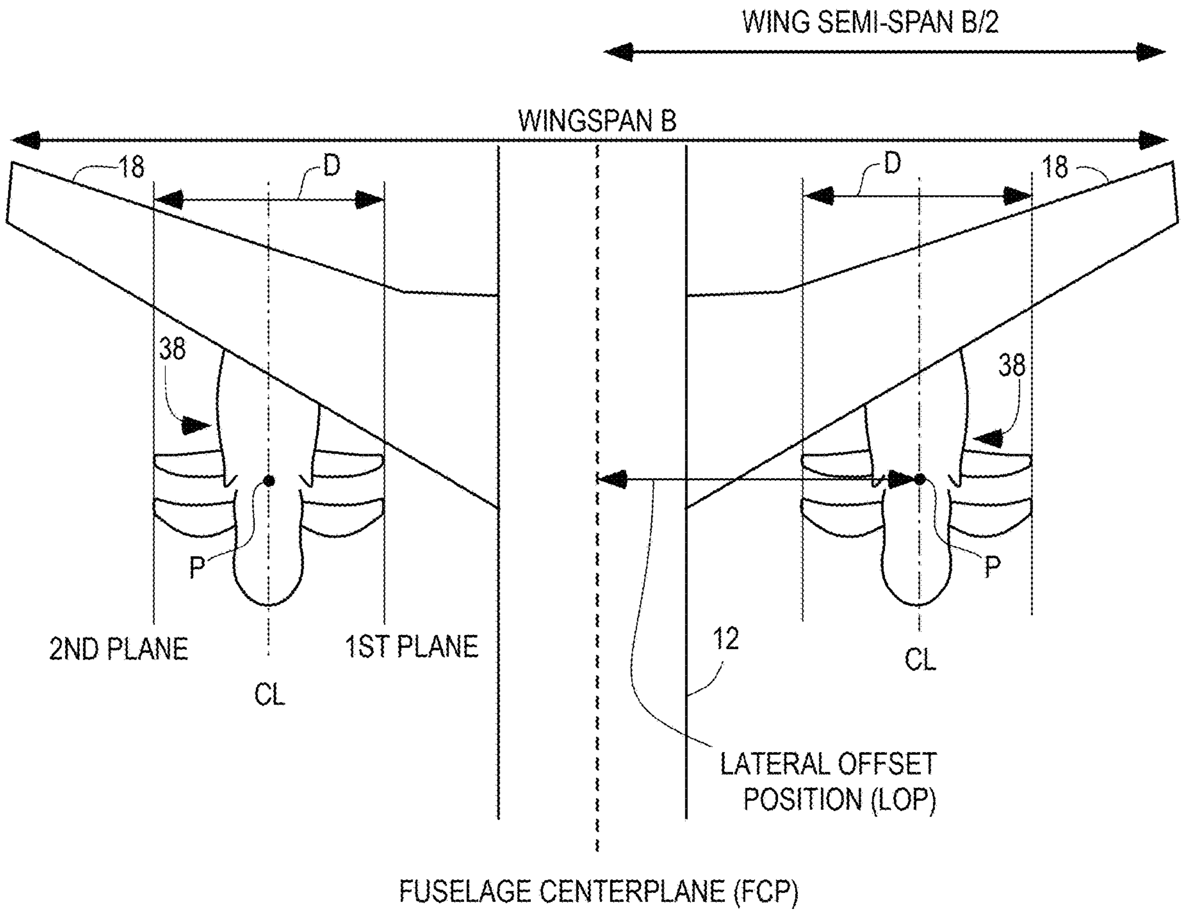
FIG. 6C comprises a schematic top plan view of a portion of an aircraft having a pair of wings extending from the fuselage with the propulsor of FIG. 3 mounted relative to each of the wings.

Referring to FIG. 6C, the propulsor 38—specifically, point P of the propulsor 38—has a spanwise location laterally offset from the fuselage centerplane (FCP) relative to the aircraft's wingspan B. P has a laterally offset position (LOP) between 10% and 80%, 20% and 40%, or between 25% and 35% of B/2 measured from the fuselage centerplane (FCP), as defined above. The location of P is also chosen to avoid interference with the fuselage or an adjacent propulsor if more than one propulsor is mounted relative to the wing. For an aft fuselage installation, the LOP of the propulsor will be closer to the fuselage, but far enough away from the fuselage's boundary layer to reduce or avoid undue interaction with the fuselage boundary layer.

Figure 6D:
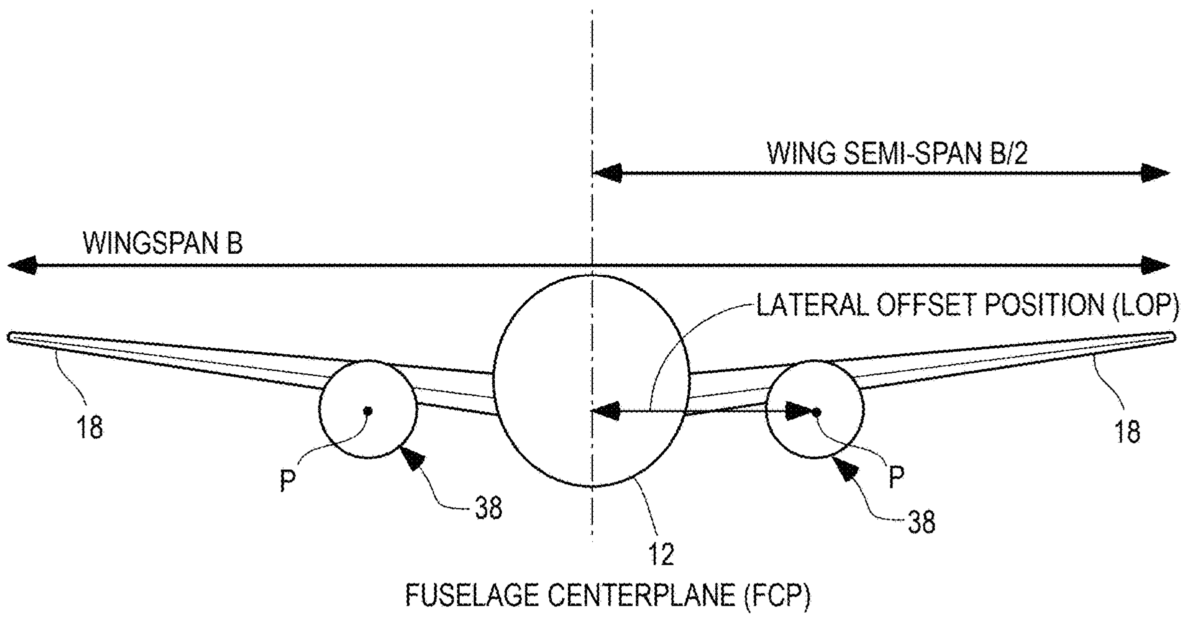
FIG. 6D comprises a schematic front elevation view of the aircraft portion of FIG. 6C.
Figure 6E:
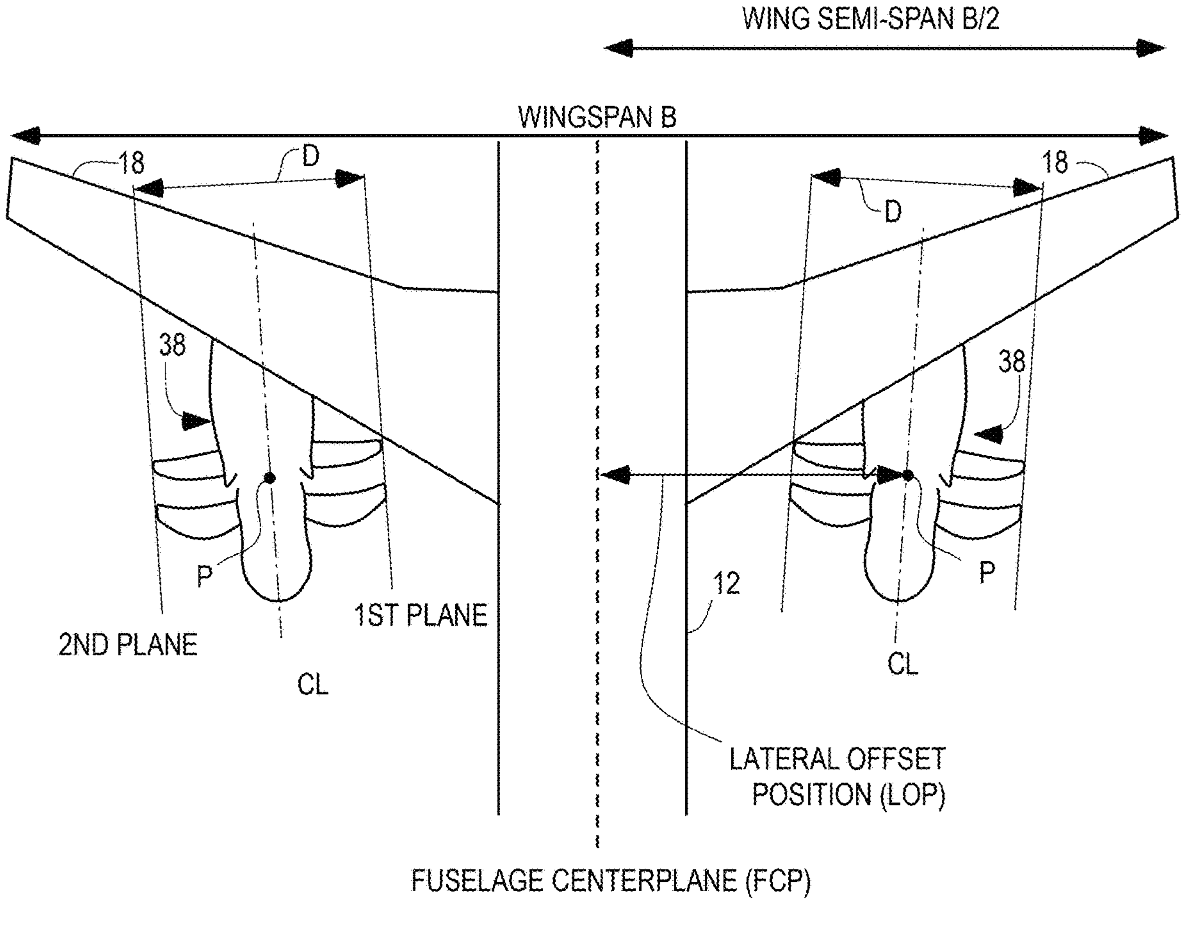
FIG. 6E comprises a schematic top plan view of a portion of an aircraft having a pair of wings extending from the fuselage with the propulsor of FIG. 3 mounted relative to each of the wings, similar to FIG. 6C but showing the propulsors toed inwardly toward the fuselage.

As shown in FIG. 6C, the propulsor centerline CL and the fuselage centerplane (FCP) can be orientated parallel to each other. Referring to FIG. 6D, other angles between propulsor centerline CL and the fuselage centerplane (FCP) are contemplated. For an underwing mounted propulsor, the toe angle can provide added benefit when positive (i.e., the rotor toed-in towards the fuselage with the forward end of the propulsor 38 being more inboard than the aft end). The propulsor can have an inward toe angle of between 0 and 5 degrees, or between 1 and 3 degrees.

There are specific locations that the inventors have found to be advantageous to position the unducted fan propulsor 38 to generate increased thrust using higher pressure air flow, in order to offset the scrubbing and interference drag. The higher pressure air flow can be beneath the wings 18. In the case of a horizontal stabilizer 26, the higher pressure air flow is above the horizontal stabilizer 26. Accordingly, the high-pressure side of an airfoil may refer to the underside of a wing 18 or the top side of a horizontal stabilizer 26.

The aircraft described herein has a fuselage, wings and/or stabilizers, and two or more unducted fan propulsor systems (or propulsors). The unducted fan propulsor system, which is mounted on the pressure side of a wing or horizontal stabilizer, provides thrust to the aircraft. To improve upon what the propulsor system can deliver, there often is a need to make compromises to other parts of aircraft design (trade-offs). Stated another way, the benefits of an unducted fan propulsor cannot be viewed without consideration of the effect of placement of the propulsor on the aircraft. For example, placement can affect loads on and size of the pylon, wing loads, landing gear length and associated forces, weight, and cost.

The teachings described below enable improved balancing of the tradeoffs required in the aircraft design while positioning the unducted fan propulsor relative to the airfoil section's effective quarter chord point QC to offset scrubbing and interference drag loses.

Referring to FIG. 4, the location of an unducted fan propulsor relative to an airfoil section 41 is defined herein using a polar coordinate system having an angular (θ) coordinate and a radial (R) component, with origin located at the effective quarter chord point (QC) of the airfoil section having a chord length (C) as shown. The radial component is referred to herein as a "positioning line (R)". The location of the point P of the unducted fan propulsor 38 relative to the origin (QC) of the polar coordinate system (the origin of the coordinate system is the same as the effective quarter chord point for airfoil section 41) is expressed in terms of a vector having radial component R with magnitude RL and angular component θ. The vector magnitude RL is called a "positioning line length (RL)".

The angle θ is measured relative to a datum that is the airfoil section chord line (e.g., in FIG. 6 the vector R is located by an angle that is between 180 and 270 degrees measured counterclockwise about origin QC relative to the chord line). When viewed looking from an outboard position towards an inboard position (e.g., the fuselage), θ is positive in a counter-clockwise direction when the propulsor is below the airfoil section 41 (wing, FIG. 9), and θ is positive in a clockwise direction when the propulsor is above the airfoil section (horizontal stabilizer, FIG. 10) as indicated in the drawings, respectively, by the direction of the arrow from the origin.

The inventors found that for an unducted fan propulsor system the ratio of RL over D (i.e., RL/D) is desirably less than or equal to 2, less than or equal to 2 and greater than or equal to 0.15, or less than or equal to 2 and greater than or equal to 0.35. Additionally, for the undermounted unducted fan propulsor systems (pressure side of the airfoil section) of FIGS. 5 and 6 the angular component θ associated with these ranges for RL/D and locating the unducted fan propulsor system (i.e., the location of P relative to the airfoil section) are desirably between 187° and 342°, between 198° and 310°, or between 205° and 285°. These regions of RL and θ locating the unducted fan propulsor system relative to the airfoil section tend to offset scrubbing and interference drag for an unducted fan propulsor.

Figure 9:
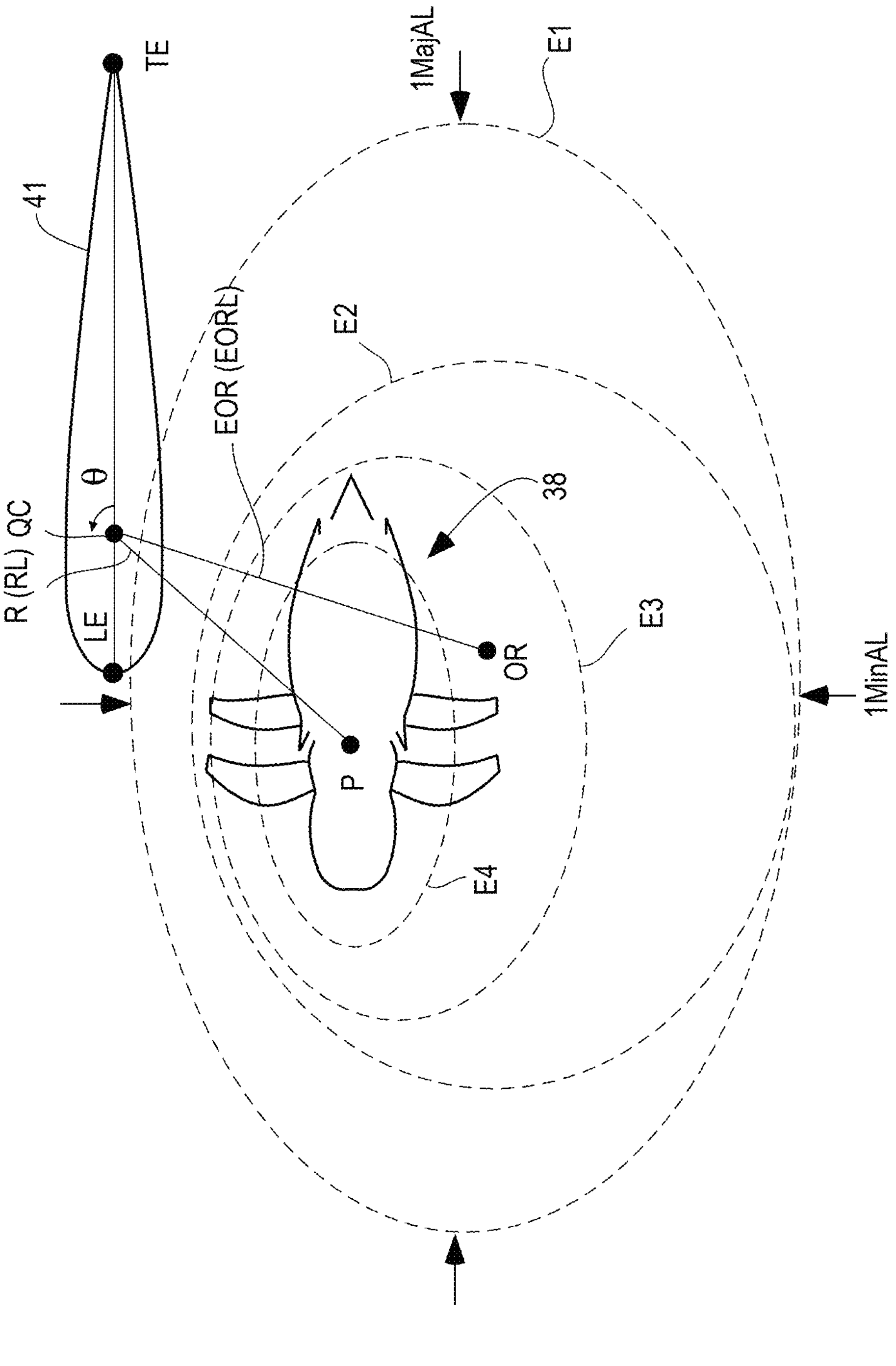
FIG. 9 comprises a schematic side elevation view similar to that of FIG. 7, showing the first ellipse, the second ellipse, the third ellipse, and the fourth ellipse to illustrate various embodiments of mounting locations of one of the unducted fan propulsors relative to one of the wings.
Figure 10:
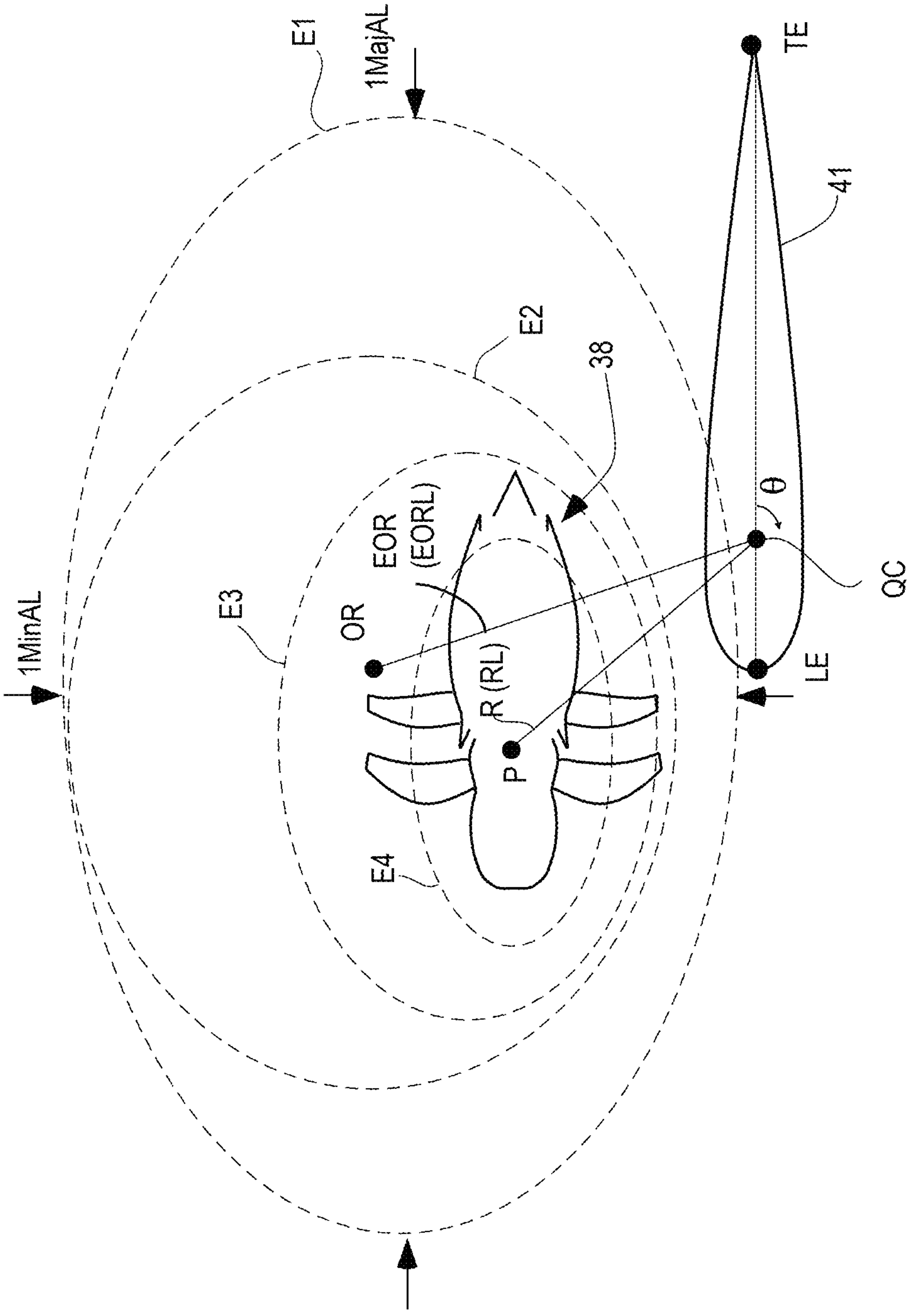
FIG. 10 comprises a schematic side elevation view similar to that of FIG. 8, showing the first ellipse, the second ellipse, the third ellipse, and the fourth ellipse to illustrate various embodiments of mounting locations of one of the unducted fan propulsors relative to one of the horizontal stabilizers.

Alternatively, the point P for the unducted fan propulsor can be located within a defined ellipse defining a region relative to QC where scrubbing and interference drag tends to offset. FIGS. 7-10 each illustrate such ellipses according to several embodiments. Each of the ellipses has an origin OR, a major axis length (MajAL), and a minor axis length (MinAL), as shown in FIGS. 9 and 10 with respect to one of several ellipses and as will be explained further below. The location of OR is expressed relative to QC using the polar coordinate system frame of reference defined earlier. The propulsor system is mounted such that the point P of the unducted fan propulsors 38 is located within an ellipse as defined herein.

Referring to FIG. 9, the radial ellipse origin positioning line (EOR) extends from the ellipse origin OR, e.g., ellipse E1, to QC. The ellipse origin position line EOR has a length EORL. The origin of each of the ellipses is defined in the adopted polar coordinates with a radial coordinate defined as the ratio of EORL to the array of blades diameter (D), i.e., the quantity EORL/D. The angle θ is measured relative to the chord line (as defined earlier) and positive in a clockwise direction when the propulsor is above the airfoil section (horizontal stabilizer, FIG. 10) as indicated in the drawings, respectively, by the direction of the arrow from the origin.

An angle θ for the ellipse origin positioning line EOR is measured from a datum that is the chord line to an ellipse positioning line EOR (e.g., in FIG. 9 the vector EOR is located by an angle that is between 180 and 270 degrees measured counterclockwise about origin QC). A positive θ (1) increases in a counter-clockwise direction when the high pressure side of the airfoil section is below the airfoil section, and (2) increases in a clockwise direction when the high pressure side of the airfoil section is above the airfoil section.

In a first embodiment, the point P of the unducted fan propulsor 38 is located in a first ellipse E1 with a first ellipse origin defined by EORL/D of 0.938 and θ of 253.6°. The first ellipse E1 also has a first major axis length (1MajAL) and a first minor axis length (1MinAL), where 1MajAL/D is 2.8 and 1MinAL/D is 1.7. An unducted fan propulsor located within E1 tends to offset scrubbing and interference drag.

In a second embodiment, the point P of the unducted fan propulsor 38 is located in a second ellipse E2 having a second ellipse origin defined by EORL/D of 1.051 and θ of 248.8°. The second ellipse E2 has a second major axis length (2MajAL) and a second minor axis length (2MinAL), where 2MajAL/D is 1.86 and 2MinAL/D is 1.56. An unducted fan propulsor located within E2 tends to offset scrubbing and interference drag.

In a third embodiment, the point P of the unducted fan propulsor 38 is located in a third ellipse E3 having a third ellipse origin defined by EORL/D of 0.870 and θ of 239.6°. The third ellipse E3 has a third major axis length (3MajAL) and a third minor axis length (3MinAL), where 3MajAL/D is 1.4 and 3MinAL/D is 0.9. An unducted fan propulsor located within E3 tends to offset scrubbing and interference drag.

In a fourth embodiment, the point P of the unducted fan propulsor 38 is located in a fourth ellipse E4 having a fourth ellipse origin defined by EORL/D of 0.763 and θ of 235.7°. The fourth ellipse E4 has a fourth major axis length (4MajAL) and a fourth minor axis length (4MinAL), where 4MajAL/D is 0.94 and 4MinAL/D is 0.44. An unducted fan propulsor located within E4 tends to offset scrubbing and interference drag.

The location of the unducted fan propulsor system (i.e., point P) relative to the airfoil section may also be expressed in terms of the following expressions:

$$\frac{RL}{D}+\frac{\left(\sqrt{a*\left[b*\sin^2(\theta)-c*\cos^2(\theta)+d*\sin(\theta)*\cos(\theta)\right]}+e*\sin(\theta)+f*\cos*(\theta)\right)}{g*\sin^2(\theta)+h*\cos^2(\theta)}>0 \text{ and}$$

$$\frac{RL}{D}+\frac{\left(-\sqrt{a*\left[b*\sin^2(\theta)-c*\cos^2(\theta)+d*\sin(\theta)*\cos(\theta)\right]}+e*\sin(\theta)+f*\cos*(\theta)\right)}{g*\sin^2(\theta)+h*\cos^2(\theta)}<0$$

where 0.07<RL/D<1.98 and θ is between 187° and 340°, and where a, b, c, d, e, f, g and h have the values set forth in the following table under the heading "Fifth Emb.":

| Variable | Fifth Emb. | Sixth Emb. | Seventh Emb. | Eighth Emb. |
|---|---|---|---|---|
| a | 1.4161 | 0.52621 | 0.09923 | 0.01069156 |
| b | 1.88978 | 0.7205 | 0.2964 | 0.036 |
| c | 0.0875 | 0.352 | 0.36 | 0.3485 |
| d | 0.477 | 0.7448 | 0.66 | 0.5418 |
| e | 1.764 | 0.8476 | 0.3675 | 0.139167 |
| f | 0.19146 | 0.23119 | 0.0891 | 0.020812 |
| g | 1.96 | 0.8649 | 0.49 | 0.2209 |
| h | 0.7225 | 0.6084 | 0.2025 | 0.0484 |

In a sixth embodiment, the point P of the unducted fan propulsor 38 can be defined by the above expression, but where 0.254<RL/D<1.86 and θ is between 199° and 306°, and where a, b, c, d, e, f g and h have the values set forth in the above table under the heading "Sixth Emb."

In a seventh embodiment, the point P of the unducted fan propulsor 38 can be defined by the above expression, but where 0.369<RL/D<1.43 and θ is between 204° and 291°, and where a, b, c, d, e, f g and h have the values set forth in the above table under the heading "Seventh Emb.".

In an eighth embodiment, the point P of the unducted fan propulsor 38 can be defined by the above expression, but where 0.477<RL/D<0.9455 and θ is between 211° and 274°, And where a, b, c, d, e, f g and h have the values set forth in the above table under the heading "Eighth Emb."

Figure 7:
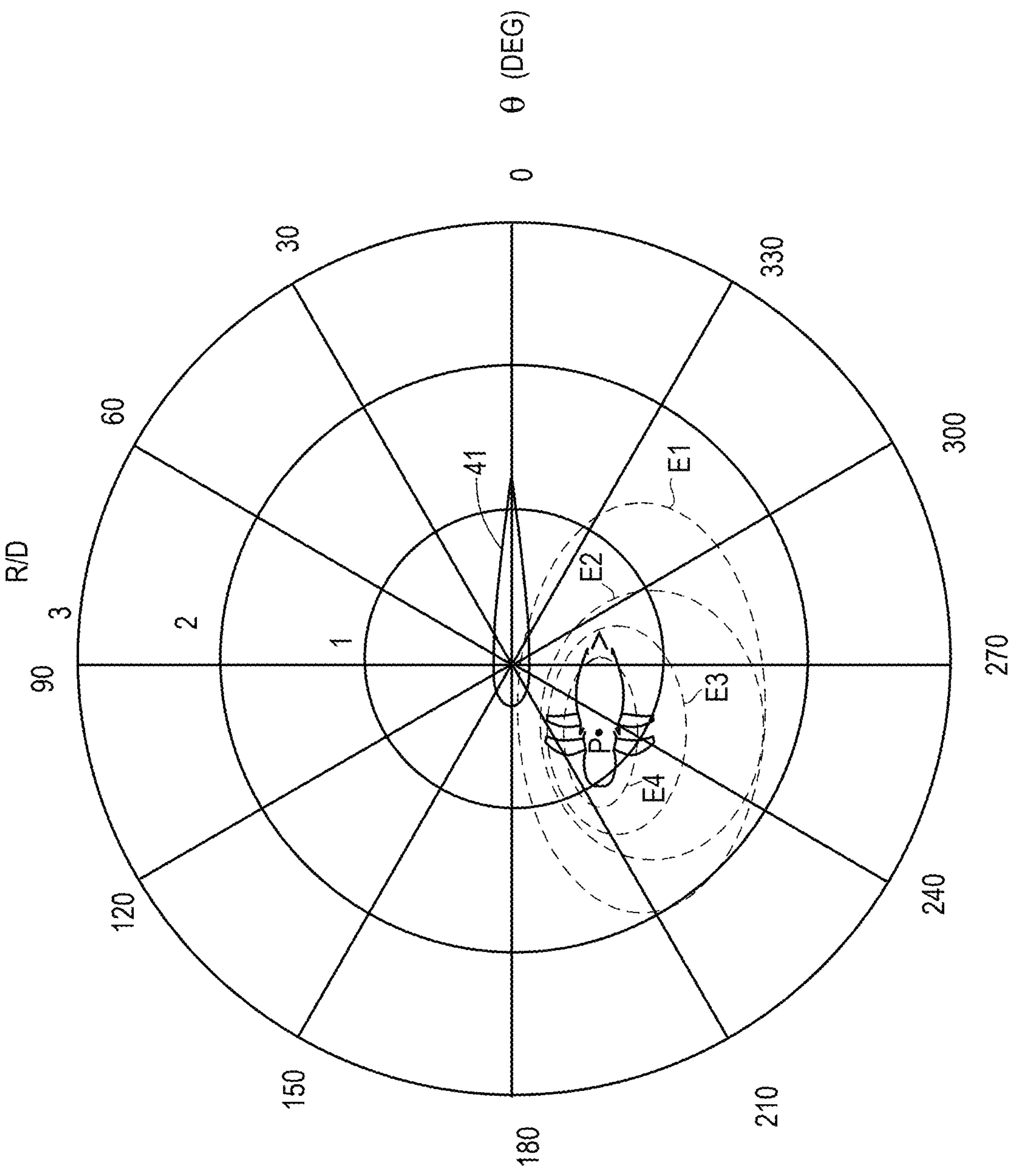
FIG. 7 comprises a schematic side elevation view similar to that of FIG. 4, but showing a first ellipse, a second ellipse, a third ellipse, and a fourth ellipse to illustrate various embodiments of mounting locations of one of the unducted fan propulsors relative to one of the wings.

The unducted fan propulsor locations illustrated in FIG. 7 are made relative to an airfoil section of an aircraft wing and refer to an undermounted unducted fan propulsor system.

Figure 11:
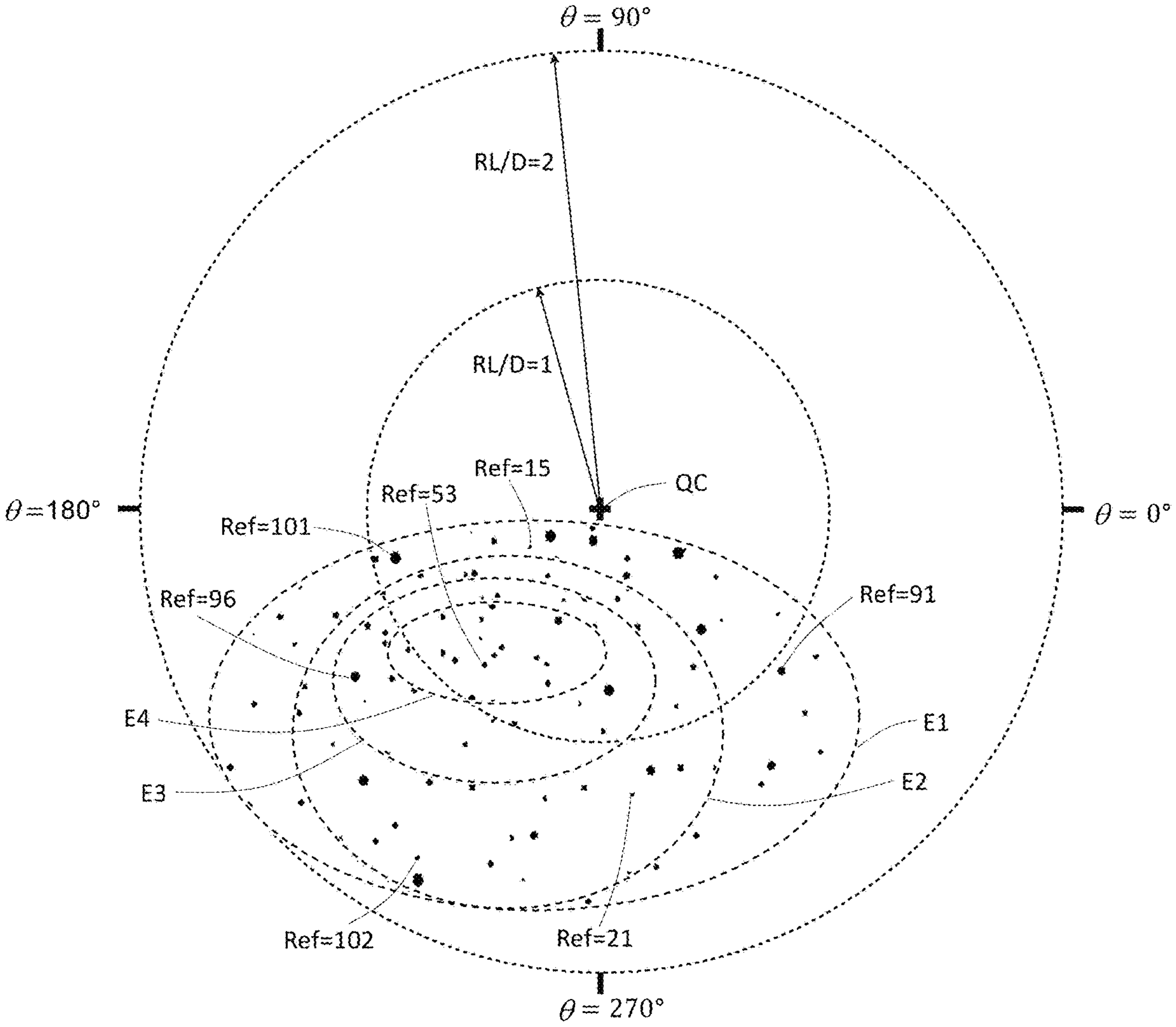
FIG. 11 comprises a schematic representation showing exemplary locations of a point P of one of the unducted fan propulsors, as defined herein, within the first ellipse, the second ellipse, the third ellipse, and the fourth ellipse.

TABLES 1 and 3-6 set forth examples of embodiments of invention. TABLE 1 shows each maximum outer diameter (D) and the location of point P of the unducted fan propulsor relative to the effective quarter chord point, QC, contemplated, where the point P is defined by RL and θ. The term "Ref" refers to the row in Table 1 for reference. The exemplary types of aircraft indicated with reference letters A through I in TABLE 1 are identified in TABLE 2. The point P of the unducted fan propulsor locations from TABLE 1 are shown in FIG. 11 for an under-wing mounted propulsor (for a propulsor mounted above a horizontal stabilizer the maximum outer diameter (D) and the point P of the unducted fan propulsor locations would be mirrored about the chord line of the airfoil section, which, for purposes of explanation, may be thought of as an axis passing through θ=0 deg and θ=180 deg in FIG. 11) relative to the first ellipse (E1), second ellipse (E2), third ellipse (E3), and the fourth ellipse (E4). The size of the points in FIG. 11 represent the relative size of D for the range provided in TABLE 1 (not to scale). The rotating blades diameter (D) may be between 2-50, 8-16, 10-15, 12-14, or 14-16 feet.

TABLE 1

P-location relative to airfoil section quarter chord point

| Ref. | Type of aircraft | RL (ft) | D (ft) | θ (deg) | RL/D |
|---|---|---|---|---|---|
| 1 | C I | 2.60 | 2.0 | 220.00 | 1.30 |
| 2 | F I | 1.07 | 2.0 | 189.00 | 0.54 |
| 3 | I | 3.13 | 2.0 | 199.73 | 1.57 |
| 4 | C F I | 2.18 | 3.0 | 319.20 | 0.73 |
| 5 | F I | 2.82 | 3.0 | 242.40 | 0.94 |
| 6 | C I | 1.47 | 4.0 | 293.60 | 0.37 |
| 7 | C I | 2.43 | 4.0 | 217.87 | 0.61 |
| 8 | I | 6.64 | 4.0 | 259.47 | 1.66 |
| 9 | C F I | 4.23 | 5.0 | 265.87 | 0.85 |
| 10 | C H I | 6.57 | 5.0 | 194.40 | 1.31 |
| 11 | F I | 2.03 | 5.0 | 250.93 | 0.41 |
| 12 | C F H I | 8.03 | 5.0 | 275.47 | 1.61 |
| 13 | C | 2.52 | 6.0 | 337.33 | 0.42 |
| 14 | H | 4.44 | 6.0 | 228.53 | 0.74 |
| 15 | C I | 1.88 | 6.0 | 208.27 | 0.31 |
| 16 | C F | 7.14 | 7.0 | 244.53 | 1.02 |
| 17 | B F H | 4.15 | 7.0 | 332.00 | 0.59 |
| 18 | B C I | 6.49 | 7.0 | 292.53 | 0.93 |
| 19 | C G | 8.05 | 8.0 | 216.80 | 1.01 |
| 20 | B F I | 11.89 | 8.0 | 256.27 | 1.49 |
| 21 | C G H | 10.08 | 8.0 | 277.60 | 1.26 |
| 22 | B C G I | 7.31 | 8.0 | 330.93 | 0.91 |
| 23 | C H | 9.97 | 8.0 | 294.67 | 1.25 |
| 24 | G I | 11.57 | 8.0 | 312.80 | 1.45 |
| 25 | B F I | 11.58 | 9.0 | 260.53 | 1.29 |
| 26 | C H | 6.06 | 9.0 | 224.27 | 0.67 |
| 27 | F G H | 3.06 | 9.0 | 233.87 | 0.34 |
| 28 | C I | 12.78 | 9.0 | 204.00 | 1.42 |
| 29 | B H | 10.47 | 10.0 | 210.40 | 1.05 |
| 30 | B I | 5.53 | 10.0 | 221.07 | 0.55 |
| 31 | A B C F G H | 7.00 | 10.0 | 253.07 | 0.70 |
| 32 | I | 2.47 | 10.0 | 306.40 | 0.25 |
| 33 | A C | 15.27 | 10.0 | 222.13 | 1.53 |
| 34 | G | 11.67 | 10.0 | 241.33 | 1.17 |
| 35 | A C F H | 17.13 | 10.0 | 243.47 | 1.71 |
| 36 | A B G I | 18.70 | 11.0 | 210.00 | 1.70 |
| 37 | G | 10.93 | 11.0 | 249.87 | 0.99 |
| 38 | A H | 4.33 | 11.0 | 285.07 | 0.39 |
| 39 | F I | 6.82 | 11.0 | 206.13 | 0.62 |

TABLE 1-continued

| P-location relative to airfoil section quarter chord point | | | | | |
|---|---|---|---|---|---|
| Ref. | Type of aircraft | RL (ft) | D (ft) | θ (deg) | RL/D |
| 40 | A F H | 11.60 | 12.0 | 272.27 | 0.97 |
| 41 | A B F I | 10.64 | 12.0 | 227.47 | 0.89 |
| 42 | A H | 21.84 | 12.0 | 232.80 | 1.82 |
| 43 | A G | 8.56 | 12.0 | 236.00 | 0.71 |
| 44 | B F H | 0.78 | 12.0 | 263.50 | 0.07 |
| 45 | A F | 10.00 | 12.5 | 200.00 | 0.80 |
| 46 | A B G H I | 15.25 | 12.5 | 268.00 | 1.22 |
| 47 | B | 19.92 | 12.5 | 279.73 | 1.59 |
| 48 | A B F | 15.92 | 12.5 | 316.00 | 1.27 |
| 49 | A B | 6.25 | 12.5 | 270.13 | 0.50 |
| 50 | A F H | 18.42 | 12.5 | 211.47 | 1.47 |
| 51 | F G | 24.25 | 12.5 | 215.73 | 1.94 |
| 52 | A B H | 19.50 | 13.0 | 287.20 | 1.50 |
| 53 | H | 10.66 | 13.0 | 234.93 | 0.82 |
| 54 | B | 14.99 | 13.0 | 326.67 | 1.15 |
| 55 | I | 18.11 | 13.0 | 239.20 | 1.39 |
| 56 | A B F H | 23.49 | 13.0 | 225.33 | 1.81 |
| 57 | A F G H | 10.49 | 13.0 | 302.13 | 0.81 |
| 58 | B I | 3.38 | 13.0 | 231.73 | 0.26 |
| 59 | A B G | 13.95 | 13.0 | 212.53 | 1.07 |
| 60 | A B H | 10.14 | 13.0 | 255.20 | 0.78 |
| 61 | F | 10.80 | 13.5 | 215.00 | 0.80 |
| 62 | A H I | 19.35 | 13.5 | 198.67 | 1.43 |
| 63 | B F | 15.39 | 13.5 | 220.00 | 1.14 |
| 64 | A G H I | 7.83 | 13.5 | 207.20 | 0.58 |
| 65 | B H | 10.30 | 13.5 | 235.70 | 0.76 |
| 66 | A B | 23.49 | 13.5 | 237.07 | 1.74 |
| 67 | A H | 22.05 | 13.5 | 238.13 | 1.63 |
| 68 | F G | 13.08 | 13.5 | 192.00 | 0.97 |
| 69 | A B F | 6.03 | 13.5 | 195.47 | 0.45 |
| 70 | A F | 13.23 | 13.5 | 200.80 | 0.98 |
| 71 | B H | 16.89 | 14.0 | 201.87 | 1.21 |
| 72 | B I | 22.68 | 14.0 | 254.13 | 1.62 |
| 73 | A B F H | 24.17 | 14.0 | 269.07 | 1.73 |
| 74 | B E G | 19.69 | 14.0 | 301.07 | 1.41 |
| 75 | A | 12.60 | 14.0 | 223.20 | 0.90 |
| 76 | H I | 23.30 | 15.0 | 214.67 | 1.55 |
| 77 | A B E G H | 10.30 | 15.0 | 248.80 | 0.69 |
| 78 | A B E H | 17.90 | 15.0 | 288.27 | 1.19 |
| 79 | F G | 21.23 | 16.0 | 246.67 | 1.33 |
| 80 | A E | 8.64 | 16.0 | 290.40 | 0.54 |
| 81 | E G | 17.60 | 16.0 | 207.00 | 1.10 |
| 82 | A E | 25.20 | 18.0 | 230.00 | 1.40 |
| 83 | F | 19.80 | 18.0 | 225.00 | 1.10 |
| 84 | A G | 6.84 | 18.0 | 263.73 | 0.38 |

TABLE 1-continued

| P-location relative to airfoil section quarter chord point | | | | | |
|---|---|---|---|---|---|
| Ref. | Type of aircraft | RL (ft) | D (ft) | θ (deg) | RL/D |
| 85 | A E | 35.64 | 18.0 | 221.00 | 1.98 |
| 86 | A E | 6.17 | 20.0 | 297.03 | 0.31 |
| 87 | F | 30.55 | 21.0 | 259.78 | 1.45 |
| 88 | A D | 10.99 | 22.0 | 252.33 | 0.50 |
| 89 | A E | 21.50 | 22.0 | 237.43 | 0.98 |
| 90 | D | 14.29 | 24.0 | 222.53 | 0.60 |
| 91 | D E | 25.75 | 24.0 | 319.38 | 1.07 |
| 92 | D E | 3.41 | 29.0 | 267.23 | 0.12 |
| 93 | D | 39.42 | 29.0 | 304.48 | 1.36 |
| 94 | E | 38.55 | 33.0 | 282.13 | 1.17 |
| 95 | D | 51.16 | 33.0 | 229.98 | 1.55 |
| 96 | D E | 44.23 | 35.0 | 215.08 | 1.26 |
| 97 | E | 24.18 | 35.0 | 311.93 | 0.69 |
| 98 | D | 8.53 | 40.0 | 207.63 | 0.21 |
| 99 | D | 31.45 | 40.0 | 274.68 | 0.79 |
| 100 | D | 18.19 | 45.0 | 334.28 | 0.40 |
| 101 | D | 42.32 | 48.0 | 192.73 | 0.88 |
| 102 | D | 90.00 | 50.0 | 244.88 | 1.80 |

TABLE 2

| Designator for TABLE 1 | Aircraft Type |
|---|---|
| A | Narrow Body, twin engine |
| B | Narrow Body, 4 engines |
| C | Narrow Body, distributed propulsors (>4 engines) |
| D | Wide Body, twin engine |
| E | Wide Body, 4 engines |
| F | Wide Body, distributed propulsors (>4 engines) |
| G | Regional Jet |
| H | Business Jet |
| I | UAV |

For Aircraft Type A, B, C and G having a Mach flight speed at cruise conditions of between 0.70 and 0.85 the fan diameter (D) is between 8 and 16 feet, or more preferably between 12 feet and 16 feet.

TABLES 3-6 provide exemplary embodiments for EORL and D for each of the first ellipse E1, second ellipse E2, third ellipse E3 and fourth ellipse E4, respectively, relative to the quarter chord point (QC).

TABLE 3

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 2 | 253.6 | 1.876 | 5.6 | 3.4 | 0.938 | 2.8 | 1.7 |
| 3 | 253.6 | 2.814 | 8.4 | 5.1 | 0.938 | 2.8 | 1.7 |
| 4 | 253.6 | 3.752 | 11.2 | 6.8 | 0.938 | 2.8 | 1.7 |
| 5 | 253.6 | 4.69 | 14 | 8.5 | 0.938 | 2.8 | 1.7 |
| 6 | 253.6 | 5.628 | 16.8 | 10.2 | 0.938 | 2.8 | 1.7 |
| 7 | 253.6 | 6.566 | 19.6 | 11.9 | 0.938 | 2.8 | 1.7 |
| 8 | 253.6 | 7.504 | 22.4 | 13.6 | 0.938 | 2.8 | 1.7 |
| 9 | 253.6 | 8.442 | 25.2 | 15.3 | 0.938 | 2.8 | 1.7 |
| 10 | 253.6 | 9.38 | 28 | 17 | 0.938 | 2.8 | 1.7 |
| 11 | 253.6 | 10.318 | 30.8 | 18.7 | 0.938 | 2.8 | 1.7 |
| 12 | 253.6 | 11.256 | 33.6 | 20.4 | 0.938 | 2.8 | 1.7 |
| 12.5 | 253.6 | 11.725 | 35 | 21.25 | 0.938 | 2.8 | 1.7 |
| 13 | 253.6 | 12.194 | 36.4 | 22.1 | 0.938 | 2.8 | 1.7 |
| 13.5 | 253.6 | 12.663 | 37.8 | 22.95 | 0.938 | 2.8 | 1.7 |
| 14 | 253.6 | 13.132 | 39.2 | 23.8 | 0.938 | 2.8 | 1.7 |
| 15 | 253.6 | 14.07 | 42 | 25.5 | 0.938 | 2.8 | 1.7 |
| 16 | 253.6 | 15.008 | 44.8 | 27.2 | 0.938 | 2.8 | 1.7 |
| 18 | 253.6 | 16.884 | 50.4 | 30.6 | 0.938 | 2.8 | 1.7 |
| 20 | 253.6 | 18.76 | 56 | 34 | 0.938 | 2.8 | 1.7 |
| 21 | 253.6 | 19.698 | 58.8 | 35.7 | 0.938 | 2.8 | 1.7 |

TABLE 3-continued

| First Ellipse E1 Embodiments | | | | | | | |
|---|---|---|---|---|---|---|---|
| D (ft) | θ (deg) | EORL (ft) | 1MajAL (ft) | 1MinAL (ft) | EORL/D | 1MajAL/D | 1MinAL/D |
| 22 | 253.6 | 20.636 | 61.6 | 37.4 | 0.938 | 2.8 | 1.7 |
| 24 | 253.6 | 22.512 | 67.2 | 40.8 | 0.938 | 2.8 | 1.7 |
| 29 | 253.6 | 27.202 | 81.2 | 49.3 | 0.938 | 2.8 | 1.7 |
| 33 | 253.6 | 30.954 | 92.4 | 56.1 | 0.938 | 2.8 | 1.7 |
| 35 | 253.6 | 32.83 | 98 | 59.5 | 0.938 | 2.8 | 1.7 |
| 40 | 253.6 | 37.52 | 112 | 68 | 0.938 | 2.8 | 1.7 |
| 45 | 253.6 | 42.21 | 126 | 76.5 | 0.938 | 2.8 | 1.7 |
| 48 | 253.6 | 45.024 | 134.4 | 81.6 | 0.938 | 2.8 | 1.7 |
| 50 | 253.6 | 46.9 | 140 | 85 | 0.938 | 2.8 | 1.7 |

TABLE 4

| Second Ellipse E2 Embodiments | | | | | | | |
|---|---|---|---|---|---|---|---|
| D (ft) | θ (deg) | EORL (ft) | 2MajAL (ft) | 2MinA L (ft) | EORL/D | 2MajAL/D | 2MinAL/D |
| 2 | 248.8 | 2.102 | 3.72 | 3.12 | 1.051 | 1.86 | 1.56 |
| 3 | 248.8 | 3.153 | 5.58 | 4.68 | 1.051 | 1.86 | 1.56 |
| 4 | 248.8 | 4.204 | 7.44 | 6.24 | 1.051 | 1.86 | 1.56 |
| 5 | 248.8 | 5.255 | 9.3 | 7.8 | 1.051 | 1.86 | 1.56 |
| 6 | 248.8 | 6.306 | 11.16 | 9.36 | 1.051 | 1.86 | 1.56 |
| 7 | 248.8 | 7.357 | 13.02 | 10.92 | 1.051 | 1.86 | 1.56 |
| 8 | 248.8 | 8.408 | 14.88 | 12.48 | 1.051 | 1.86 | 1.56 |
| 9 | 248.8 | 9.459 | 16.74 | 14.04 | 1.051 | 1.86 | 1.56 |
| 10 | 248.8 | 10.51 | 18.6 | 15.6 | 1.051 | 1.86 | 1.56 |
| 11 | 248.8 | 11.561 | 20.46 | 17.16 | 1.051 | 1.86 | 1.56 |
| 12 | 248.8 | 12.612 | 22.32 | 18.72 | 1.051 | 1.86 | 1.56 |
| 12.5 | 248.8 | 13.1375 | 23.25 | 19.5 | 1.051 | 1.86 | 1.56 |
| 13 | 248.8 | 13.663 | 24.18 | 20.28 | 1.051 | 1.86 | 1.56 |
| 13.5 | 248.8 | 14.1885 | 25.11 | 21.06 | 1.051 | 1.86 | 1.56 |
| 14 | 248.8 | 14.714 | 26.04 | 21.84 | 1.051 | 1.86 | 1.56 |
| 15 | 248.8 | 15.765 | 27.9 | 23.4 | 1.051 | 1.86 | 1.56 |
| 16 | 248.8 | 16.816 | 29.76 | 24.96 | 1.051 | 1.86 | 1.56 |
| 18 | 248.8 | 18.918 | 33.48 | 28.08 | 1.051 | 1.86 | 1.56 |
| 20 | 248.8 | 21.02 | 37.2 | 31.2 | 1.051 | 1.86 | 1.56 |
| 21 | 248.8 | 22.071 | 39.06 | 32.76 | 1.051 | 1.86 | 1.56 |
| 22 | 248.8 | 23.122 | 40.92 | 34.32 | 1.051 | 1.86 | 1.56 |
| 24 | 248.8 | 25.224 | 44.64 | 37.44 | 1.051 | 1.86 | 1.56 |
| 29 | 248.8 | 30.479 | 53.94 | 45.24 | 1.051 | 1.86 | 1.56 |
| 33 | 248.8 | 34.683 | 61.38 | 51.48 | 1.051 | 1.86 | 1.56 |
| 35 | 248.8 | 36.785 | 65.1 | 54.6 | 1.051 | 1.86 | 1.56 |
| 40 | 248.8 | 42.04 | 74.4 | 62.4 | 1.051 | 1.86 | 1.56 |
| 45 | 248.8 | 47.295 | 83.7 | 70.2 | 1.051 | 1.86 | 1.56 |
| 48 | 248.8 | 50.448 | 89.28 | 74.88 | 1.051 | 1.86 | 1.56 |
| 50 | 248.8 | 52.55 | 93 | 78 | 1.051 | 1.86 | 1.56 |

TABLE 5

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 2 | 239.6 | 1.74 | 2.8 | 1.8 | 0.87 | 1.4 | 0.9 |
| 3 | 239.6 | 2.61 | 4.2 | 2.7 | 0.87 | 1.4 | 0.9 |
| 4 | 239.6 | 3.48 | 5.6 | 3.6 | 0.87 | 1.4 | 0.9 |
| 5 | 239.6 | 4.35 | 7 | 4.5 | 0.87 | 1.4 | 0.9 |
| 6 | 239.6 | 5.22 | 8.4 | 5.4 | 0.87 | 1.4 | 0.9 |
| 7 | 239.6 | 6.09 | 9.8 | 6.3 | 0.87 | 1.4 | 0.9 |
| 8 | 239.6 | 6.96 | 11.2 | 7.2 | 0.87 | 1.4 | 0.9 |
| 9 | 239.6 | 7.83 | 12.6 | 8.1 | 0.87 | 1.4 | 0.9 |
| 10 | 239.6 | 8.7 | 14 | 9 | 0.87 | 1.4 | 0.9 |
| 11 | 239.6 | 9.57 | 15.4 | 9.9 | 0.87 | 1.4 | 0.9 |
| 12 | 239.6 | 10.44 | 16.8 | 10.8 | 0.87 | 1.4 | 0.9 |
| 12.5 | 239.6 | 10.875 | 17.5 | 11.25 | 0.87 | 1.4 | 0.9 |

TABLE 5-continued

| Third Ellipse E3 Embodiments | | | | | | | |
|---|---|---|---|---|---|---|---|
| D (ft) | θ (deg) | EORL (ft) | 3MajAL (ft) | 3MinAL (ft) | EORL/D | 3MajAL/D | 3MinAL/D |
| 13 | 239.6 | 11.31 | 18.2 | 11.7 | 0.87 | 1.4 | 0.9 |
| 13.5 | 239.6 | 11.745 | 18.9 | 12.15 | 0.87 | 1.4 | 0.9 |
| 14 | 239.6 | 12.18 | 19.6 | 12.6 | 0.87 | 1.4 | 0.9 |
| 15 | 239.6 | 13.05 | 21 | 13.5 | 0.87 | 1.4 | 0.9 |
| 16 | 239.6 | 13.92 | 22.4 | 14.4 | 0.87 | 1.4 | 0.9 |
| 18 | 239.6 | 15.66 | 25.2 | 16.2 | 0.87 | 1.4 | 0.9 |
| 20 | 239.6 | 17.4 | 28 | 18 | 0.87 | 1.4 | 0.9 |
| 21 | 239.6 | 18.27 | 29.4 | 18.9 | 0.87 | 1.4 | 0.9 |
| 22 | 239.6 | 19.14 | 30.8 | 19.8 | 0.87 | 1.4 | 0.9 |
| 24 | 239.6 | 20.88 | 33.6 | 21.6 | 0.87 | 1.4 | 0.9 |
| 29 | 239.6 | 25.23 | 40.6 | 26.1 | 0.87 | 1.4 | 0.9 |
| 33 | 239.6 | 28.71 | 46.2 | 29.7 | 0.87 | 1.4 | 0.9 |
| 35 | 239.6 | 30.45 | 49 | 31.5 | 0.87 | 1.4 | 0.9 |
| 40 | 239.6 | 34.8 | 56 | 36 | 0.87 | 1.4 | 0.9 |
| 45 | 239.6 | 39.15 | 63 | 40.5 | 0.87 | 1.4 | 0.9 |
| 48 | 239.6 | 41.76 | 67.2 | 43.2 | 0.87 | 1.4 | 0.9 |
| 50 | 239.6 | 43.5 | 70 | 45 | 0.87 | 1.4 | 0.9 |

TABLE 6

| Fourth Ellipse E4 Embodiments | | | | | | | |
|---|---|---|---|---|---|---|---|
| D (ft) | θ (deg) | EORL (ft) | 4MajAL (ft) | 4MinAL (ft) | EORL/D | 4MajAL/D | 4MinAL/D |
| 2 | 235.7 | 1.526 | 1.88 | 0.88 | 0.763 | 0.94 | 0.44 |
| 3 | 235.7 | 2.289 | 2.82 | 1.32 | 0.763 | 0.94 | 0.44 |
| 4 | 235.7 | 3.052 | 3.76 | 1.76 | 0.763 | 0.94 | 0.44 |
| 5 | 235.7 | 3.815 | 4.7 | 2.2 | 0.763 | 0.94 | 0.44 |
| 6 | 235.7 | 4.578 | 5.64 | 2.64 | 0.763 | 0.94 | 0.44 |
| 7 | 235.7 | 5.341 | 6.58 | 3.08 | 0.763 | 0.94 | 0.44 |
| 8 | 235.7 | 6.104 | 7.52 | 3.52 | 0.763 | 0.94 | 0.44 |
| 9 | 235.7 | 6.867 | 8.46 | 3.96 | 0.763 | 0.94 | 0.44 |
| 10 | 235.7 | 7.63 | 9.4 | 4.4 | 0.763 | 0.94 | 0.44 |
| 11 | 235.7 | 8.393 | 10.34 | 4.84 | 0.763 | 0.94 | 0.44 |
| 12 | 235.7 | 9.156 | 11.28 | 5.28 | 0.763 | 0.94 | 0.44 |
| 12.5 | 235.7 | 9.5375 | 11.75 | 5.5 | 0.763 | 0.94 | 0.44 |
| 13 | 235.7 | 9.919 | 12.22 | 5.72 | 0.763 | 0.94 | 0.44 |
| 13.5 | 235.7 | 10.3005 | 12.69 | 5.94 | 0.763 | 0.94 | 0.44 |
| 14 | 235.7 | 10.682 | 13.16 | 6.16 | 0.763 | 0.94 | 0.44 |
| 15 | 235.7 | 11.445 | 14.1 | 6.6 | 0.763 | 0.94 | 0.44 |
| 16 | 235.7 | 12.208 | 15.04 | 7.04 | 0.763 | 0.94 | 0.44 |
| 18 | 235.7 | 13.734 | 16.92 | 7.92 | 0.763 | 0.94 | 0.44 |
| 20 | 235.7 | 15.26 | 18.8 | 8.8 | 0.763 | 0.94 | 0.44 |
| 21 | 235.7 | 16.023 | 19.74 | 9.24 | 0.763 | 0.94 | 0.44 |
| 22 | 235.7 | 16.786 | 20.68 | 9.68 | 0.763 | 0.94 | 0.44 |
| 24 | 235.7 | 18.312 | 22.56 | 10.56 | 0.763 | 0.94 | 0.44 |
| 29 | 235.7 | 22.127 | 27.26 | 12.76 | 0.763 | 0.94 | 0.44 |
| 33 | 235.7 | 25.179 | 31.02 | 14.52 | 0.763 | 0.94 | 0.44 |
| 35 | 235.7 | 26.705 | 32.9 | 15.4 | 0.763 | 0.94 | 0.44 |
| 40 | 235.7 | 30.52 | 37.6 | 17.6 | 0.763 | 0.94 | 0.44 |
| 45 | 235.7 | 34.335 | 42.3 | 19.8 | 0.763 | 0.94 | 0.44 |
| 48 | 235.7 | 36.624 | 45.12 | 21.12 | 0.763 | 0.94 | 0.44 |
| 50 | 235.7 | 38.15 | 47 | 22 | 0.763 | 0.94 | 0.44 |

Figure 8:
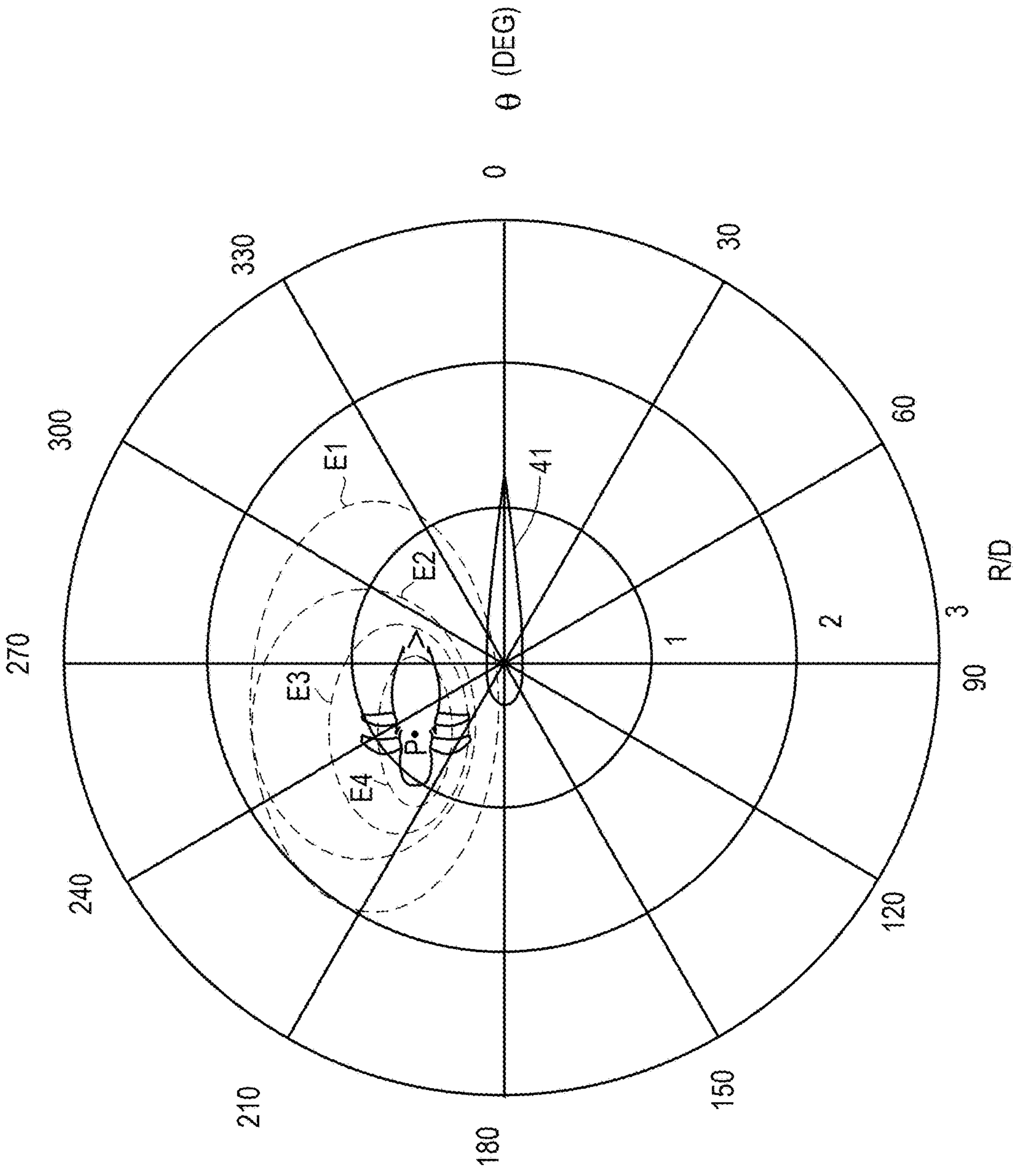
FIG. 8 comprises a schematic side elevation view similar to that of FIG. 7, but showing a first ellipse, a second ellipse, a third ellipse, and a fourth ellipse to illustrate various embodiments of mounting locations of one of the unducted fan propulsors relative to one of the horizontal stabilizers.

Referring to FIG. 8, the locations for P relative to the airfoil section and advantages therefrom described above can also be realized for an unducted fan propulsor system mounted above a horizontal stabilizer. For an unducted fan propulsor mounted to horizontal stabilizers, the foregoing examples and embodiments would be mirrored about the chord line of the airfoil section (again, for purposes of explanation, this chord line may be thought of as an axis passing through θ=0 deg and θ=180 deg in FIG. 11) for the case where the airfoil section 41 produces a lift in the downward direction, such as a horizontal stabilizer, as compared to a wing which produces a lift in the upward direction. The above descriptions for an undermount propulsor can apply, with the location being shifted as shown in FIG. 8 as compared to FIG. 7.

According to the foregoing examples or embodiments, the unducted fan propulsor 38, incorporating the vane assembly described herein, can be incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9. A propulsor that is part of an airplane that operates at a high cruise flight Mach number (e.g., greater than 0.7) encounters velocities near the surfaces of the rotor, vanes, and nacelle that approach or exceed the speed of sound, or Mach 1.0. In general, friction drag increases roughly in proportion to the square of the air velocity.

However, as the Mach number increases, a significant contributor to the increase in drag can come from wave drag. Wave drag is a drag resulting from shock waves that form as the flow of air near a surface becomes supersonic (e.g., Mach>1.0).

In addition to the cruise flight Mach number, another factor contributing to increased drag on propulsor surfaces is high non-dimensional cruise fan net thrust based on fan annular area and flight speed. The same acceleration of the air stream by the fan that produces thrust also tends to increase the drag force on the rotor, vanes, and nacelle.

Expressing thrust non-dimensionally in a way that accounts for flight speed, ambient conditions, and fan annular area yields a thrust parameter as follows:

$$\frac{F_{net}}{\rho_0 A_{an} V_0^2}$$

In the above thrust parameter, $F_{net}$ is cruise fan net thrust, $\rho_0$ is ambient air density, $V_o$ is cruise flight velocity, and $A_{an}$ is fan stream tube cross-sectional area at the fan inlet. Fan annular area, $A_{an}$, is computed using a maximum radius as the tip radius of the forward-most rotor blades and a minimum radius as the minimum radius of the fan stream tube entering the fan.

A propulsor that operates at a high cruise fan net thrust parameter (e.g., greater than 0.06) tends to have higher propulsor velocities with risk of higher drag on propulsor surfaces.

According to any of the foregoing examples or embodiments, there may be a particularly beneficial range of a dimensionless cruise fan net thrust parameter normalized by ambient density, cruise flight speed squared, and fan stream tube annular area at fan inlet defined by the following expression:

$$0.15 > \frac{F_{net}}{\rho_0 A_{an} V_0^2} > 0.06$$

Both a high cruise flight Mach and high dimensionless cruise fan net thrust parameter contribute to higher drag levels on the propulsor surfaces. Advantageously, the specific unducted fan propulsor positions relative to the wing airfoil section, as described herein, can increase unducted fan propulsor net thrust for a given power input when there is a high cruise flight Mach and a high dimensionless cruise fan net thrust parameter.

Using the conditions described herein, the specific regions for placing the unducted fan propulsor system can be located where there is a relatively higher pressure on the high pressure side of the airfoil, beneath the wings or above the horizontal stabilizers. The higher pressure provides increased thrust from the unducted fan propulsor to thereby offset drag penalties resulting from the installation of unducted fan propulsors.

The foregoing conditions for the placement of the propulsors relative to the wing airfoils can be present for any mounting configuration of the propulsors wing. While the mounting configuration can be fixed, it is contemplated that the mounting configuration could be variable. For example, the mounting configuration of an unducted fan propulsor relative to a wing could be different for takeoff as compared to cruise operating conditions. In such a scenario, the foregoing conditions for placement of the propulsors relative to the wing airfoils can be present in either or both operating conditions, or any other operating condition.

In certain aspects of the present disclosure, a heat exchanger is positioned within a substantially annular duct of the gas turbine engine. The heat exchanger is designed to achieve a thermal performance and an acoustic performance. In particular, as described in more detail below, the gas turbine engine may define an Effective Transmission Loss (ETL) for the heat exchanger. Additionally, or alternatively, one or more heat transfer sections of the heat exchanger may define an acoustic length that is tuned to a blade passing frequency of an upstream rotor assembly to improve noise attenuation at a specific operating condition, as defined by an Operational Acoustic Reduction Ratio (OARR).

Incorporating the heat exchanger technology with the specific unducted fan propulsor placement described previously can yield complementary benefits. Unducted fan propulsors present design challenges related to both aerodynamic installation effects and acoustic emissions. While the previously described relationship defines a placement of the propulsor relative to an airfoil to improve aerodynamic efficiency, the acoustic characteristics of such a propulsion system are also a consideration for aircraft design. Moreover, the installation location of the propulsor, as defined by the aforementioned aerodynamic relationship, may coincide with an location where acoustic treatment is particularly necessary or effective. This alignment presents an opportunity for an integrated solution.

The turbomachinery associated with an unducted fan propulsor generates noise, particularly during high-power operations such as takeoff and climb, which can contribute to community noise levels. A heat exchanger is often a necessary component for thermal management of various engine systems, such as a lubrication oil system or electronic systems. The present disclosure describes hereinbelow how this heat exchanger may also function as an acoustic attenuator. By further designing the heat exchanger with noise reduction capabilities, a need for separate, dedicated acoustic treatment solutions, which can add weight and complexity to the engine, may be reduced.

The ability to define an acoustic length of the heat exchanger to target a specific blade passing frequency is particularly beneficial for an unducted propulsor engine. In particular, the heat exchanger located within an annular duct of the engine can be "tuned" using the disclosed Operational Acoustic Reduction Ratio (OARR). This allows for the heat exchanger to balance the need for heat transfer with the need for sound attenuation at specific frequencies that are most prominent during certain flight phases, such as takeoff or approach. This targeted acoustic treatment, integrated into a necessary hardware component, complements the aerodynamic performance gains achieved by the specific propulsor placement relative to the wing.

Ultimately, the combination of these technologies provides a more complete design solution for integrating unducted fan propulsors onto an aircraft. The improved placement described previously addresses the challenge of installation drag to improve fuel efficiency. The acoustically-tuned heat exchanger, in turn, addresses the challenge of engine noise. By designing the propulsion system using both sets of relationships, an aircraft can be developed that is both highly efficient and acoustically compliant with operational requirements.

Referring now particularly to the heat exchanger having noise attenuation features, it will be appreciated that in certain exemplary embodiments of the present disclosure, a gas turbine engine defining a centerline and a circumferential direction is provided. The gas turbine engine may generally include a turbomachine and a fan assembly. The fan assembly may be driven by the turbomachine. The turbomachine, the fan assembly, or both may define a substantially annular flowpath relative to the centerline of the gas turbine engine. The gas turbine engine includes a heat exchanger positioned within the flow path and extending along the circumferential direction, such as substantially continuously along the circumferential direction. The heat exchanger may be fully annular, meaning completing an annulus, or partially annular such that a portion of the fluid traveling through the duct will not pass through a flow area of the heat exchanger flow while other portions will pass through the heat exchanger flow area.

A heat exchanger design for the gas turbine engine may be designed for flight idle conditions, such during a descent of an aircraft including the gas turbine engine. The objective, when designing the heat exchanger, may be generally stated as satisfying a minimum heat transfer capability from a hot fluid to a cold fluid for an acceptable amount of pressure drop across the heat exchanger. Key factors to consider include a mass flow rate through the duct at flight idle conditions and the type or characteristics of the selected heat exchanger.

A heat exchanger optimized for flight idle conditions however may turn out to be unacceptable during other flight conditions, such as during high power operating conditions where maximum thrust may be needed (e.g., takeoff, climb, turnaround during descent, etc.). During such periods a heat exchanger optimized for flight idle, it may become necessary to modify heat exchanger properties to improve its noise attenuation capability to meet community and/or cabin noise requirements. Given the complex nature of sound transmission through a fluid, heretofore a standard engineering practice has been to evaluate the acoustic environment for different flight conditions for a selected heat exchanger, or heat exchanger optimized for maximum heat transfer with acceptable pressure drop. And if it is expected that a chosen heat exchanger, that is, a heat exchanger optimized for pressure drop and heat transfer between fluids, does not provide a desired amount of noise reduction when air passes through the duct and internal surfaces of the heat exchanger, then the heat exchanger may need a re-design so that less noise is produced during the flight condition, e.g., takeoff. Thus, standard practice has been to optimize a heat exchanger for flight idle, evaluate whether that heat exchanger produces acceptable noise levels across a flight envelope (or rather permits an acceptable amount of noise to attenuate across the heat exchanger), and if it does not, re-design, that is, essentially start over and re-optimize the heat exchanger to reduce the amount of noise produced during the affected flight condition while still satisfying the heat transfer and/or maximum pressure drop requirements. It would be desirable to have an initial design or design requirements established for a heat exchanger at the beginning in order to avoid this iterative process; that is, establish the conditions or limitations on a heat exchanger satisfying engine architecture requirements accounting for acceptable pressure drop, desired transmission loss for air traveling through an annular duct, and heat transfer requirements at flight idle.

Figure 12:
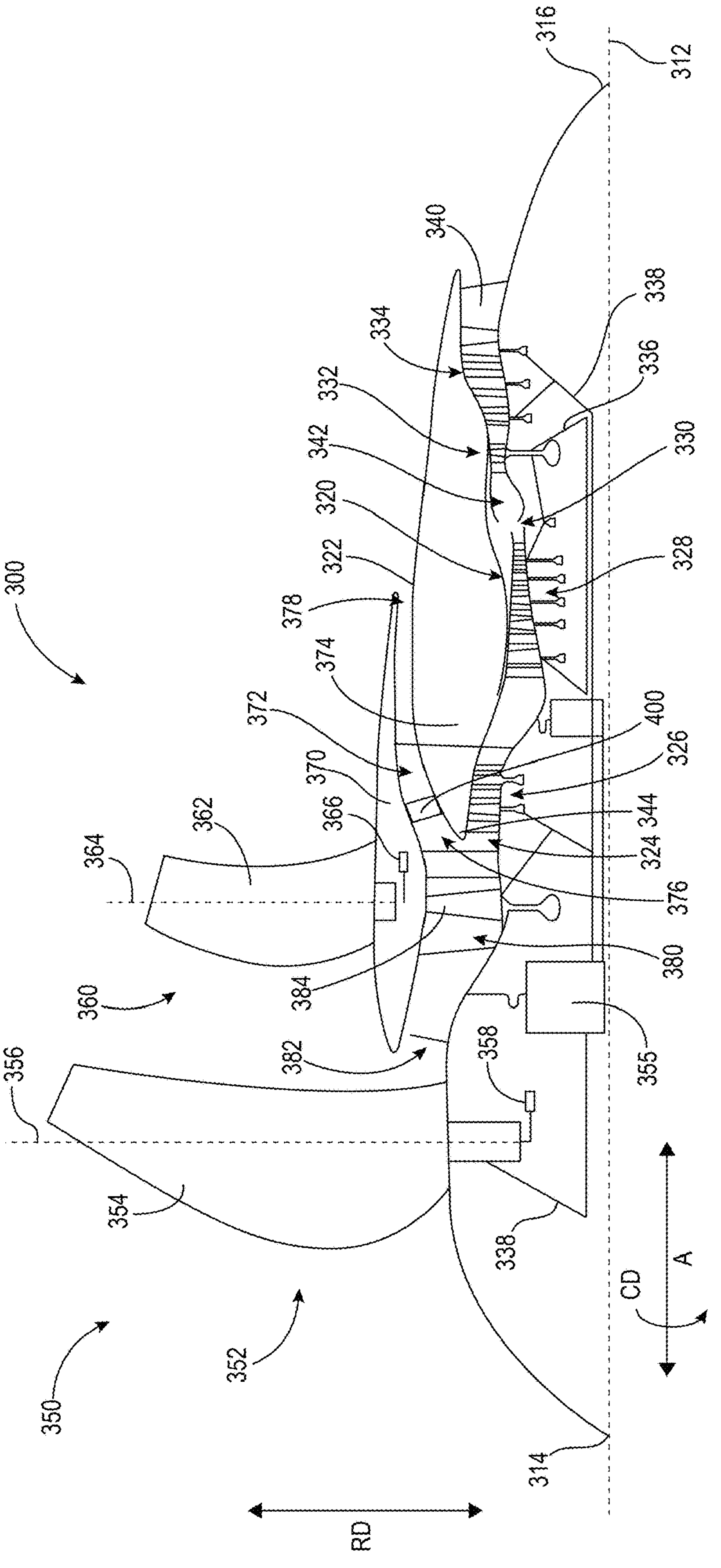
FIG. 12 is a schematic cross-sectional view of a three-stream engine in accordance with an exemplary embodiment of the present disclosure.
Figure 13:
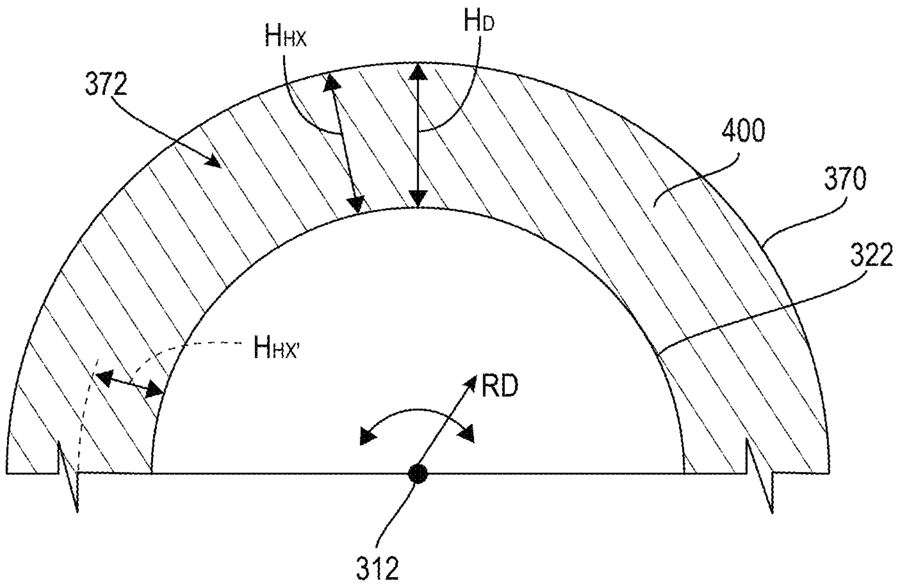
FIG. 13 is a schematic cross-sectional view of a heat exchanger and flowpath in accordance with an exemplary embodiment of the present disclosure.

The inventors' practice has proceeded in the manner of designing a heat exchanger, modifying the heat exchanger, and redesigning the heat exchanger to meet acoustic requirements, then checking acoustic response again, etc. during the design of several different types of turbomachines, such as those shown in FIGS. 12 and 13. The types of heat exchangers considered in these designs iterations (i.e., heat exchanger optimization vs. resulting acoustic environment) include heat exchanger designs that utilized one or more of a "fin-based" heat exchanger, "plate fin" heat exchanger, "shell and tube" heat exchanger, "counter-flow" heat exchanger, "onion" style heat exchanger, "any dedicated channel" heat exchanger, or the like. Examples of the turbomachine engines and heat exchanger types developed by the inventors follows.

Referring now back to the drawings, FIG. 12 is a schematic cross-sectional view of a gas turbine engine is provided according to another example embodiment of the present disclosure. Particularly, FIG. 12 provides an engine having a fan assembly with a single stage of unducted rotor blades. In such a manner, the fan assembly may be referred to herein as an "unducted fan," or the entire engine 300 may be referred to as an "unducted engine." In addition, the engine of FIG. 12 includes a third stream extending from the compressor section to a fan assembly flowpath over the turbomachine, as will be explained in more detail below.

For reference, the engine 300 defines an axial direction A, a radial direction RD, and a circumferential direction CD. Moreover, the engine 300 defines an axial centerline or longitudinal axis 312 that extends along the axial direction A. In general, the axial direction A extends parallel to the longitudinal axis 312, the radial direction RD extends outward from and inward to the longitudinal axis 312 in a direction orthogonal to the axial direction A, and the circumferential direction extends three hundred sixty degrees (360°) around the longitudinal axis 312. The engine 300 extends between a forward end 314 and an aft end 316, e.g., along the axial direction A.

The engine 300 includes a turbomachine 320 and a fan assembly, also referred to a fan section 350, positioned upstream thereof. Generally, the turbomachine 320 includes, in serial flow order, a compressor section, a combustion section, a turbine section, and an exhaust section. Particularly, as shown in FIG. 12, the turbomachine 320 includes a core cowl 322 that defines an annular core inlet 324. The core cowl 322 further encloses at least in part a low pressure system and a high pressure system. For example, the core cowl 322 depicted encloses and supports at least in part a booster or low pressure ("LP") compressor 326 for pressurizing the air that enters the turbomachine 320 through core inlet 324. A high pressure ("HP"), multi-stage, axial-flow compressor 328 receives pressurized air from the LP compressor 326 and further increases the pressure of the air. The pressurized air stream flows downstream to a combustor 330 of the combustion section where fuel is injected into the pressurized air stream and ignited to raise the temperature and energy level of the pressurized air.

It will be appreciated that as used herein, the terms "high/low speed" and "high/low pressure" are used with respect to the high pressure/high speed system and low pressure/low speed system interchangeably. Further, it will be appreciated that the terms "high" and "low" are used in this same context to distinguish the two systems, and are not meant to imply any absolute speed and/or pressure values.

The high energy combustion products flow from the combustor 330 downstream to a high pressure turbine 332. The high pressure turbine 328 drives the high pressure compressor 328 through a high pressure shaft 336. In this regard, the high pressure turbine 332 is drivingly coupled with the high pressure compressor 328. The high energy combustion products then flow to a low pressure turbine 334. The low pressure turbine 334 drives the low pressure compressor 326 and components of the fan section 350 through a low pressure shaft 338. In this regard, the low pressure turbine 334 is drivingly coupled with the low pressure compressor 336 and components of the fan section 350. The LP shaft 338 is coaxial with the HP shaft 336 in this example embodiment. After driving each of the turbines 332, 334, the combustion products exit the turbomachine 320 through a turbomachine exhaust nozzle 340.

Accordingly, the turbomachine 320 defines a working gas flowpath or core duct 342 that extends between the core inlet 324 and the turbomachine exhaust nozzle 340. The core duct 342 is an annular duct positioned generally inward of the core cowl 322 along the radial direction RD. The core duct 342 (e.g., the working gas flowpath through the turbomachine 320) may be referred to as a second stream.

The fan section 350 includes a fan 352, which is the primary fan in this example embodiment. For the depicted embodiment of FIG. 12, the fan 352 is an open rotor or unducted fan 352. As depicted, the fan 352 includes an array of fan blades 354 (only one shown in FIG. 12). The fan blades 354 are rotatable, e.g., about the longitudinal axis 312. As noted above, the fan 352 is drivingly coupled with the low pressure turbine 334 via the LP shaft 338. The fan 352 can be directly coupled with the LP shaft 338, e.g., in a direct-drive configuration. However, for the embodiments shown in FIG. 12, the fan 352 is coupled with the LP shaft 338 via a speed reduction gearbox 355, e.g., in an indirect-drive or geared-drive configuration.

Moreover, the fan blades 354 can be arranged in equal spacing around the longitudinal axis 312. Each blade 354 has a root and a tip and a span defined therebetween. Each blade 354 defines a central blade axis 356. For this embodiment, each blade 354 of the fan 352 is rotatable about their respective central blades axes 356, e.g., in unison with one another. One or more actuators 358 are provided to facilitate such rotation and therefore may be used to change a pitch the blades 354 about their respective central blades axes 356.

The fan section 350 further includes a fan guide vane array 360 that includes fan guide vanes 362 (only one shown in FIG. 12) disposed around the longitudinal axis 312. For this embodiment, the fan guide vanes 362 are not rotatable about the longitudinal axis 312. Each fan guide vane 362 has a root and a tip and a span defined therebetween. The fan guide vanes 362 may be unshrouded as shown in FIG. 12 or, alternatively, may be shrouded, e.g., by an annular shroud spaced outward from the tips of the fan guide vanes 362 along the radial direction RD or attached to the fan guide vanes 362.

Each fan guide vane 362 defines a central blade axis 364. For this embodiment, each fan guide vane 362 of the fan guide vane array 360 is rotatable about their respective central blades axes 364, e.g., in unison with one another. One or more actuators 366 are provided to facilitate such rotation and therefore may be used to change a pitch of the fan guide vane 362 about their respective central blades axes 364. However, in other embodiments, each fan guide vane 362 may be fixed or unable to be pitched about its central blade axis 364. The fan guide vanes 362 are mounted to a fan cowl 370.

As shown in FIG. 12, in addition to the fan 352, which is unducted, a ducted fan 384 is included aft of the fan 352, such that the engine 300 includes both a ducted and an unducted fan which both serve to generate thrust through the movement of air without passage through at least a portion of the turbomachine 320 (e.g., the HP compressor 328 and combustion section for the embodiment depicted). The ducted fan is shown at about the same axial location as the fan blade 354, and radially inward of the fan blade 354. The ducted fan 384 is, for the embodiment depicted, driven by the low pressure turbine 334 (e.g. coupled to the LP shaft 338).

The fan cowl 370 annularly encases at least a portion of the core cowl 322 and is generally positioned outward of at least a portion of the core cowl 322 along the radial direction RD. Particularly, a downstream section of the fan cowl 370 extends over a forward portion of the core cowl 322 to define a fan flowpath or fan duct 372. The fan flowpath or fan duct 372 may be referred to as a third stream of the engine 300.

Incoming air may enter through the fan duct 372 through a fan duct inlet 376 and may exit through a fan exhaust nozzle 378 to produce propulsive thrust. The fan duct 372 is an annular duct positioned generally outward of the core duct 342 along the radial direction RD. The fan cowl 370 and the core cowl 322 are connected together and supported by a plurality of substantially radially-extending, circumferentially-spaced stationary struts 374 (only one shown in FIG. 12). The stationary struts 374 may each be aerodynamically contoured to direct air flowing thereby. Other struts in addition to the stationary struts 374 may be used to connect and support the fan cowl 370 and/or core cowl 322. In many embodiments, the fan duct 372 and the core duct 342 may at least partially co-extend (generally axially) on opposite sides (e.g., opposite radial sides) of the core cowl 322. For example, the fan duct 372 and the core duct 342 may each extend directly from the leading edge 344 of the core cowl 322 and may partially co-extend generally axially on opposite radial sides of the core cowl.

The engine 300 also defines or includes an inlet duct 380. The inlet duct 380 extends between an engine inlet 382 and the core inlet 324/fan duct inlet 376. The engine inlet 382 is defined generally at the forward end of the fan cowl 370 and is positioned between the fan 352 and the array of fan guide vanes 360 along the axial direction A. The inlet duct 380 is an annular duct that is positioned inward of the fan cowl 370 along the radial direction RD. Air flowing downstream along the inlet duct 380 is split, not necessarily evenly, into the core duct 342 and the fan duct 372 by a splitter or leading edge 344 of the core cowl 322. The inlet duct 380 is wider than the core duct 342 along the radial direction RD. The inlet duct 380 is also wider than the fan duct 372 along the radial direction RD.

As will be appreciated, a first portion of air received by the fan 352 is provided through the engine inlet 382, and a second portion of the air received by the fan 352 is provided over the fan cowl 370 and core cowl 322. A ratio of the second portion of air to the first portion of air is referred to as a bypass ratio of the engine 300. During operation of the engine 300 in a high power operating condition, the bypass ratio may be between 2.9 and 45, such as at least 4.5, such as at least 6, such as at least 10, such as at least 12, such as up to 35, such as up to 25.

In exemplary embodiments, air passing through the fan duct 372 may be relatively cooler (e.g., lower temperature) than one or more fluids utilized in the turbomachine 320. In this way, one or more heat exchangers 400 may be disposed within the fan duct 372 and utilized to cool one or more fluids from the core engine with the air passing through the fan duct 372, as a resource for removing heat from a fluid, e.g., compressor bleed air, oil or fuel.

Although not depicted, in certain exemplary embodiments, the engine 300 may further include one or more heat exchangers 400 in other annular ducts or flowpath of the engine 300, such as in the inlet duct 380, in the turbomachinery flowpath/core duct 342, within the turbine section and/or turbomachine exhaust nozzle 340, etc.

In at least certain exemplary embodiments, the heat exchanger(s) 400 of FIG. 12 may extend in the circumferential direction CD as well as in the radial direction RD across the annular duct or flowpath of the engine 300. For example, referring now briefly to FIG. 13, providing a partial cross-sectional view of the heat exchanger 400 of FIG. 12, it will be appreciated that the heat exchanger 400 may extend substantially continuously in the circumferential direction CD and across an entirety of the annular duct or flowpath in the radial direction RD.

With respect to extending substantially continuously in the circumferential direction CD, the heat exchanger 400 may extend substantially 360 degrees in the circumferential direction CD, about the longitudinal axis 312.

In particular, it will be appreciated that in one or more of these example embodiments, the exchanger 400 may extend along the circumferential direction CD within the flowpath for at least about 30 degrees of the annular or substantially annular passage, such as at least 90 degrees, such as at least 150 degrees, such as at least 180 degrees, such as at least 240 degrees, such as at least 300 degrees, such as at least 330 degrees. Additionally, or alternatively, in certain exemplary embodiments, the exchanger 400 may extend substantially continuously along the circumferential direction CD within the flowpath (e.g., for at least about 345 degrees of the annular or substantially annular passage), or continuously along the circumferential direction CD within the flowpath (e.g., for 360 degrees of the annular passage).

In additional or alternative embodiments, however, the heat exchanger 400 may be positioned in any other annular or substantially annular passage, such as within the exhaust section as, e.g., a waste heat recovery heat exchanger. The heat exchanger 400 in the exhaust section may again be an annular heat exchanger, and may be configured to receive heat from the combustion gases.

With respect to extending in the radial direction RD, the exemplary heat exchanger 400 depicted extends completely across the annular duct or flowpath in the radial direction RD. In particular, the heat exchanger 400 shown is positioned in the fan duct 372, defining a duct height, $H_D$, in the radial direction RD at the location along the axial direction A. The heat exchanger 400 defines a heat exchanger height, $H_{HX}$, in the radial direction RD also at the location along the axial direction A. The heat exchanger height, $H_{HX}$, is equal to the duct height, $H_D$, at the location along the axial direction A for the embodiment shown.

Notably, as used herein, the term "duct height, $H_D$" of an annular duct or flowpath refers to a length along the radial direction RD from an inner wall of the duct or flowpath along the radial direction RD to an outer wall or boundary of the duct or flowpath along the radial direction RD, at a location along the axial direction A. For example, in the embodiment depicted, the duct height, $H_D$, of the fan duct 372 is a length along the radial direction RD from the core cowl 322 to the fan cowl 370 at the location along the axial direction A. To the extent the length varies at different circumferential locations at the location along the axial direction A, the term duct height, $H_D$, refers to an average duct height, $H_D$, at the location along the axial direction A. Further the term, "heat exchanger height, $H_{HX}$" refers to a length of the heat exchanger 400 along the radial direction RD at the location along the axial direction A within the duct or flowpath. Accordingly, in the embodiment shown, since the heat exchanger 400 extends completely across the fan duct 372, the heat exchanger height, $H_{HX}$, is equal to the duct height, $H_D$, at the location along the axial direction A.

In some embodiments the heat exchanger 400 extends between 10% and 100% of the duct height, such as between 12% and 30% of the duct height. For example, a heat exchanger height, $H_{HX}$, of a heat exchanger located downstream of the fan 384 and within the substantially annular fan duct 372, is greater than 10% of the duct height, $H_D$, at the location along the axial direction A, and less than 100% of the duct height, $H_D$ (see, e.g., heat exchanger height, $H_{HX}'$, depicted in phantom in FIG. 13). For example, the heat exchanger height, $H_{HX}$, may be greater than or equal to 15% of the duct height, $H_D$, such as greater than or equal to 20% of the duct height, $H_D$, greater than or equal to 30% of the duct height, $H_D$, or greater than or equal to 50% of the duct height, $H_D$, at the location along the axial direction A. In such a configuration, the heat exchanger 400 may be positioned on an inner wall of the duct (e.g., the core cowl 322), on an outer wall of the duct (e.g., the fan cowl 370), or suspended therebetween through one or more supports.

Further, referring still to FIG. 13, it will be appreciated that, as noted above, the fan duct 372 in which the heat exchanger 400 is positioned is an annular duct, or rather a full annular duct, in that it extends continuously and uninterrupted in the circumferential direction CD. In other embodiments, however, the fan duct 372, or a portion of the fan duct 372 in which the heat exchanger 400 is positioned, or another duct or flowpath in which the heat exchanger 400 is positioned, may be a partially annular duct.

Figure 14:
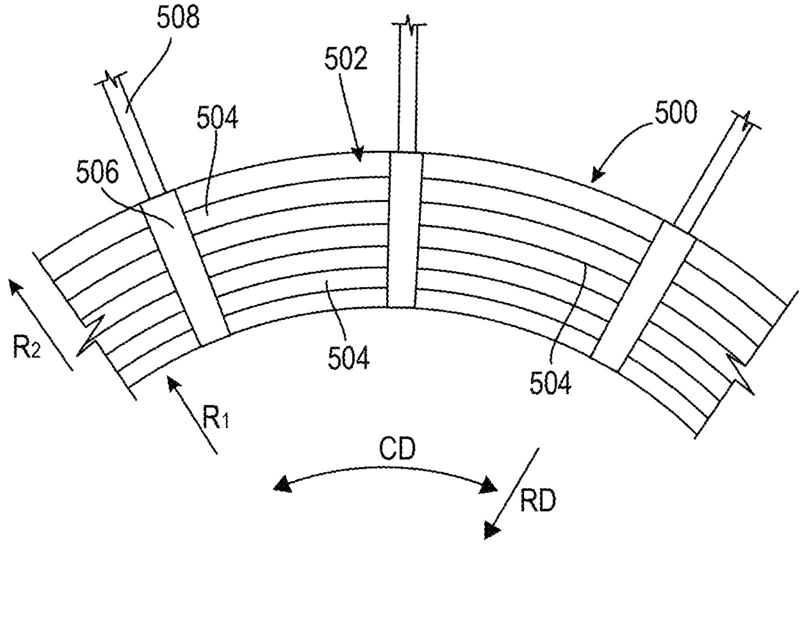
FIG. 14 is a schematic cross-sectional view of a heat exchanger and flowpath in accordance with another exemplary embodiment of the present disclosure.

More specifically, still, referring now also to FIG. 14, a close-up, cross-sectional view of a heat exchanger 500 positioned within a flowpath 502 is provided. In at least certain exemplary embodiments, the heat exchanger 500 and flowpath 502 may be configured in a similar manner as the exemplary heat exchanger 400 and flowpath (e.g., fan duct 372) described above with reference to FIG. 12.

For the embodiment of FIG. 14, the heat exchanger 500 is configured as a tube-based heat exchanger 500, including a plurality of channels or tubes 504 extending through the flowpath 502. The heat exchanger 500 further includes a plurality of manifolds 506, with each manifold 506 fluidly coupled to a thermal fluid line 508, which may be a supply line or return line. In such a manner, the heat exchanger 500 may be configured to exchange heat from a thermal fluid through the plurality of tubes 504 to an airflow through the flowpath 502.

It will be appreciated that the number, size, and configuration of the tubes 504, manifolds 506, etc. are provided by way of example only and that in other exemplary embodiments, the heat exchanger 500 may have any other suitable configuration. Further, although the exemplary heat exchanger 500 depicted in FIG. 14 extends continuously in the circumferential direction CD, it will be appreciated that in other exemplary embodiments, the heat exchanger 500 may be a plurality of discrete heat exchangers 500 arranged in the circumferential direction CD. The plurality of discrete heat exchangers 500 may collectively extend substantially continuously in the circumferential direction CD, with only relatively small gaps or spacing between the adjacent heat exchangers 500. With such a configuration, the plurality of discrete heat exchanger 500 may collectively extend along the circumferential direction CD within the flowpath for at least about 180 degrees, such as at least 240 degrees, such as at least 300 degrees, such as at least 330 degrees, such as at least about 345 degrees of the annular or substantially annular passage, or continuously along the circumferential direction CD within the flowpath (e.g., for 360 degrees of the annular passage). Notably, the ranges of porosity described herein and provided below account for any small gaps or spacing between adjacent heat exchangers 500, as well as for arrangements where the heat exchanger 500 otherwise does not extend completely through the flowpath in the circumferential direction CD.

Moreover, although for the embodiment of FIG. 14 a single row of channels or tubes 504 are depicted extending in the circumferential direction CD, it will be appreciated that the heat exchanger 500 may include multiple channels or tubes 504 arranged along the axial direction A at each layer of tubes 504, e.g., for each of the three layers depicted in FIG. 14. Moreover, although the channels or tubes 504 are depicted extending generally in the circumferential direction CD in FIG. 14, in other embodiments, the tubes 504 may additionally or alternatively extend along the axial direction A, such that the heat exchanger 500 includes a number of tubes arranged along the circumferential direction CD at each layer. The number of axially-extending channels at a particular layer of the heat exchanger 500 may be referred to as the channel density of heat exchanger 500.

As will also be appreciated, the flowpath 502 defines a flowpath flow area Af. The flowpath flow area Af generally refers to a cross-sectional area of the flowpath 502, and more specifically refers to the cross-sectional area of the flowpath 502, excluding the heat exchanger 500, at a location where the heat exchanger 500 is located. For a perfectly annular flowpath 502, the flowpath flow area Af may be defined by $(R_2^2-R_1^2)\times\pi$, wherein R2 is an outer radius of the flowpath 502 and R1 is an inner radius of the flowpath 502. In addition, the heat exchanger 500 defines a heat exchanger flow area Ah. The heat exchanger flow area Ah may refer to a minimum cross-sectional area of an open path through the heat exchanger 500. For the embodiment shown, the heat exchanger flow area Ah may be calculated as the flowpath flow area Af minus a cross-sectional area of each of the tubes 504 and manifolds 506 of the heat exchanger 500 depicted in FIG. 14. A ratio of the heat exchanger flow area Ah to the flowpath flow area Af may generally be referred to as a porosity of the heat exchanger 500.

It will be appreciated, however, that in other exemplary embodiments, the heat exchanger 500 may have any other suitable configuration. For example, referring now to FIG. 15, a schematic perspective view of a heat exchanger 500 in accordance with another exemplary embodiment of the present disclosure is provided. The heat exchanger 500 defines an axial direction A, a radial direction RD, and a circumferential direction CD. When installed within a gas turbine engine, the axial, radial, and circumferential direction A, R, C of the heat exchanger may align with the axial, radial, and circumferential direction A, R, C of the gas turbine engine. As will be appreciated from the embodiment of FIG. 15, in other exemplary embodiments the heat exchanger 500 may be a fin-based heat exchanger 500. Specifically, for the embodiment of FIG. 15, the heat exchanger 500 includes a plurality of plates 510, a first plurality of fins 512 extending between adjacent plates 510, and a second plurality of fins 514 also extending between adjacent plates 510 and opposite one of the plates 510 from the first plurality of fins 512. A first fluid flow may travel through the first plurality of fins 512, and a second fluid flow may travel through the second plurality of fins 514. Heat may travel from the first fluid flow, through the first plurality of fins 512, through a plate 510 positioned between the first and second pluralities of fins 512, 514, to the second plurality of fins 514 and to the second fluid flow (or alternatively may flow in reverse). As is depicted, there may be several layers of first and second pluralities of fins 512, 514 and plates 510.

Figure 15:
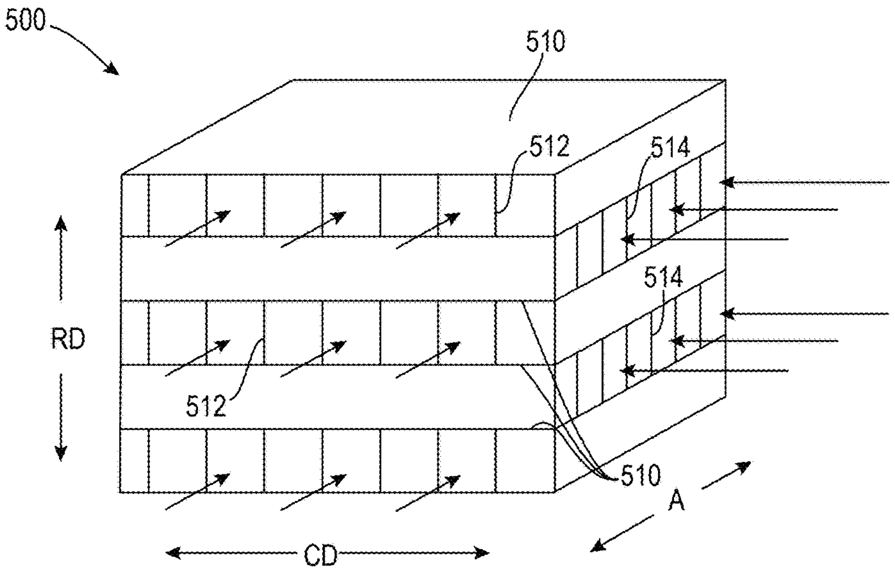
FIG. 15 is an exploded perspective view of a heat exchanger in accordance with another exemplary embodiment of the present disclosure.
Figure 16:
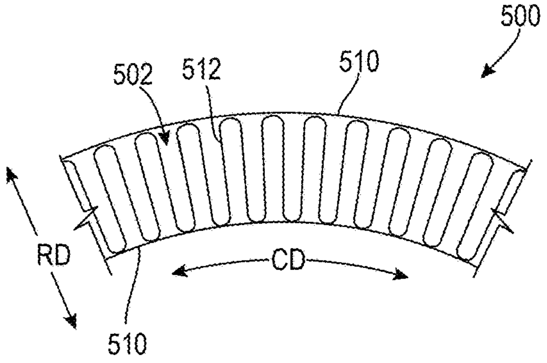
FIG. 16 is a schematic cross-sectional view of the exemplary heat exchanger of FIG. 15 in a flowpath in accordance with an exemplary embodiment of the present disclosure.

Referring now also briefly to FIG. 16, providing a schematic view of one layer the heat exchanger 500 of FIG. 15 positioned within the flowpath 502, as viewed along the centerline of the engine, it will be appreciated that heat exchanger 500 of FIG. 15 defines a relatively large heat exchanger flow area Ah (at least as compared to the exemplary heat exchanger 500 FIG. 14). The layer shown in FIG. 16 is the first plurality of fins 512. The heat exchanger 500 may further include a second plurality of fins 514 opposite plate 510 and, e.g., outside of the flowpath.

However, referring back to FIG. 15, it will also be appreciated that the fins of the first plurality of fins 512 may define a relatively long length in the flowpath direction, along the axial direction A for the embodiment shown. As the length of the fins 514 increases, an effectiveness E of the heat exchanger 500 may generally increase as well, as the increase in length provides greater surface area to facilitate heat exchange with the airflow through the flowpath 502.

The heat exchanger 500 of FIG. 15 may have an approximately constant cross-sectional area along its length (i.e., along the axial direction A for the embodiment depicted) or it may have two or more changes in this area over its length. When there are changes in its length, the heat exchanger has more than one heat transfer sections and associated acoustic lengths. This property of the heat exchanger offers opportunity in reducing noise attenuation for different flight conditions, as explained in greater detail, below.

It will be appreciated, however, that in still other exemplary embodiments, the heat exchanger 500 may have still other suitable configurations. For example, in other exemplary embodiments, the heat exchanger 500 may be one or more of a pin-fin heat exchanger, a tube-shell heat exchanger, a tube-sheet heat exchanger, or a counter-flow heat exchanger.

Figure 17:
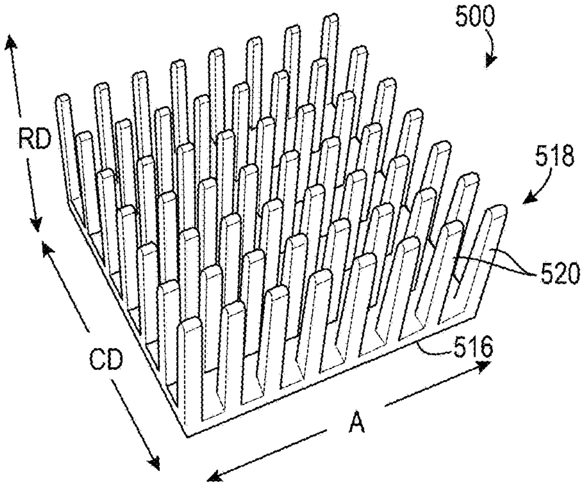
FIG. 17 is a schematic perspective view of a heat exchanger in accordance with yet another exemplary embodiment of the present disclosure.

More specifically, referring to FIG. 17, providing a perspective, partial view of a heat exchanger 500 in accordance with another exemplary embodiment of the present disclosure, in other exemplary embodiments the heat exchanger 500 may be a pin-fin heat exchanger 500. With such a configuration, the heat exchanger 500 includes a plate 516 and a plurality of fins 518 extending from the plate 516, the plurality of fins 518 are spaced along the circumferential direction CD. However, for the exemplary heat exchanger 500 FIG. 17, the fins 518 are further separated into discrete "pins 520" spaced along the axial direction A. In such a manner, the fins 518 may create more turbulence in the airflow through the heat exchanger 500, increasing amount of heat exchange with the airflow through the heat exchanger 500.

Figure 19:
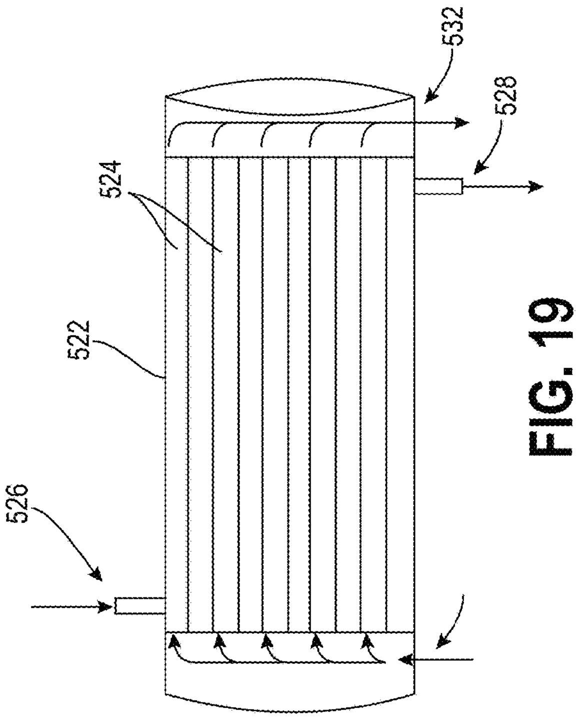
FIG. 19 is a schematic perspective view of a heat exchanger in accordance with yet another exemplary embodiment of the present disclosure.
Figure 18:
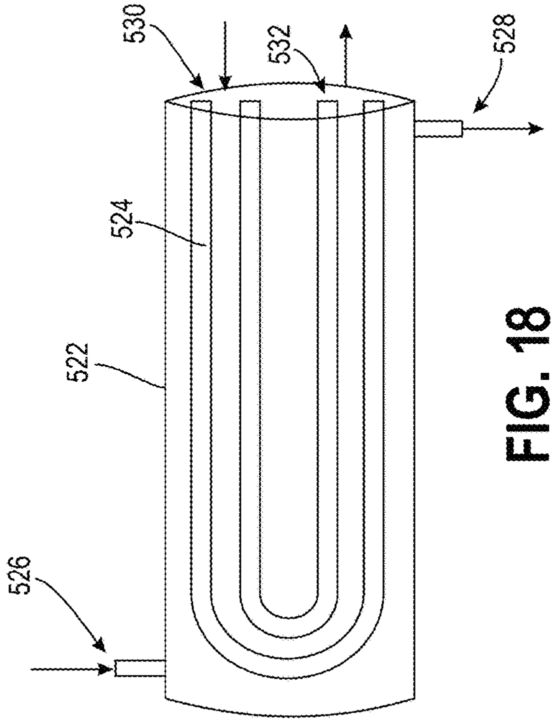
FIG. 18 is a schematic perspective view of a heat exchanger in accordance with yet another exemplary embodiment of the present disclosure.
Figure 20:
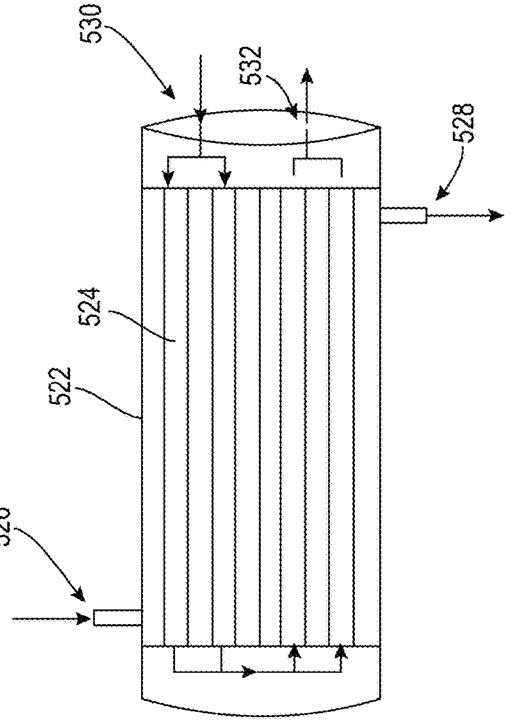
FIG. 20 is a schematic perspective view of a heat exchanger in accordance with yet another exemplary embodiment of the present disclosure.

Referring to FIGS. 18 through 20, schematic views of three separate heat exchangers are provided in accordance with various other exemplary embodiments of the present disclosure. More specifically, the heat exchangers 500 of FIGS. 18 through 20 are each configured as shell-and-tube heat exchangers. These heat exchangers 500 each include an outer shell 522 and one or more tubes 524 positioned within the outer shell 522. Further, the heat exchangers 500 each define a first fluid inlet 526 and a first fluid outlet 528 in flow communication with an interior of the outer shell 522, as well as a second fluid inlet 530 and a second fluid outlet 532 in flow communication with the one or more tubes 524. In FIG. 18, the heat exchanger 500 includes the one or more tubes 524 in a "U-tube" configuration. In FIG. 19, the heat exchanger 500 includes the one or more tubes 524 in a single pass configuration. In FIG. 20, the heat exchanger 500 includes the one or more tubes 524 in a double pass configuration.

Figure 21:
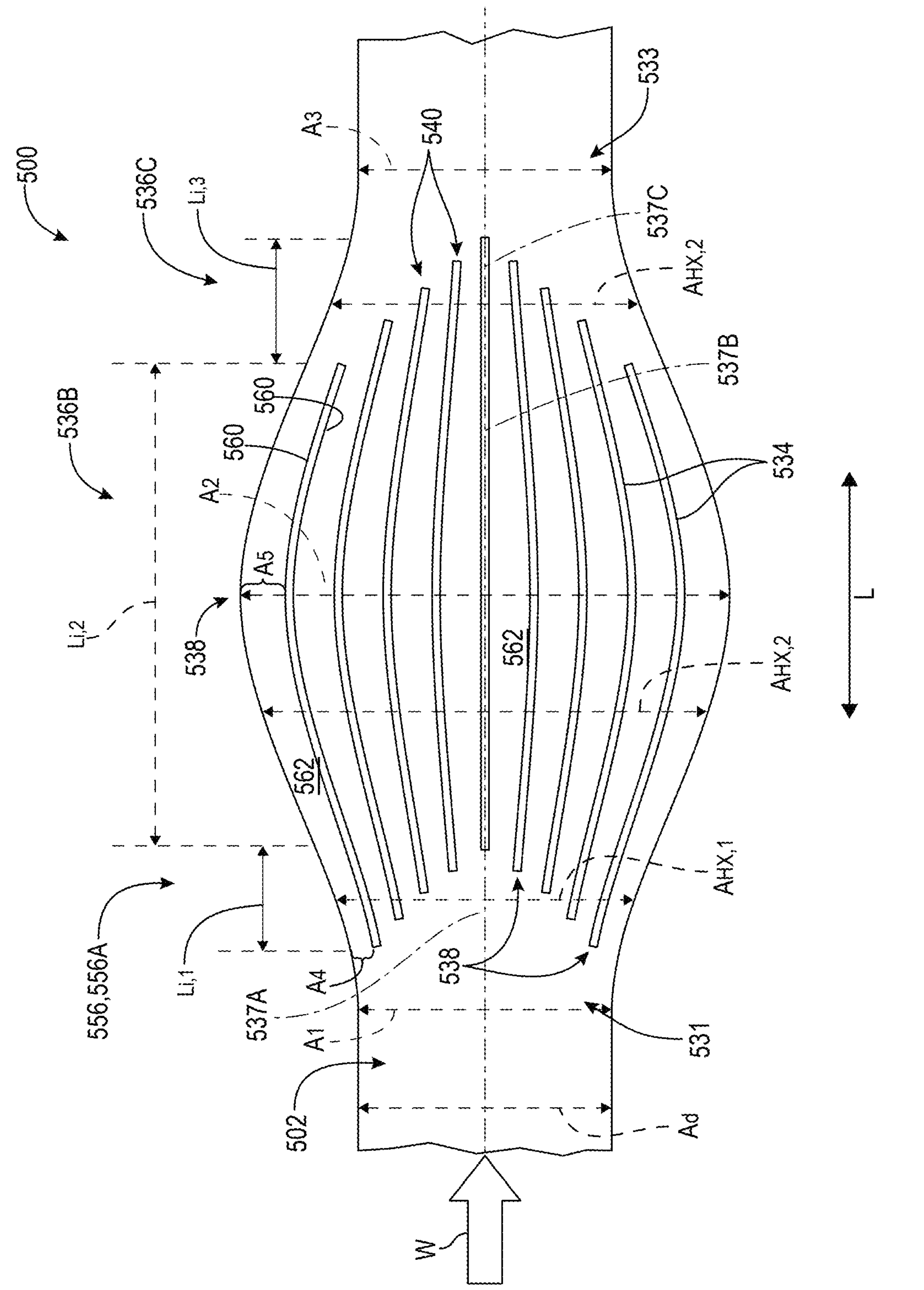
FIG. 21 is a schematic cross-sectional view of a heat exchanger in a flowpath in accordance with an exemplary embodiment of the present disclosure.

Referring now specifically to FIG. 21, a heat exchanger 500 in accordance with another exemplary embodiment of the present disclosure is provided. The view of FIG. 21 is a cross-sectional view of an "onion" heat exchanger 500 positioned in a flowpath 502. The heat exchanger 500 generally defines an inlet 530 at an upstream end and an outlet 533 at a downstream end. The heat exchanger 500 further includes a plurality of fins 534 extending generally lengthwise between the inlet 530 and the outlet 533.

Notably, the heat exchanger 500 of FIG. 21 differs from the heat exchangers 500 described hereinabove in that the heat exchanger 500 of FIG. 21 includes a plurality of discrete heat transfer sections 536 arranged in series. In particular, the heat exchanger 500 includes a first heat transfer section 536A, a second heat transfer section 536B, and a third heat transfer section 536C. As will be appreciated from the description herein, a heat transfer section refers to a portion of a heat exchanger having a unique heat transfer structural profile relative to an adjacent portion of the heat exchanger along a length of the heat exchanger, as well as a change in a cross-sectional area relative to the adjacent portion of the heat exchanger or an adjacent portion of a duct within which the heat exchanger is positioned.

The first heat transfer section 536A defines a first acoustic length $L_{i,1}$ in a lengthwise direction L of the heat exchanger 500 (and more specifically along a centerline 537A of the first heat transfer section 536A) and a first cross-sectional area, $A_{HX,1}$. The second heat transfer section 536B defines a second acoustic length $L_{i,2}$ in the lengthwise direction L of the heat exchanger 500 (and more specifically along a centerline 537B of the second heat transfer section 536B) and a second cross-sectional area, $A_{HX,2}$. The third heat transfer section 536C defines a third acoustic length $L_{i,3}$ in the lengthwise direction L of the heat exchanger 500 (and more specifically along a centerline 537C of the third heat transfer section 536C) and a third cross-sectional area, $A_{HX,3}$. The first cross-sectional area, $A_{HX,1}$ is an average (i.e., mean) cross-sectional area across the first acoustic length $L_{i,1}$. The second cross-sectional area, $A_{HX,2}$ is an average cross-section areal across the second acoustic length $L_{i,2}$. The third cross-sectional area, $A_{HX,3}$ is an average cross-section areal across the third acoustic length $L_{i,3}$. The first, second, and third cross-sectional areas at any given location may be calculated in the same manner as the heat exchanger flow area Ah described with reference to the embodiments above.

In the embodiment of FIG. 21, each of the fins 534 extend between an upstream end 538 and a downstream end 540. In the embodiment depicted, the upstream ends 538 of the fins 534 are staggered, such that the first heat transfer section 536A is characterized by a plurality of non-continuous fins 534 therethrough, in addition to an expanding cross-sectional area relative to a cross-sectional area of the flowpath 502 ("duct flow area", $A_d$) at a location immediately upstream of the inlet 530 to the heat exchanger 500.

The second heat transfer section 536B is characterized by continuous fins 534 therethrough, in addition to a diverging and converging cross-sectional area relative to the first cross-section area, $A_{HX,1}$.

Similar to the upstream ends 538, the downstream ends 540 of the fins 534 are also staggered, such that the third heat transfer section 536C is characterized by a plurality of non-continuous fins 534 therethrough, in addition to a converging cross-sectional area relative to the second cross-section area, $A_{HX,2}$ and a cross-sectional area of the flowpath 502 immediately downstream of the outlet 533 of the heat exchanger 500 (which is equal to the cross-sectional area of the flowpath 502 ($A_d$) at the location immediately upstream of the inlet 530 to the heat exchanger 500 for the embodiment depicted).

Figure 22:
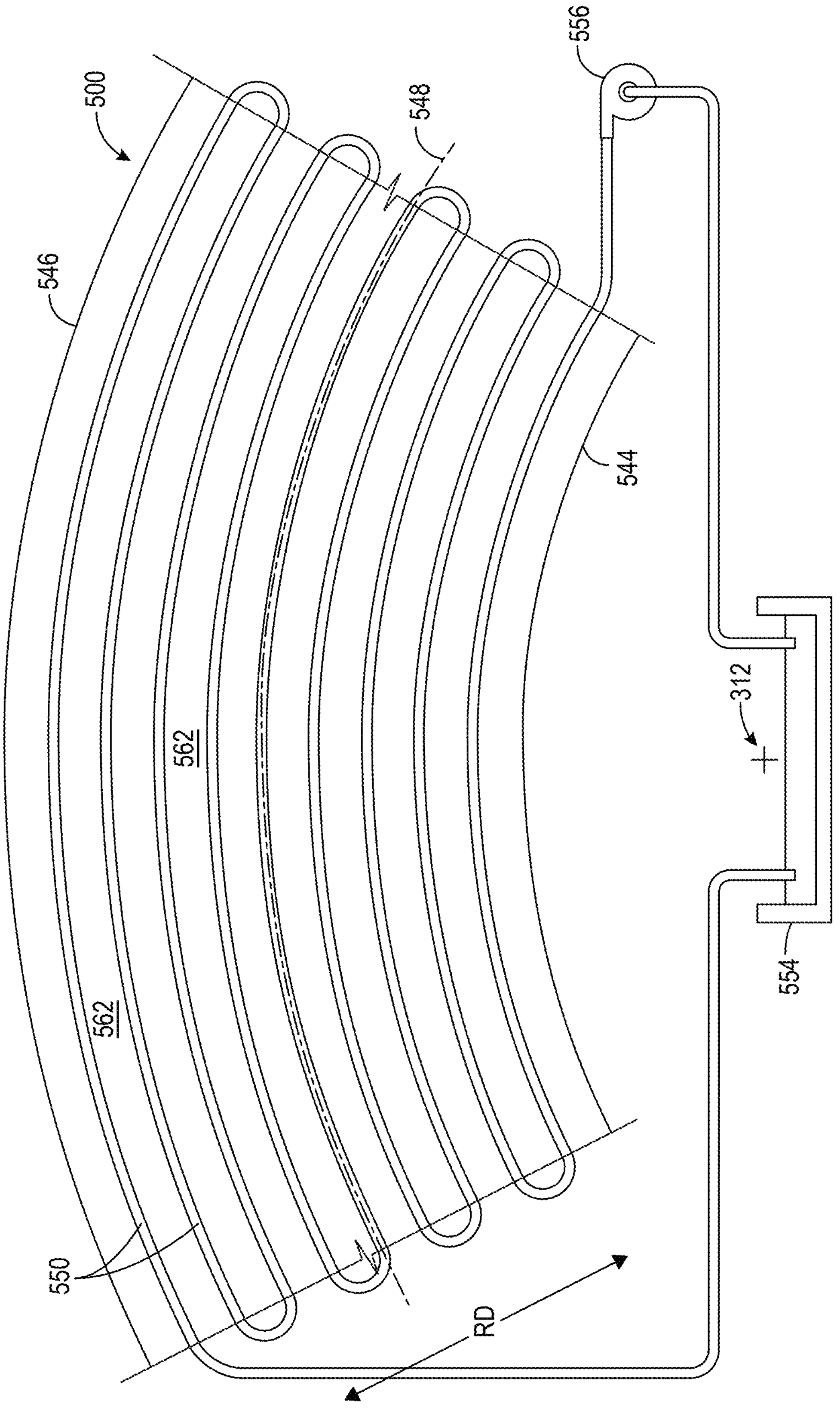
FIG. 22 is a cross-sectional view of the heat exchanger of FIG. 21.

Referring briefly to FIG. 22, the heat exchanger 500 includes an inner peripheral wall 544 and an outer peripheral wall 546 along the radial direction RD, and may be configured as one or more partially or wholly arcuate bodies, formed by partial or complete revolution about an axis exterior to the peripheral walls 544, 546, for example the axial centerline 212. A midline 548 represents an abstract surface that divides the flow-orthogonal area between the inner and outer peripheral walls 544, 546 into two parts, which may have approximately equal flow areas.

Figure 23:
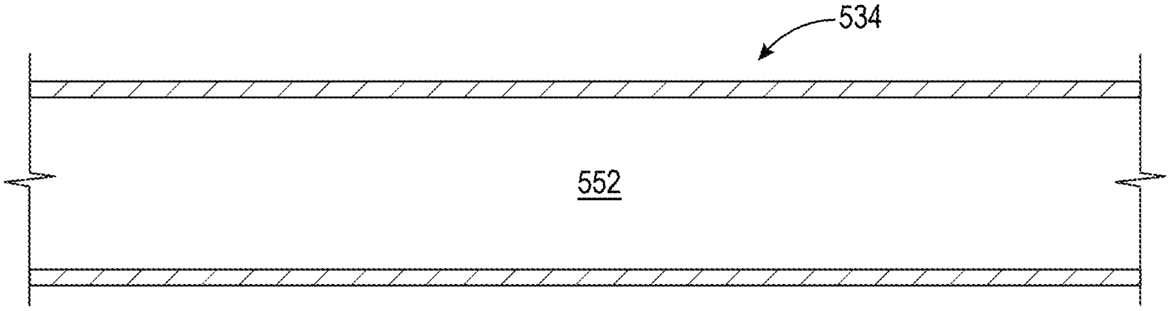
FIG. 23 is a partially sectioned view of a portion of a fin of the heat exchanger of FIG. 22.

Moreover, referring briefly also to FIG. 23, a heat transfer structure of the heat exchanger 500 may include one or more channels for conducting flow of a second fluid (e.g. oil, fuel or some other coolant). For example, FIG. 23 illustrates a small portion of a fin 534. The fin 534 incorporates a hollow inner passage 552 which can accommodate the flow of fluid. The inner passage 552 may be integral to the fin 534 or constructed as a separate component. It may take any of a number of shapes. FIG. 22 shows the fins 534 having the above-mentioned interior passages coupled to a circulating system which includes a reservoir 554, a pump 556, and appropriate interconnections such as pipes, manifolds, and/or valves (not labeled) to permit the circulation of the second fluid from the reservoir through the fins 534.

In operation, the first fluid flows through the flowpath 502 and over the fins 534. A second fluid circulates through the interior of the fins 534. For example, the second fluid may be supplied at a higher temperature than the first fluid. Depending upon the relative temperatures of the first and second fluids, heat is transferred either from the first fluid into the fins 534, then to the second fluid, or from the second fluid into the fins 534, then to the first fluid. As the first fluid flows from the inlet 531 to a belly 558 (FIG. 21; described below), it diffuses, reducing its velocity and increasing its static pressure. The fins 534 act as turning vanes, as well as diffuser walls, allowing the first fluid to diffuse without separating from the peripheral walls 544, 546. As the first fluid passes downstream, it is re-accelerated to an appropriate Mach number for the downstream flowpath. Analysis has shown that the heat exchanger 500 can achieve a pressure loss of less than 2% and a heat exchange rate equal to that of a prior art heat exchanger.

It will be appreciated that the inner passage 552 of each fin 534 may extend substantially along the length of the respective fin 534 in a fluid flow direction of the heat exchanger 500 (a fluid flow direction of the second fluid; e.g., the lengthwise direction L in FIGS. 21 through 23; as is indicated schematically with the hollow fins 534 in FIG. 21). For example, the inner passage 552 of each fin 534 may extend at least 70% of the length of the respective fin 534 in the fluid flow direction of the heat exchanger 500, such as at least 75%, such as at least 80%, such as at least 85%, such as at least 90%.

In addition, for the embodiment depicted, the fins 534 each extend continuously from their respective upstream ends 538 to their respective downstream ends 540. With such a configuration, the upstream ends 538 of one or more of the fins 534 may be positioned at a first location where flowpath begins to diverge (the flowpath 502 defining a constant height upstream of the first location) and the downstream ends 540 of one or more of the fins 534 may be positioned at a second location with the flowpath stops converging (the flowpath 502 defining a constant height downstream of the second location).

Referring back to FIG. 21, the heat exchanger 500 further defines a cross-sectional, flow area A1 at the inlet 531; a cross-sectional, flow area A2 at the belly 558; and a cross-sectional, flow area A3 at the outlet 533. The areas A1, A2, A3 may be set to define a desired diffusion rate to suit a specific application. As one example, the flow area A2/A1 may be selected to achieve a desired Mach number at a belly 558 given a specific inlet Mach number. For example, the Mach number at the inlet 531 might be 0.5 (plus or minus 10%), and could be approximately for example 0.2 (plus or minus 10%) at the belly 558. The flow area A2 may be greater than the flow area A1. In one example, the flow area A2 could be at least 30% greater than the flow area A1. In another example, the flow area A2 could be at least 50% greater than the flow area A1. In yet another example, the flow area A2 could be at least 100% greater than the flow area A1, and up to 1000% greater.

In the illustrated example, the third flow area A3 is less than the second flow area A2, thus defining a nozzle or converging portion. The ratio of the flow areas A3/A2 and the rate of change between the two, that is, the profile shape of the peripheral walls 544, 546, may be selected to suit a specific application. For example, if the Mach number at the inlet 531 is 0.5, is for example 0.2 at the belly 558, the nozzle could be configured to re-accelerate the flow to Mach 0.5 (plus or minus 10%) at the outlet 533. As will be explained below relative to an alternative embodiment, the nozzle is desirable for certain applications, but is not required to achieve the functional benefit of the heat exchanger 500. Also, it is noted that a section of constant area (neither diffusing nor accelerating) may be positioned downstream of the belly 558.

Referring to the plurality of spaced-apart fins 534, each of the fins 534 has opposed side walls 560 extending between the upstream end 538 and the downstream end 540. The fins 534 subdivide the flowpath 502 into a plurality of generally parallel flow passages 562.

Each of the flow passages 562 has a flow area at its upstream end, designated "A4", and a flow area at the belly 558, designated "A5". The outermost passage is shown in the example in FIG. 21. The fins 534 are configured such that each flow passage 562 acts as a diffuser, or stated another way the flow area A5 is greater than the flow area A4. Analysis has shown that it is beneficial for reducing flow losses if the flow passages 562 are configured so as to have similar or equal diffusion ratios, or stated another way, for the ratio A4/A5 to be approximately equal for each flow passage 562. It is also beneficial for reducing flow losses if the flow passages 562 are configured so as to have similar or equal diffusion rates as defined above.

The fins 534 are shaped and sized so as to act as turning vanes, that is to turn the flow of the first fluid in an axial-radial plane (the plane depicted in FIG. 21) in a manner so as to prevent flow separation from the wall surfaces. The specific degree of flow turning will depend upon the shape of the mean line of the fins 534 and their angle of attack relative to the fluid flow.

Each of the fins 534 presents area blockage of the flowpath 502 equal to its frontal area. In order to mitigate the effect of the area blockage, the upstream ends 538 of the fins 534 may be arranged in a staggered configuration. In the illustrated example, the upstream ends 538 of the fins 534 adjacent the peripheral walls 544, 546 are positioned the most upstream or axially forward, with the upstream end 538 of each successive fin 534 proceeding towards the midline 548 being located downstream or axially aft from its outboard neighbor.

The staggered configuration may be arranged such that flow blockage of the fins 534 is introduced (considered from a flow point of view) at a rate similar to or less than the increase in flow area due to the divergence of the peripheral walls 544, 546.

For example, at the inlet 531, which is upstream of the upstream ends 538 of the outermost fins 534, the flow area is completely open (no fin blockage).

Downstream of the upstream ends 538 of the outermost fins 534, an increased flow area is defined between the peripheral walls 544, 546. At this downstream station, the flowpath 502 includes a blockage equivalent to the frontal area of the two most distal fins 534. The open flow area at this station is at least equal to the first flow area A1 plus the frontal area of the two most distal fins 534. A similar configuration is repeated at successive downstream locations to complete the staggered fin configuration. The illustrated stagger pattern is "V" shaped or chevron shaped, but other specific arrangements are possible.

The effect of the staggered fin location described above is that flow of the first fluid is always diffusing as it proceeds downstream from the inlet 531 to the belly 558.

In the illustrated example, the fins 534 are depicted as being arcuate, annular, or extending parallel to an axis. In essence, their shape variation is two-dimensional. It is physically possible to include fins which are oriented in a different direction than what is shown. For example, the fins could lie in an axial-radial plane. Alternatively, the fins could be oriented as shown but could additionally include stiffeners, supports, or dividers oriented in a different direction, such as an axial-radial plane. However, it will be understood that to achieve the maximum benefit of the concept described herein, the fins or other internal structure should be oriented generally parallel to the peripheral walls 544, 546 such that the diffuser effect can be maintained by manipulating the distance between the peripheral walls 544, 546 and the distance between the fins.

Optionally, structures such as waves, ripples, or ridges (not shown) along the exterior surfaces of the fins 534 could be included to create additional heat transfer surface area. If still more heat transfer surface area is required, secondary fins (not shown) running substantially perpendicular to the primary fin surfaces could be added to create passages with more heat transfer surface area.

The interior of at least one of the fins 534 includes a heat transfer structure. As used herein, the term "heat transfer structure" refers to a structure which functions to transfer heat energy from one area or region in contact with the heat transfer structure to another area or region which is also in contact with the heat transfer structure and which is spaced-away from the first area or region. Known heat transfer mechanisms include conduction, convection, and radiation. The heat transfer structure may use some or all of these heat transfer mechanisms.

In one example, the heat transfer structure may comprise a solid conduction element (not shown) disposed inside the fin 534 such as bars, rods, or plates having a high heat transfer coefficient. For example, a metal alloy such as copper or aluminum could be used for this purpose.

In another example, the heat transfer structure may comprise one or more heat pipes of a known type (not shown) disposed inside the fin 534.

It will be appreciated that in other exemplary embodiments, a heat exchanger may be provided having any suitable number of heat transfer sections defining respective acoustic lengths and cross-sectional areas. For example, the heat exchanger may define a single heat transfer section, two heat transfer sections (see, e.g., FIG. 30), three heat transfer sections, four heat transfer sections, five heat transfer sections (see, e.g., FIG. 31), etc.

In such a manner, it will be appreciated that the heat exchangers 500 of FIGS. 18 through 23 may be arranged in a parallel flow configuration where the second fluid flows in the same direction as the first fluid (see, e.g., FIG. 19), in a counter flow configuration where the second fluid flows in an opposite direction than the first fluid, or in a combination of parallel and counter-flow configurations (see, e.g., FIGS. 18 and 21).

As will also be appreciated, each of the heat exchangers 500 are configured to transfer heat from a heating fluid (e.g., the fluid rejecting heat) to a cooling fluid (e.g., the fluid accepting heat). By way of example, when the heat exchanger 500 is integrated into the engine 300 of FIG. 12, e.g., in the fan duct 372 as heat exchanger 400, the cooling fluid may be an airflow through the fan duct 372 and the heating fluid may be, e.g., compressor bleed air (an air-to-air heat exchanger), fuel (a fuel-to-air heat exchanger), or lubrication oil (an oil-to-air heat exchange).

As alluded to earlier, standard practice has been to optimize the heat exchanger for a flight idle (or other condition) then, after selecting an optimal heat exchanger, verifying whether it will operate in an acceptable manner across a flight envelop from a heat transfer perspective. Further, the inventors have found that it would also be beneficial to verify whether it will operate in an acceptable manner across a flight envelop from the perspective of noise produced when air flows through an annular duct. This can be a labor and time intensive process because the process is iterative and involves the selection of a heat exchanger designed for flight idle and embodying a heat effectiveness with acceptable pressure drop, then evaluating whether at other times in flight (non-flight idle) the annular duct location produces unacceptable levels of noise (or rather allows for an unacceptable level of noise to pass therethrough), thereby necessitating re-design of the heat exchanger to increase the acoustic transmission loss for air passing through the annular duct. That is, the heat exchanger is selected according to a size, type, etc. before a heat exchanger is found that satisfies all three key requirements: heat transfer, acceptable pressure drop, and acceptable noise generation across all flight conditions. It would be desirable to have a limited or narrowed range of embodiments defined for an engine architecture satisfying mission requirements, such requirements including heat transfer, pressure ratio, and noise transmission level requirements at the time a heat exchanger is selected and located within an engine.

The inventors discovered, unexpectedly during the course of engine design—i.e., designing heat exchangers and evaluating the impact that the heat exchangers would have on the acoustic environment at off-design points, which is the time-consuming iterative process just described—a relationship between an expected noise transmission loss for the heat exchanger and the heat transfer capabilities for a given level of pressure drop across the heat exchanger. The pressure drop is incorporated into the parameter UA, as it is a function of a porosity, which is a function of the area, A. Utilizing this relationship the inventors found that the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such benefit provides more insight to the requirements for a given engine well before specific technologies, integration and system requirements are developed fully. It avoids late-stage redesign. And it also provides heat exchanger design that integrates both acoustic and heat exchanger considerations for a gas turbine engine for an aircraft given its unique environments. The desired relationship is represented by an Effective Transmission Loss ("ETL"):

$$ETL = C_1 e^{-C_2\left(\frac{EOC-UA}{C_3}\right)} \quad \text{Equation (1)}$$

Where $C_1$, $C_2$, and $C_3$ are constants that depend on the mass flow rate through the annular duct. EOC accounts for factors influenced by engine sizing and operating conditions, explained in greater detail, below. Constants $C_1$, $C_2$, and $C_3$ and EOC each depend on the flight condition, and more specifically depend on a mass flow rate of an airflow through the annular duct occupied by the heat exchanger ("W"). The ETL represents a level of transmission loss (in units of decibels, dB) that can be expected from a heat exchanger for a given mass flow rate, W, and UA. A more detailed fluid model may also be desired at a later point to determine more exactly a transmission loss for a specific flight condition once the engine architecture is more fully defined. The mass flow rates of interest, for purposes of the ETL, are characterized as low, medium, and high mass flow rate conditions. The lowest mass flow rate may correspond to a low power operating condition of the engine (e.g., ground idle, flight idle), the medium mass flow rate may correspond to a medium power operating condition (e.g., cruise or descent), and the high mass flow rate may correspond to a high power operating condition (e.g., a takeoff operating condition or climb operating condition).

TABLE 7 provides values for $C_1$, $C_2$, and $C_3$ and EOC for three flight regimes, defined in terms of mass flow rates through the annular duct where the heat exchanger is located:

TABLE 7

| | 0 < W < 50 lbm/s | 50 lbm/s < W < 150 lbm/s | 150 lbm/s < W < 300 lbm/s |
|---|---|---|---|
| $C_1$ | 19.22 | 19.64 | 21.02 |
| $C_2$ | 0.222 | 0.67 | 0.027 |
| $C_3$ | 956.3 | 298 | 107 |
| EOC | 41,467 to 19,965 | 52,809 to 16,677 | 50,347 to 12,587 |

$C_1$, $C_2$, and $C_3$ and EOC reflect the variation in the mass flow through the annular duct of the engine during a variety of operating conditions—generally the low power operating condition, the medium power operating condition, and the high power operating condition—as stated above. EOC additionally accounts for variability based on a specific engine operating condition within each of these flow regimes (low/med/high). EOC accounts for such factors as the specific engine type operating in the flow regime, expected variation in transient thrust, ambient conditions, tolerances and/or engine cycles or degradation, all of which may have some influence on the transmission loss for flow passing through a heat exchanger located in an annular duct. It will be realized, based on the teachings herein, ETL, for the ranges of EOC expressed, provides to a good approximation the available heat exchanger design options suited to meet mission requirements, both from a thermal management and acoustics perspective. More accurate knowledge on transmission loss may latter be gathered, if desired, by performing a full 3D CFD analysis of the acoustic field. This level of analysis may not be necessary, however, when the purpose is to assess the acoustic environment at an off-design point before proceeding with optimization of a heat exchanger. As alluded to above, ETL eliminates infeasible designs at an early stage, before the heat exchanger located in an annular duct is optimized. In one respect therefore ETL may be viewed as an alternative to performing a full-blown 3D CFD analysis of a flow field prior to heat exchanger optimization within an annular duct.

Moreover, it will be appreciated that transmission loss through a heat exchanger is further influenced by the length of the heat exchanger, the porosity of the heat exchanger, a pressure drop across the heat exchanger, the mass flow rate through the annular duct in which the heat exchanger is positioned, and the power spectral density (PSD) distribution of the air immediately upstream of the heat exchanger.

For example, in general as the length of the heat exchanger increases, the amount of acoustic transmission loss also increases. This factor influences the value for $C_2$. The length of the heat exchanger, sometimes also referred to as channel length, directly influences a volume (along with an area of the heat exchanger) for the fluid to pass through. With an increased volume, the amount of transmission loss generally also increases.

The pressure drop across the heat exchanger is incorporated into Equation 1 (ETL) through the UA parameter, as noted above. The ETL contemplates a maximum pressure drop of 15%, such as up to 10% and at least 1%. Generally, as the area of the heat exchanger increases (and as the porosity of the heat exchanger increases), a pressure drop will also increase. Typically, higher pressure drops are also associated with more heat transfer. However, a pressure drop above these levels may impact a thrust produced by the airflow through the duct too much to justify the thermal benefits.

More specifically, it was found that for low power operating conditions (e.g., for flow rates less than or equal to about 50 lbm/s), an ETL of between 1 and 5 dBs may be achieved with a relatively low pressure drop, such as a pressure drop of less than or equal to about 5%, such as less than or equal to about 2.5%. It was also found that for medium power operating conditions (e.g., for flow rates greater than or equal to about 50 lbm/s and less than or equal to about 150 lbm/s), an ETL of between 1 and 5 dBs may be achieved with a pressure drop within design limits, such as less than or equal to about 15% (and, e.g., greater than or equal to about 2%). It was further found that for high power operating conditions (e.g., for flow rates greater than or equal to about 150 lbm/s and less than or equal to about 300 lbm/s), an ETL of between 1 and 3 dBs can be achieved while maintaining the pressure drop less than about 15%. As described above, the pressure drop is a function of UA, as it is a function of the area of the heat exchanger. It was found that with the higher mass flow rates, the effect of heat exchanger area on pressure drop increases, resulting in more pressure drop for a given amount of ETL as compared to lower mass flow rate.

The PSD is determined from the upstream fan or turbine characteristics (e.g., the mid-fan 384 upstream of heat exchanger 400 in FIG. 12, or turbine 334 upstream of heat exchanger 400 in FIG. 12) and specifically, those upstream characteristics producing a PSD distribution over frequency bands where it has been found that a majority of the noise is typically produced during an engine mission segment, e.g., during takeoff Noise characteristics associated with an upstream fan are expressed in terms of a blade passing frequency, which with respect to the upstream fan is defined as the rotations per second of an immediately upstream fan or turbine multiplied by a number of fan blades of the immediately upstream fan or rotor blades in an immediately upstream turbine stage, respectively. For example, referring to the embodiment shown in FIG. 12, the blade passing frequency for the noise source associated with the heat exchanger 400 located in the third stream annular duct, or rather the fan flow duct 372, would be found from the rotations per second of the fan 384 multiplied by the number of blades for the fan 384. In another example, referring still to the embodiment shown in FIG. 12, the blade passing frequency for the noise source associated with the heat exchanger 400 located in the aft frame would be found from the rotations per second of the low pressure turbine 334 multiplied by the number of turbine rotor blades associated with the aft-most stage of the lower pressure turbine 334.

Sound transmission through the heat exchanger is generally the byproduct of many complex interactions between sound waves and interior surfaces of the heat exchanger, which generally requires a detailed fluid modeling of air traveling through the heat exchanger to fully assess the sound transmission environment for a specific flight condition (e.g., takeoff or full power flight condition), as mentioned earlier. Moreover, the fan or rotor speed that produces the most noise may not necessarily occur when an engine is operating at full power. As such, noise environments are generally modeled for a variety of flight conditions, not merely at a full power condition. Nonetheless, the inventors discovered that there are indeed assumptions that can be made on the level of transmission loss that can be expected for a heat exchanger (optimized for flight idle conditions) during the other, non-flight idle periods of flight where the most noise is produced. As a result, feasible embodiments of a heat exchanger for given engine operating environments may be found, using the ETL, satisfying both thermal and acoustics requirements. These embodiments of a heat exchanger take into account the competing interests associated with transmission loss needs, maximum acceptable pressure drop and heat transfer efficiency. With embodiments defined in this manner, a substantial amount of heat exchanger re-design may be avoided, as alluded to earlier. For example, a heat exchanger located in an annular duct is optimized for engine performance during flight idle conditions. When the engine is later evaluated for its acoustic performance, e.g., using a 3D CFD analysis, it is discovered that the configuration does not produce an adequate amount of transmission loss when air passes through the annular duct. Such a heat exchanger would then need to be re-designed because there is too much noise generated ETL was found by evaluating the effects on transmission loss and overall heat exchanger effectiveness for different levels of pressure drop, the geometry of the heat exchanger and its relation to transmission loss. Based on these relationships it was discovered that the ETL for a heat exchanger can predict to a good approximation the transmission loss expected for a given mass flow rate through the heat exchanger, as a function of UA and the general properties of the heat exchanger, as set forth in TABLE 2, which define the operating environments and heat exchanger properties used to find the ETL. Thus, with a heat exchanger located in an annular duct and defined within these ranges, the ETL can predict the transmission loss from the heat exchanger for a prescribed mass flow rate and UA.

TABLE 8

| Symbol | Description | Ranges appropriate for using Eq. (1) |
|---|---|---|
| UA | Product of the overall heat transfer coefficient (U; in "Btu/(hr × ft$^2$ × ° F.)") for the heat exchanger and interior surface area (A; in "ft$^2$") of the heat exchanger in units: Btu/(hr-° F.). | 7500 < UA < 45000, such as 10000 < UA < 35000 (low power); 14000 < UA < 45000 (medium power); and 15000 < UA < 44000 (high power). |
| Delta-P/P | Ratio of change in pressure to total pressure (%) representing maximum allowable pressure drop across heat exchanger | <15%, such as <10%, such as <8%, such as >1% |
| L | Length of heat exchanger (in) | 3 inches to 15 inches, such as 4 inches to 9 inches |
| Po | Porosity | 20% to 80%, such as 30% to 55% |
| F | Blade passing frequency (RPM/60 * number of blades) | 600 Hertz (Hz) to 12.5 kilohertz (kHz), such as from 1 kHz to 5 kHz |
| W | Mass flow rate | See TABLE 7. |

It will be appreciated from, e.g., Equation (1) and the units provided for the parameters in TABLE 8, the units for $C_1$, $C_2$, and $C_3$ and EOC are such that ETL is provided in dB's (as noted above and discussed throughout). For example, the units for $C_1$ may be dB's, $C_2$ may be unitless, and $C_3$ and EOC may each be in the same units as UA (i.e., Btu/(hr-° F.)).

Figures 24, 25:
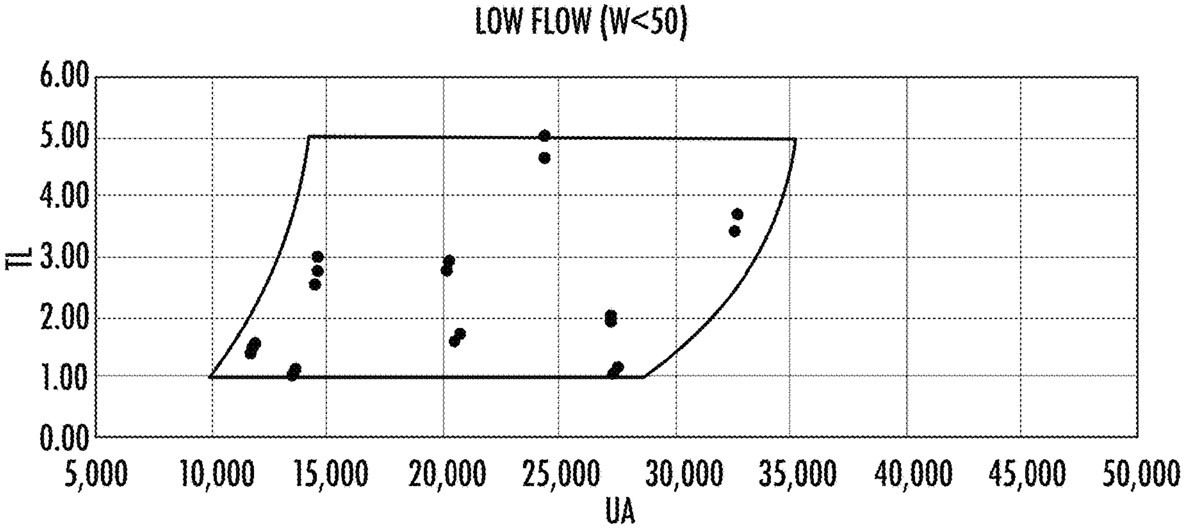
FIG. 24 is a plot of heat exchangers in accordance with one or more exemplary embodiments of the present disclosure, showing the relationships between the ETL and UA for a low mass flow rate.
FIG. 25 provides a table including numerical values corresponding to several of the plotted ETL values in FIG. 24.
Figures 26, 27:
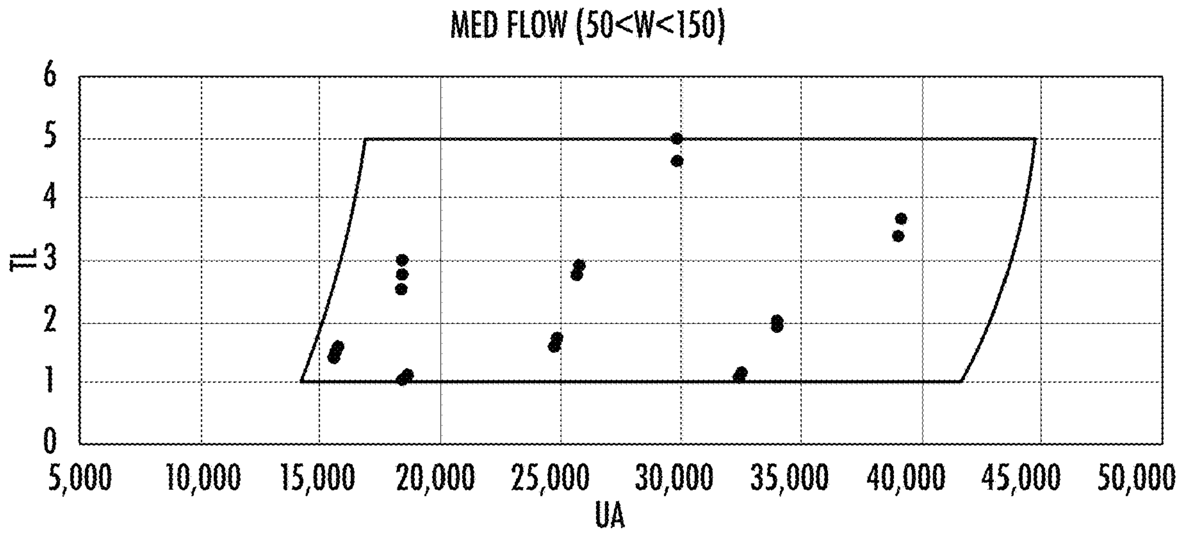
FIG. 26 is a plot of heat exchangers in accordance with one or more exemplary embodiments of the present disclosure, showing the relationships between the ETL and UA for a medium mass flow rate.
FIG. 27 provides a table including numerical values corresponding to several of the plotted ETL values in FIG. 26.
Figures 28, 29:
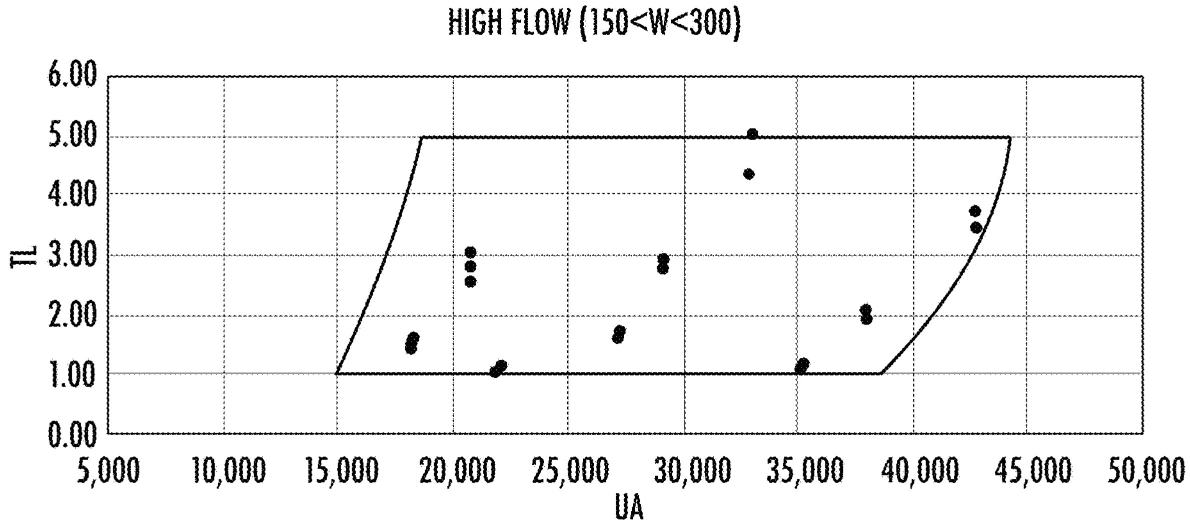
FIG. 28 is a plot of heat exchangers in accordance with one or more exemplary embodiments of the present disclosure, showing the relationships between the ETL and UA for a high mass flow rate.
FIG. 29 provides a table including numerical values corresponding to several of the plotted ETL values in FIG. 28.

FIGS. 24 through 29 illustrate heat exchangers in accordance with one or more exemplary embodiments of the present disclosure, showing the relationships between the ETL and UA. In particular, FIG. 24 is a plot of heat exchangers in accordance with one or more exemplary embodiments of the present disclosure, showing the relationships between the ETL and UA for a low mass flow rate and FIG. 25 provides a table including numerical values corresponding to several of the plotted ETL values in FIG. 24. FIG. 26 is a plot of heat exchangers in accordance with one or more exemplary embodiments of the present disclosure, showing the relationships between the ETL and UA for a medium mass flow rate and FIG. 27 provides a table including numerical values corresponding to several of the plotted ETL values in FIG. 26. And FIG. 28 is a plot of heat exchangers in accordance with one or more exemplary embodiments of the present disclosure, showing the relationships between the ETL and UA for a high mass flow rate and FIG. 29 provides a table including numerical values corresponding to several of the plotted ETL values in FIG. 28.

In each of FIGS. 24, 26, and 28, the solid lines enveloping the embodiments express the ranges for TL and UA, as provided by the range of variable EOC. The TL range is 5 decibels down to 1 decibel. The UA range varies between the low, medium, and high mass flow rates, but is generally between 7,500 and 45,000 Btu/(hr-° F.). The embodiments within this range include embodiments of heat exchangers having lengths (measured in flow direction, which according to the embodiments corresponds to a cold-flow length property of the heat exchanger) between 3 inches and 9 inches, and heat exchanger porosity between 23% and 51%.

The present disclosure is not limited to heat exchangers within the ranges in the embodiment depicted in FIGS. 24 through 29. For example, in other embodiments, a heat exchanger of the present disclosure may be, e.g., up to 15 inches in length, and may define a porosity up to 80%.

This disclosure is directed to heat exchangers in annular ducts where an upstream fan, compressor or turbine generates gas flow through a duct leading to the heat exchanger. For noise attenuation targeted operating conditions, i.e., flight segment where an undesired level of noise is generated, one may make modifications to one or more of the heat exchanger's "acoustic length" (as defined herein) to increase the ETL for that flight segment, that is, to specifically target noise attenuation for a specific flight segment. It was found, in connection with ETL, that this type of targeted noise attenuation may be achieved by selecting an acoustic length for a blade passing frequency associated with the flight segment. While this can result in less heat transfer efficiency due to the adjusted acoustic length, it was discovered unexpectedly that the impact was not significant. Utilizing the ETL in combination with this "tuning" of an acoustic length to a flight segment resulted in higher levels of attenuation for the targeted flight segment.

Utilizing this relationship the inventors found that an engine may be designed to utilize a heat exchanger in a substantially annular duct of the engine to achieve a desired noise level during a particular flight operation that may not otherwise be achievable absent other non-desirable structural or control changes to the engine, and while satisfying the heat transfer efficiencies needed from the heat exchanger. In addition, inventors found that utilizing this relationship, the number of suitable or feasible heat exchangers to be positioned in a substantially annular duct of an engine capable of meeting both the heat transfer requirements and acoustic requirements could be greatly diminished, thereby facilitating a more rapid down selection of designs to consider as an engine is being developed. Such a development may therefore avoid late-stage redesign. And it also provides heat exchanger design that integrates both acoustic and heat exchanger considerations for a gas turbine engine for an aircraft given its unique environments. The relationship between an acoustic length $L_i$ and a given operating condition of the engine is represented by an Operational Acoustic Reduction Ratio (OARR), as follows:

$$\left(\sin\left(\frac{2\times\pi\times f}{a}\times L_i\right)\right)^2$$

where f is the blade passing frequency at the operating condition in hertz, a is the speed of sound of the airflow through the heat transfer section of the heat exchanger in inches per second, and $L_i$ is the acoustic length of the heat transfer section of the heat exchanger in inches. The highest level of ETL for the targeted flight operating condition occurs when OARR is equal to 1. For a heat exchanger that has more than one heat transfer section and associated acoustic length, it was found that the influence on noise attenuation by the heat exchanger's other heat transfer sections having their own acoustic lengths (e.g., in the case of an onion heat exchanger) was minimal. As a consequence, it was concluded that the influence on downstream noise by the other heat transfer sections could be ignored.

For example, at the high power operating condition, the blade passing frequency f may be greater than or equal to 600 hertz and less than or equal to 12,500 hertz. Notably, the blade passing frequency may refer to a blade passing frequency of the primary fan of the engine (e.g., fan 152 in FIG. 12). Noise generated by a plurality of blades operating above this speed range may not be audible by humans and thus is of less concern. The speed of sound, c, at the various operating conditions and at various locations within the engine is provided in Table 9, below. Notably, in practice, the actual speed of sound may vary from the values listed in Table 9. However, the values listed in Table 9 for the respective operating conditions and respective locations represent expected conditions for the disclosed subject matter in which the engines and heat exchangers may operate. For the purposes of determining OARR for a heat exchanger that can achieve the benefits described herein, the speed of sound, a, may be considered a constant having the values listed in Table 9.

TABLE 9

| | High Power Operating Condition | Low Power Operating Condition | Medium Power Operating Condition |
|---|---|---|---|
| $a_{Amb}$ | 13,200 inches per second (hereinafter, $a_{1,Amb}$) | 12,900 inches per second (hereinafter, $a_{2,Amb}$) | 11,640 inches per second (hereinafter, $a_{3,Amb}$) |
| $a_{Hot}$ | 25,360 inches per second (hereinafter, $a_{1,Hot}$) | 24,756 inches per second (hereinafter, $a_{2,Hot}$) | 30,924 inches per second (hereinafter, $a_{3,Hot}$) |
| $a_{Cold}$ | 24,528 inches per second (hereinafter, $a_{1,Cold}$) | 19,824 inches per second hereinafter, $a_{2,Cold}$) | 22,440 inches per second (hereinafter, $a_{3,Cold}$) |

As will be appreciated, the speed of sound of the airflow through the heat transfer section of the heat exchanger is dependent at least in part on a location in which the heat exchanger is positioned within the engine. For example, the heat exchanger may be positioned at an ambient location, within a cold location of the engine, or within a hot location of the engine. The ambient location, having a speed of sound represented by "$a_{Amb}$" in Table 9 (and more specifically by $a_{1,Amb}$, $a_{2,Amb}$, $a_{3,Amb}$ for the high power, low power, and medium power operating conditions) refers to an engine location for a heat exchanger where the heat exchanger is exposed to ambient airflow or bypass airflow (e.g., an airflow over fan cowl 370 in FIG. 12). The hot location, having a speed of sound represented by "$a_{Hot}$" in Table 3 (and more specifically by $a_{1,Hot}$, $a_{2,Hot}$, $a_{3,Hot}$ for the high power, low power, and medium power operating conditions) refers to an engine location for a heat exchanger where the heat exchanger is exposed to an airflow through a working gas flowpath of the engine at a location downstream of a combustion section of the engine (e.g., within an exhaust section of the engine). The cold location, having a speed of sound represented by "$a_{Cold}$" in Table 3 (and more specifically by $a_{1,Cold}$, $a_{2,Cold}$, $a_{3,Cold}$ for the high power, low power, and medium power operating conditions) refers to an engine location for a heat exchanger where the heat exchanger is exposed to an airflow inward of a bypass passage of the engine and upstream of a combustion section of the engine (e.g., within a compressor section of the engine, or within a third stream (such as fan duct 172 of FIG. 12) of an engine).

The speed of sound of the airflow through the heat transfer section of the heat exchanger is further dependent at least in part on the operating temperature of the engine and the altitude of the engine. The variations in Table 3 in the different operating conditions, i.e., the high power, low power, and medium power operating conditions, accounts for these variables.

For example, referring back to FIG. 21, the first heat transfer section may be tuned to attenuate noise through the annular duct during the high power operating condition. As such, OARR may be greater than or equal to 0.75 during the high power operating condition. In particular, OARR may be greater than or equal to 0.85, such as greater than or equal to 0.9, such as greater than or equal to 0.95.

Notably, OARR may vary between 0 and 1. When the heat transfer section is perfectly tuned to attenuate noise at the operating condition, OARR is equal to 1. And when the heat transfer section is perfectly de-tuned from attenuating noise at the operating condition, OARR approaches 0. Accordingly, it will be appreciated that length $L_i$ of the heat transfer section may be chosen such that OARR may be maximized over the expected range of blade passing frequencies for the high power operating condition.

By contrast, however, it will be appreciated that the length $L_i$ of the first heat transfer section would be de-tuned for the other operating conditions, such as during a second operating condition. For example, the engine may be operable at a low power operating condition, wherein the blade passing frequency is greater than or equal to 300 hertz and less than or equal to 6,300 hertz. OARR for the heat transfer section having the length $L_i$ may be less than or equal to 0.25 when the engine is operated at the low power operating condition.

In such a manner, it will be appreciated that the heat transfer section of the heat exchanger may be tuned for noise attenuation at the first operating condition (e.g., high power operating condition) and de-tuned from attenuating noise at the second operating condition (e.g., low power operating condition). Such may allow the engine to target noise attenuation, e.g., at a takeoff operating condition to reduce community noise. In particular, with such a configuration the heat exchanger may be capable of achieving a desired ETL at the first operating condition.

An example of a heat exchanger having only one heat transfer section or acoustic length, for purposes of ETL and OARR, would be the heat exchanger of FIG. 15 where the acoustic length is the length of the heat exchanger in the flow direction, and the cross-sectional area change (relative to the upstream duct) is the cross sectional area that is approximately unchanged from inlet to outlet of the heat exchanger.

Notably, at least certain heat exchangers include multiple heat transfer sections (see, e.g., FIG. 21), with the different heat transfer sections tuned to different operating conditions. With such a configuration, the heat transfer section discussed above may be a first heat transfer section and the acoustic length $L_i$ discussed above may be a first acoustic length ($L_{i,1}$). The heat exchanger may further include a second heat transfer section defining a second acoustic length ($L_{i,2}$). The second heat transfer section may define an OARR greater than or equal to 0.75 during a second operating condition, different than the first operating condition, as follows:

$$\left(\sin\left(\frac{2\times\pi\times f_2}{a_2}\times L_{i,2}\right)\right)^2$$

where $f_2$ is the blade passing frequency at the second operating condition, $L_{i,2}$ is the second acoustic length, as noted above, and $a_2$ is the speed of sound at the second operating condition. The second operating condition may be a low power operating condition, wherein the blade passing frequency is greater than or equal to 300 hertz and less than or equal to 6,300 hertz.

The OARR for the second heat transfer section during the second operating condition may be greater than or equal to 0.85, such as greater than or equal to 0.9, such as greater than or equal to 0.95.

With such a configuration, the heat exchanger may be capable of achieving a higher desired ETL for both the first operating condition and the second operating condition.

Notably, in still other exemplary embodiments, the heat exchanger may include a third heat transfer section tuned to a third operating condition. The third heat transfer section may define an OARR greater than or equal to 0.75 during the third operating condition, different than the first and second operating conditions, as follows:

$$\left(\sin\left(\frac{2\times\pi\times f_3}{a_3}\times L_{i,3}\right)\right)^2$$

where $f_3$ is the blade passing frequency at the third operating condition, $L_{i,3}$ is the third acoustic length, as noted above, and $a_3$ is the speed of sound at the third operating condition. The third operating condition may be a medium power operating condition, wherein the blade passing frequency is greater than the blade passing frequency at the second operating condition and less than the blade passing frequency at the first operating condition, such as greater than or equal to 500 hertz and less than or equal to 12,500 hertz.

With such a configuration, the heat exchanger may be capable of achieving a desired ETL at the first, second, and third operating conditions.

As will be appreciated from the description herein, embodiments of a gas turbine engine, such as an unducted, single rotor gas turbine engine, are provided. Some embodiments of engines that include a heat exchanger located in an annular duct and considered within the scope of this disclosure, may further include one or more of the following characteristics. A threshold power or disk loading for the fan (e.g., fan 354) may range from 25 horsepower per square foot (hp/$ft^2$) or greater at cruise altitude during a cruise operating mode. In particular embodiments of the engine, structures and methods provided herein generate power loading between 80 hp/$ft^2$ and 160 hp/$ft^2$ or higher at cruise altitude during a cruise operating mode. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degrees Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

Further, in certain exemplary embodiments, the fan assembly may define a rotor diameter (or fan diameter) of at least 10 feet, such as at least 11 feet, such as at least 12 feet, such as at least 13 feet, such as at least 15 feet, such as at least 17 feet, such as up to 28 feet, such as up to 26 feet, such as up to 24 feet, such as up to 18 feet. Additionally, with respect to the embodiment of FIG. 12, a ratio R1/R2 may be between about 1 and 6, or 2 and 4, or about 1.5 to 3 where R1 is the span from root to tip for fan blade 354 and R2 is the span from root to tip for fan 384 in FIG. 12.

It should be appreciated that various embodiments of the engine, such as the single unducted rotor engine depicted and described herein, may allow for normal subsonic aircraft cruise altitude operation at or above Mach 0.5. In certain embodiments, the engine allows for normal aircraft operation between Mach 0.55 and Mach 0.85 at cruise altitude. In still particular embodiments, the engine allows for normal aircraft operation between Mach 0.75 and Mach 0.85. In certain embodiments, the engine allows for rotor blade tip speeds at or less than 750 feet per second (fps).

Still further, certain embodiments of the engine provided herein may allow for normal subsonic aircraft cruise altitude operation at or above Mach 0.5, or above Mach 0.75, based on structures provided herein. In certain embodiments, the engine allows for normal aircraft operation between Mach 0.55 and Mach 0.85, or between Mach 0.75 to Mach 0.85 at cruise altitude. In certain embodiments, the engine allows for rotor blade tip speeds at or less than 750 feet per second (fps). Still particular embodiments may provide such benefits with reduced interaction noise between the blade assembly and the vane assembly and/or decreased overall noise generated by the engine by virtue of structures located in an annular duct of the engine. Additionally, it should be appreciated that ranges of power loading and/or rotor blade tip speed may correspond to certain structures, core sizes, thrust outputs, etc., or other structures at the core engine and the fan assembly. However, as previously stated, to the extent one or more structures provided herein may be known in the art, it should be appreciated that the present disclosure may include combinations of structures not previously known to combine, at least for reasons based in part on conflicting benefits versus losses, desired modes of operation, or other forms of teaching away in the art.

Moreover, it will be appreciated that the exemplary heat exchangers described above are provided by way of example only. In other exemplary embodiments, a heat exchanger of the present disclosure may have other suitable configurations.

Figure 30:
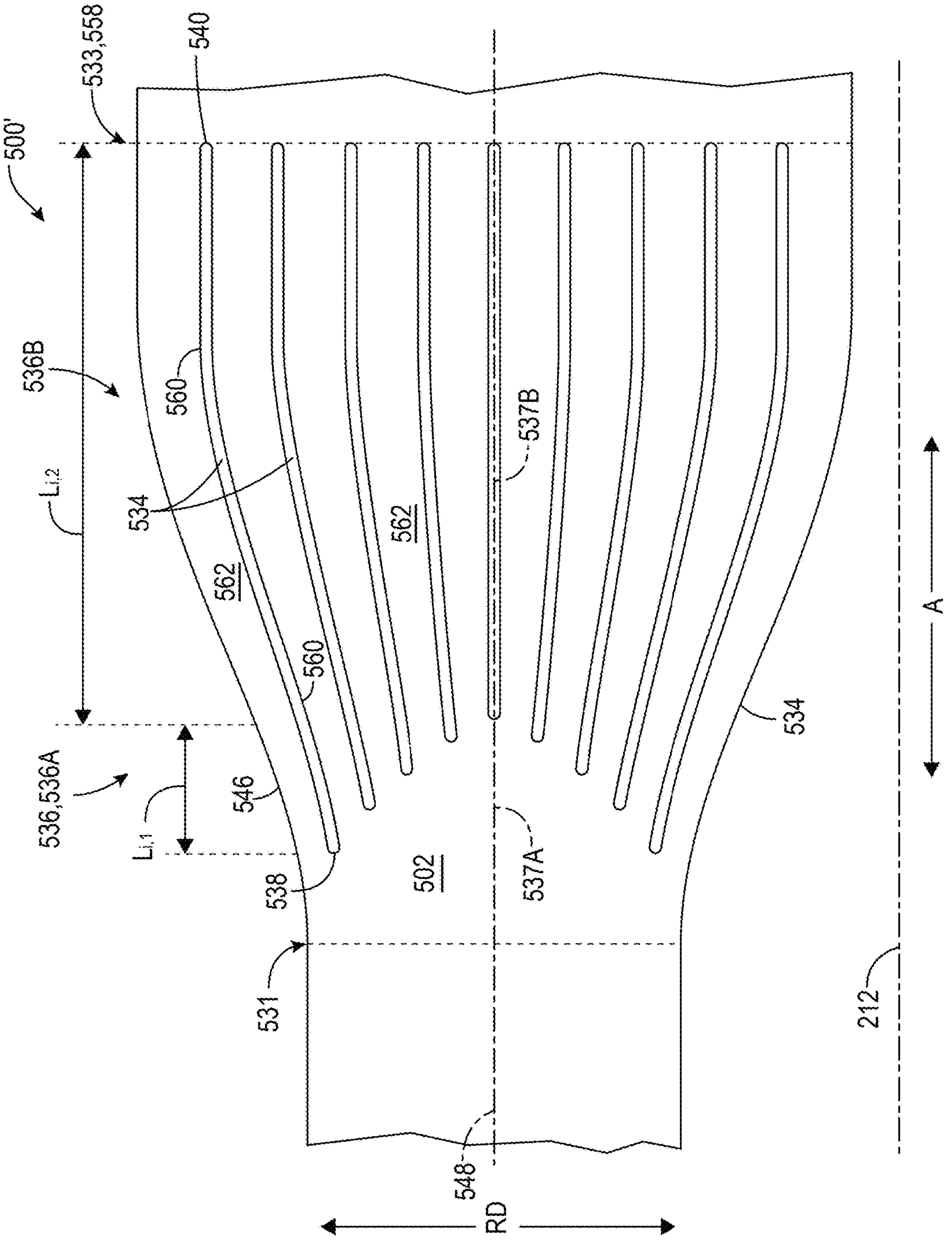
FIG. 30 is a schematic cross-sectional view of a heat exchanger in accordance with another exemplary embodiment of the present disclosure.

FIG. 30 illustrates an alternative heat exchanger 500', similar to the heat exchanger 500 described above with reference to FIG. 21. Elements of the heat exchanger 500' not specifically described may be taken to be identical to those of one or more of the heat exchangers 500, 500' described above. The heat exchanger 500' includes a pair of spaced-apart inner and outer peripheral walls 544 and 546, respectively, which between them define a flowpath 502 for a first fluid. The flowpath 502 has an inlet 531 at an upstream end, and an outlet 533 at a downstream end. A midline 548 represents an abstract surface that divides the flow-orthogonal area between the inner and outer peripheral walls 544 and 546 into two parts, which may have approximately equal flow areas. In the illustrated example, the heat exchanger 500' is a partially or wholly arcuate body formed by partial or complete revolution about an axis, for example the axial centerline 212.

The flowpath 502 includes a diverging portion downstream of the inlet 531. Within the diverging portion, the peripheral walls 544, 546 diverge so that they are laterally farther from the midline 548 then they are at the inlet 531. A location downstream of the inlet 531 where the peripheral walls reach their maximum dimension is referred to herein as a "belly" 558. In this embodiment, the belly 558 is coincident with the outlet 533.

A plurality of spaced-apart fins 534 are disposed in the flowpath 502. Each of the fins 534 has opposed side walls 560 extending between an upstream end 538 and a downstream end 540. The fins 534 subdivide the flowpath 502 into a plurality of generally parallel flow passages 562.

The aerodynamic features of the heat exchanger 500', such as the equal diffusion ratios and/or rates of the flow passages 562, shaping of the fins 534 to act as turning vanes, and staggering of the fins 534, may be implemented as described for the heat exchanger 500 described above with reference to FIG. 21. The operation and functional advantages of the heat exchanger 500' are substantially the same as for the heat exchanger 500, with the exception that flow is not re-accelerated prior to the outlet 533.

Figure 31:
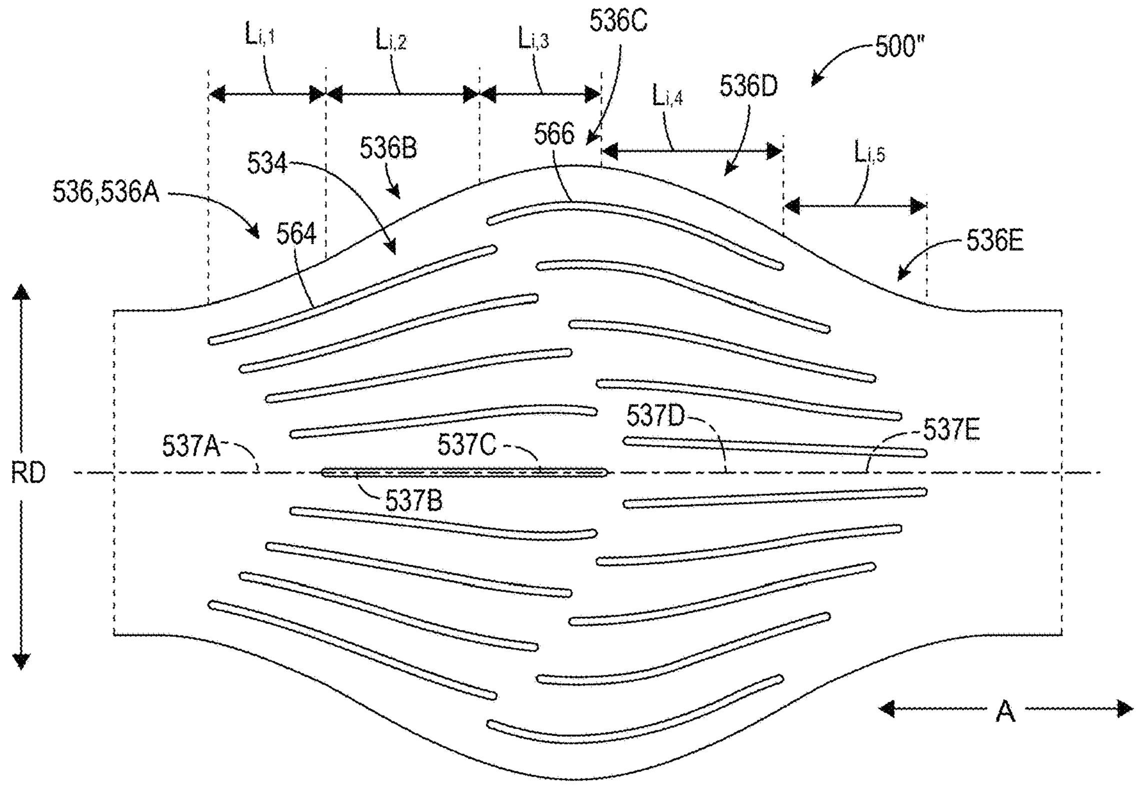
FIG. 31 is a schematic cross-sectional view of a heat exchanger in accordance with yet another exemplary embodiment of the present disclosure.

Further, it will be appreciated that other fin configurations are possible. For example, FIG. 31 illustrates a heat exchanger 500" having fins 534 which are split, each fin 534 having an upstream portion 564 and a separate downstream portion 566.

Figure 32:
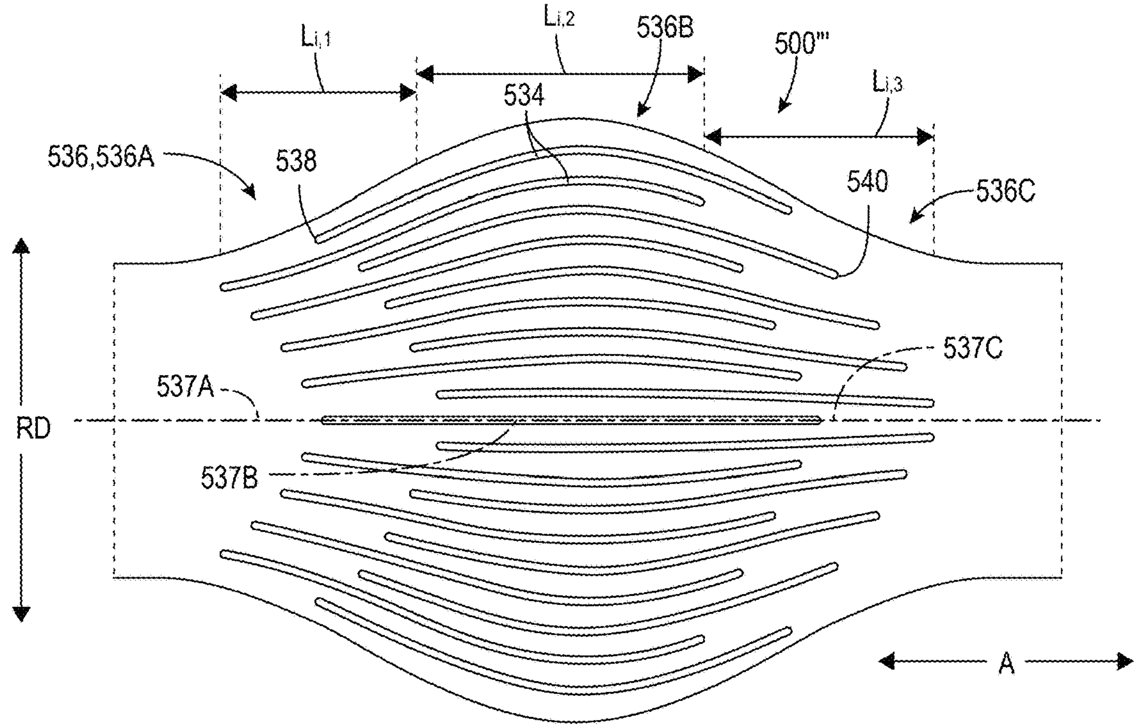
FIG. 32 is a schematic cross-sectional view of a heat exchanger in accordance with still another exemplary embodiment of the present disclosure.

As another example, FIG. 32 illustrates a heat exchanger 500'" having fins 534 which are overlapped in an axial direction A. The term "overlapped in the axial direction A" in this context refers to a configuration in which alternate fins 534 are offset axially from each other in opposite directions, such that the middle portions of adjacent fins 534 are coextensive in the axial direction A, and each fin 534 includes a forward portion extending axially forward of an upstream end 538 of the adjacent fin 534, or an aft portion extending axially aft of a downstream end 540 of the adjacent fin 534.

Figure 33:
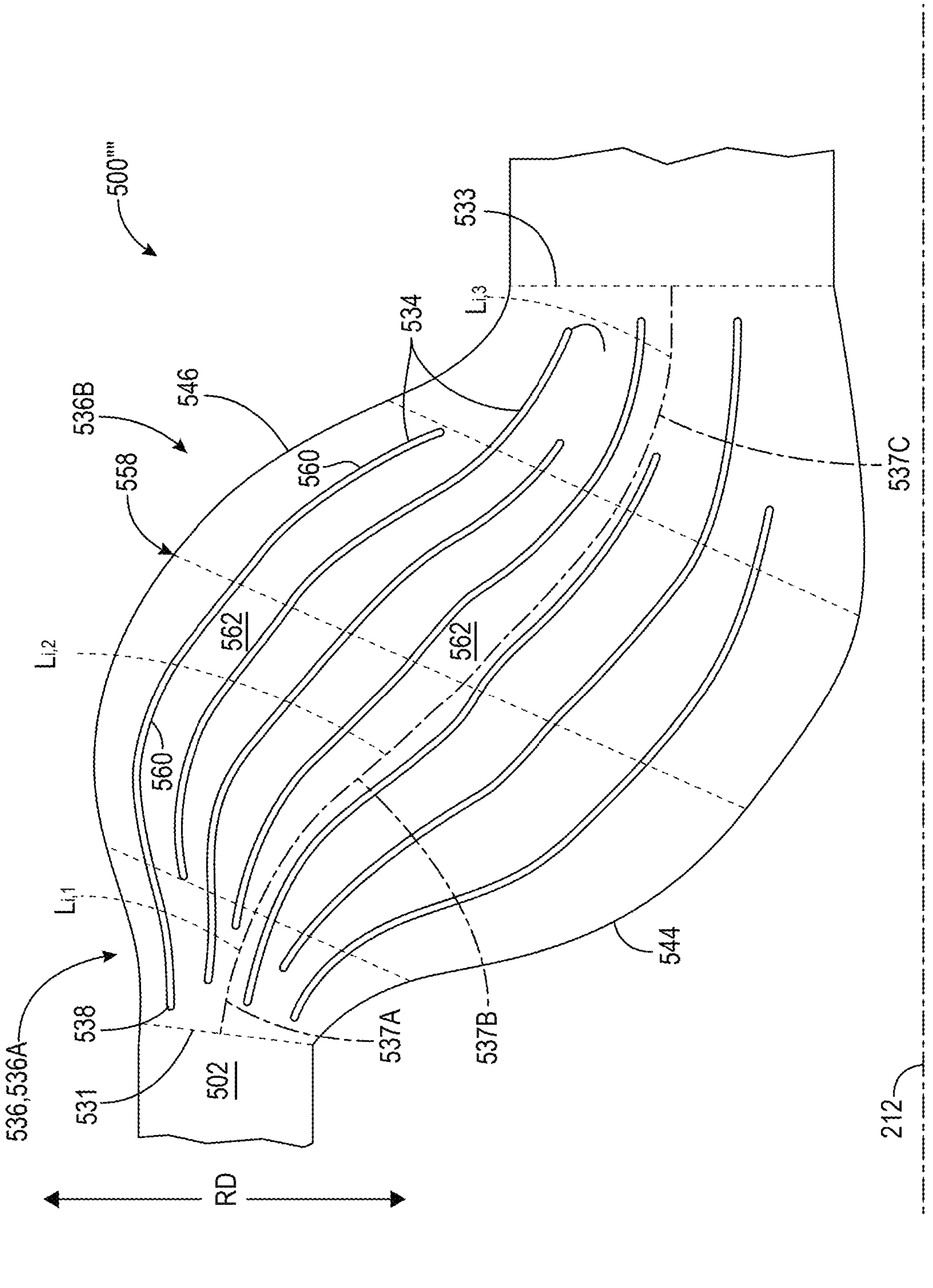
FIG. 33 is a schematic cross-sectional view of a heat exchanger in accordance with yet another exemplary embodiment of the present disclosure.

FIG. 33 illustrates an alternative heat exchanger 500"", similar to the heat exchangers 500, 500', 500", 500'" described above. Elements of the heat exchanger 500"" not specifically described may be taken to be identical to those of the heat exchanger 500 described above. The heat exchanger 500"" includes a pair of spaced-apart inner and outer peripheral walls 544 and 546, respectively, which between them define a flowpath 502 for a first fluid. The flowpath 502 has an inlet 531 at an upstream end, and an outlet 533 at a downstream end. In the illustrated example, the heat exchanger 500"" is a partially or wholly arcuate body formed by partial or complete revolution about an axis, for example the axial centerline 212. A significant difference between the heat exchanger 500"" and the heat exchanger 500 is that the heat exchanger 500"" is not symmetrical about a midline.

The flowpath 502 includes a diverging portion downstream of the inlet 531. Within the diverging portion, the peripheral walls 544, 546 diverge so that they are laterally farther apart from each other than they are at the inlet 531. A location downstream of the inlet 531 where the peripheral walls reach their maximum dimension is referred to herein as a "belly" 558. In the illustrated example, the peripheral walls 544, 546 reconverge downstream of the belly 558, thus defining a nozzle, but as noted above, this feature is optional.

A plurality of spaced-apart fins 534 are disposed in the flowpath 502. Each of the fins 534 has opposed side walls 560 extending between an upstream end 538 and a downstream end 540. The fins 534 subdivide the flowpath 502 into a plurality of side-by-side flow passages 562.

The aerodynamic features of the heat exchanger 500"", such as the equal diffusion ratios and/or rates of the flow passages 562, shaping of the fins 534 to act as turning vanes, and staggering of the fins 534, may be implemented as described for the heat exchanger 500 described above. The operation and functional advantages of the heat exchanger 500"" are substantially the same as for the heat exchanger 500.

Referring collectively to FIGS. 30 through 33, each of the heat exchangers depicted includes a plurality of heat transfer sections 536. For example, the embodiment of FIG. 30 includes two heat transfer sections 536A, 536B, defining respective lengths $L_{i,1}$, $L_{i,2}$ (along respective centerlines 537A, 537B); the embodiment of FIG. 31 includes five heat transfer sections 536A, 536B, 536C, 536D, 536E, defining respective lengths $L_{i,1}$, $L_{i,2}$, $L_{i,3}$, $L_{i,4}$, $L_{i,5}$ (along respective centerlines 537A, 537B, 537C, 537D, 537E); the embodiment of FIG. 32 includes three heat transfer sections 536A, 536B, 536C, defining respective lengths $L_{i,1}$, $L_{i,2}$, $L_{i,3}$ (along respective centerlines 537A, 537B, 537C); and the embodiment of FIG. 33 also includes three heat transfer sections 536A, 536B, 536C, defining respective lengths $L_{i,1}$, $L_{i,2}$, $L_{i,3}$ (along respective centerlines 537A, 537B, 537C). Notably, however, the embodiment of FIG. 33 defines a mean flow direction that is non-parallel to a longitudinal axis 312 of the engine, and as such, the lengths $L_{i,1}$, $L_{i,2}$, $L_{i,3}$ are defined in a direction non-parallel to the longitudinal axis 312 of the engine.

In particular, for the embodiment of FIG. 33, the centerlines 537A, 537B, 537C are each curved as the flowpath 502 through the heat exchanger 500"" curves and the centerlines 537A, 537B, 537C are geometric centerlines of the respective heat transfer sections 536A, 536B, 536C. The lengths $L_{i,1}$, $L_{i,2}$, $L_{i,3}$ are equal to the lengths of the respective centerlines 537A, 537B, 537C.

Figure 34:
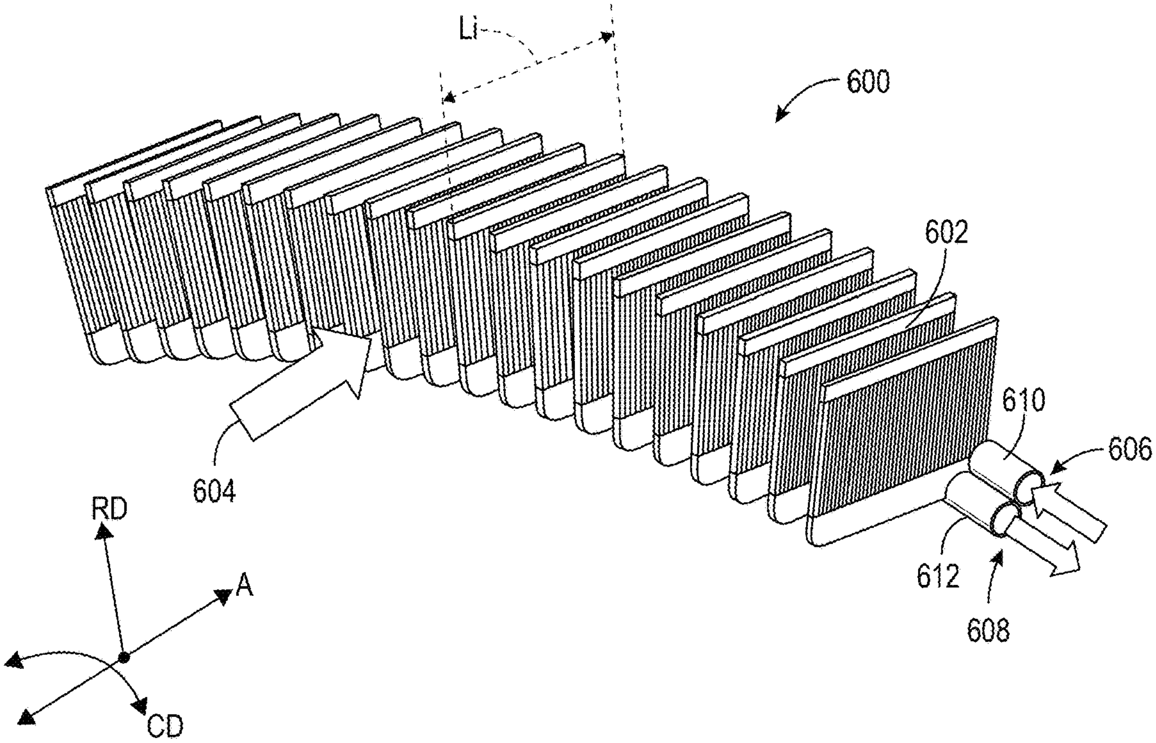
FIG. 34 is a perspective view of a heat exchanger in accordance with yet another exemplary embodiment of the present disclosure.
Figure 35:
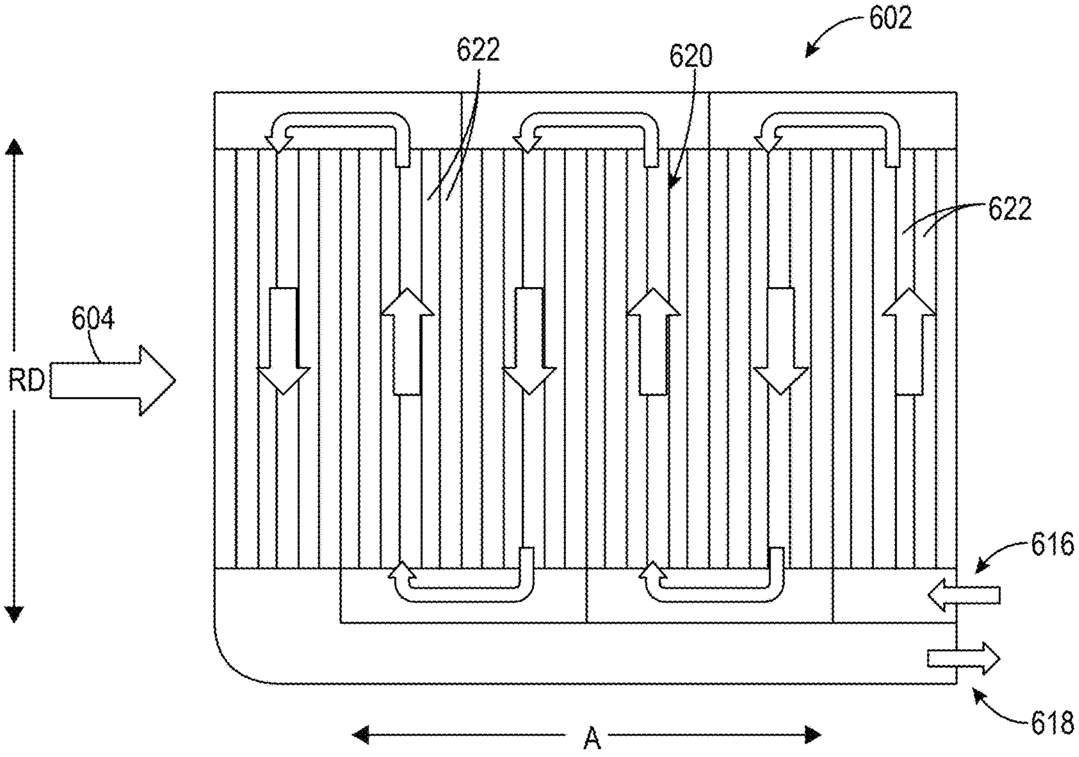
FIG. 35 is a cross-sectional view of a vane of the exemplary heat exchanger of FIG. 34.

Referring now to FIGS. 34 and 36, a heat exchanger 600 in accordance with another exemplary embodiment of the present disclosure is provided. FIG. 34 depicts a perspective view of a section of the heat exchanger 600 that may be positioned in a substantially annular duct, and FIG. 35 provides a cross-sectional view of a vane 602 of the heat exchanger 600 of FIG. 34. In certain exemplary embodiments, the heat exchanger 600 of FIGS. 35 and 36 may be incorporated into one or more substantially annular ducts or flowpaths of the present disclosure, such as into one or more of the substantially annular ducts or flowpaths of the engines 210, 300 of FIG. 12.

For example, heat exchanger 600 includes a plurality of vanes 602 arranged along a circumferential direction CD (FIG. 34), each extending along an axial direction A and a radial direction RD. The heat exchanger 600 is configured to transfer heat with a first fluid that flows over the vanes 602 (indicated at arrow 604), and defines a second fluid inlet 606 and a second fluid outlet 608 that provides a second fluid to/from a group of the vanes 602 of the heat exchanger 600 (e.g., to each of the vanes 602 shown in FIG. 34). The flow of the first fluid (arrow 604) is the flow of fluid through the substantially annular duct. Although not fully depicted, the heat exchanger 600 includes an inlet manifold 610 defining the second fluid inlet 606 and an outlet manifold 612 defining the second fluid outlet 608 (FIG. 34). The inlet manifold 610 and outlet manifold 612 may each extend in the circumferential direction CD and may each be in fluid communication with each of the vanes 602 of a section of the heat exchanger 600.

Further, referring specifically to FIG. 35, each vane 602 defines a vane fluid inlet 616 and a vane fluid outlet 618, along with a serpentine second fluid flowpath 620 between the vane fluid inlet 616 and the vane fluid outlet 618. The vane fluid inlet 616 is in fluid communication with the inlet manifold 610 for receiving the second fluid from the inlet manifold 610, and the vane fluid outlet 618 is in fluid communication with the outlet manifold 612 for providing the second fluid to the outlet manifold 612. The vane 602 further includes a plurality of channels 622 extending along the radial direction RD along the serpentine second fluid flowpath 620 so as to extend a length of the serpentine second fluid flowpath 620 through the vane 602 and increase a heat transfer with the first fluid.

Briefly, referring back specifically to FIG. 34, the heat exchanger 600 includes a single heat transfer section, and a length $L_i$ of the heat exchanger 600 is the length of the single heat transfer section.

Notably, in other exemplary embodiments, the heat exchanger 600 of FIGS. 34 and 35 may have other configurations, such as one or more of the configurations of FIGS. 1 to 12 and 13 to 14 in U.S. Pat. No. 10,443,436 (see exemplary heat exchanger 100 described throughout); of FIGS. 1 to 12 in U.S. Pat. No. 10,184,400 (see exemplary annular heat exchanger 12 described throughout); of FIGS. 1-3, 6-8, and 10 in U.S. Pat. No. 9,777,963 (see duct heat exchangers 60 FIG. 1 and described with respect thereto, segments 106 in FIGS. 2-3 and 6-8 and described with respect thereto, segment 800 in FIG. 10 and described with respect thereto), or combinations thereof. Each of the above patents is incorporated herein by reference fully for all purposes.

Further aspects of the disclosure are provided by the subject matter of the following clauses:

Clause 1: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

In the preceding clause, the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

In any of the preceding clauses, the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

In any of the preceding clauses, the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

In any of the preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

In any of the preceding clauses, the rotating blades diameter is between 8 to 16 feet or between 12 to 16 feet. In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

Clause 2: An aircraft is provided including a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein $0.065<RL/D<1.98$ and θ is between 187° and 340°, and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0,$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

In the preceding clause, 0.254<RL/D<1.86 and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0,\ \text{and}$$

$$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the two preceding clauses, 0.369<RL/D<1.43 and θ is between 204° and 291°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0\ \text{and}$$

$$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

In any of the three preceding clauses: 0.477<RL/D<0.9455 and θ is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0.$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

In any of the four preceding clauses, the unducted fan propulsor is undermounted to the airfoil, such as a wing, with one or more intermediate structures.

In any of the preceding clauses, the unducted fan propulsor has a cruise flight Mach $M_0$ of between 0.70 and 0.85, between 0.5 and 0.9, between 0.7 and 0.9, or between 0.75 and 0.9.

Clause 3: An aircraft is provided that includes a fuselage; an airfoil extending from the fuselage, the airfoil having an airfoil section with a leading edge (LE) and a trailing edge (TE), a chord extending between the LE and TE, and an effective quarter chord point (QC) along the chord measured from the LE; an unducted fan propulsor mounted relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and a positioning line (R) having a length (RL) and extending from the QC to the point P of the unducted fan propulsor and at an angle θ as measured from a vector from the QC to the TE of the airfoil section to the line R, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein RL/D≤2 and θ is between 187° and 342°.

In any of the preceding clauses, 0.15≤RL/D.

In any of the preceding clauses, 0.35≤RL/D, and preferably RL/D is about 0.72.

In any of the preceding clauses, wherein θ is between 198° and 310°, and preferably between 2050 and 285°.

In any of the preceding clauses, the unducted fan propulsor operates at a cruise flight Mach $M_0$ of between 0.5 and 0.9, preferably between 0.7 and 0.9, and more preferably between 0.75 and 0.9.

In any of the preceding clauses, the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

In any of the preceding clauses, the unducted fan propulsor is undermounted to the airfoil with one or more intermediate structures.

In any of the foregoing clauses, the P of the unducted fan propulsor is variable to accommodate different operating conditions.

In any of the preceding clauses, the aircraft includes a plurality of the unducted fan propulsors.

In the preceding clause, the plurality of the unducted fan propulsors may be each mounted to the same airfoil, such as a wing or horizontal stabilizer; or the plurality of the unducted fan propulsors may be each mounted to different airfoils, such as a wing or horizontal stabilizer; or combinations thereof.

In any of the preceding clauses, wherein the unducted propulsor has two arrays of blades and only one of the array of blades is rotating.

Clause 4: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of counterclockwise rotating blades arranged in a forward array and a plurality clockwise rotating blades arranged in a rearward array, wherein one of the forward and rearward array of blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 5: An aircraft is provided that includes a fuselage; an airfoil extending from the fuselage, the airfoil having an airfoil section and the airfoil section having an effective quarter chord point (QC), and a plurality of rotating blades defining a maximum outer diameter (D); a point (P) located at an intersection of the CL and a line perpendicular to the CL that passes through a midpoint between leading and trailing edges nearest the root of one of the plurality of blades, and an ellipse origin positioning line (EOR) having a length (EORL) extending from the QC to an ellipse origin (OR) and at an angle θ measured positive in a counter-clockwise direction when the high pressure side of the airfoil section is below the airfoil section, and measured positive in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

Clause 6: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein 0.065<RL/D<1.98 and θ is between 187° and 340°; and wherein RL/D and θ of the P of the unducted fan propulsor adhere to the following expressions:

$$\frac{RL}{D}\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0,$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0.$$

The aircraft of Clause 6, wherein: 0.254<RL/D<1.86 and θ is between 199° and 306°, and the P of the unducted fan propulsor is defined by the following expressions:

$$\frac{RL}{D}+\frac{\left(\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}>0,\text{ and}$$

$$\frac{RL}{D}+\frac{\left(-\sqrt{0.52621*\left[0.7205*\sin^2(\theta)-0.352*\cos^2(\theta)+0.7448*\sin(\theta)*\cos(\theta)\right]}+0.8476*\sin(\theta)+0.23119*\cos(\theta)\right)}{0.8649*\sin^2(\theta)+0.6084*\cos^2(\theta)}<0.$$

The aircraft of Clause 6, wherein: 0.369<RL/D<1.43 and θ is between 204° and 291°, and the P of the unducted fan propulsor is defined by the following expressions:

$$\frac{RL}{D}+\frac{\left(\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}>0,\text{ and}$$

$$\frac{RL}{D}+\frac{\left(-\sqrt{0.09923*\left[0.2964*\sin^2(\theta)-0.36*\cos^2(\theta)+0.66*\sin(\theta)*\cos(\theta)\right]}+0.3675*\sin(\theta)+0.0891*\cos(\theta)\right)}{0.49*\sin^2(\theta)+0.2025*\cos^2(\theta)}<0.$$

The aircraft of Clause 6, wherein: 0.477<RL/D<0.9455 and 6 is between 211° and 274°, and the P of the unducted fan propulsor is defined by the following expressions:

$$\frac{RL}{D}+\frac{\left(\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}>0,$$

and $$\frac{RL}{D}+\frac{\left(-\sqrt{0.01069156*\left[0.036*\sin^2(\theta)-0.3485*\cos^2(\theta)+0.5418*\sin(\theta)*\cos(\theta)\right]}+0.139167*\sin(\theta)+0.020812*\cos(\theta)\right)}{0.2209*\sin^2(\theta)+0.0484*\cos^2(\theta)}<0.$$

The aircraft of Clause 6, wherein the unducted fan propulsor is undermounted to the airfoil with one or more intermediate structures.

The aircraft of Clause 6, wherein the P of the unducted fan propulsor is variable to accommodate different operating conditions.

Clause 7: An aircraft is provided that includes a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a midpoint (TRL) between a rearward trailing edge nearest a root of a blade of the rearward array and a leading edge nearest a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section; wherein RL/D≤2 and θ is between 187° and 342°.

The aircraft of Clause 7, wherein 0.15≤RL/D.

The aircraft of Clause 7, wherein 0.35≤RL/D, and preferably RL/D is about 0.72.

The aircraft of Clause 7, wherein θ is between 198° and 310°, and preferably between 205° and 285°.

The aircraft of Clause 7, wherein the unducted fan propulsor operates at a cruise flight Mach $M_0$ of between 0.5 and 0.9, preferably between 0.7 and 0.9, and more preferably between 0.75 and 0.9.

The aircraft of Clause 7, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of Clause 7, wherein the unducted fan propulsor is undermounted to the airfoil with one or more intermediate structures.

The aircraft of Clause 7, wherein the P of the unducted fan propulsor is variable to accommodate different operating conditions.

Clause 8: A method of assembly, comprising: using an aircraft body comprising a fuselage and an airfoil extending from the fuselage, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at the intersection of the CL and a line HP perpendicular to the axial centerline CL that passes through the axial midpoint between a rearward trailing edge at a root of a blade of the rearward array and a forward leading edge at a root of a blade of the forward array when the forward leading edge and rearward trailing edge of the respective blades are aligned with each other; and a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position; wherein 0.07≤RL/D≤2.0 and θ is between 1870 and 342°.

The method of Clause 8, wherein 0.15≤RL/D.

The method of Clause 8, wherein 0.35≤RL/D, and preferably RL/D is about 0.72.

The method of Clause 8, wherein θ is between 198° and 310°, and preferably between 205° and 285°.

The method of Clause 8, wherein the unducted fan propulsor operates at a cruise flight Mach $M_0$ of between 0.5 and 0.9, preferably between 0.7 and 0.9, and more preferably between 0.75 and 0.9.

The method of Clause 8, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The method of Clause 8, wherein the unducted fan propulsor is undermounted to the airfoil with one or more intermediate structures.

The method of Clause 8, wherein the P of the unducted fan propulsor is variable to accommodate different operating conditions.

Clause 9: A method of assembly, comprising: using an aircraft body comprising a fuselage and an airfoil extending from the fuselage, the airfoil having an airfoil section with a leading edge (LE) and a trailing edge (TE), a chord extending between the LE and TE, and an effective quarter chord point (QC) along the chord measured from the LE, wherein the airfoil has an airfoil section defining an effective quarter chord point (QC); and attaching an unducted fan propulsor to the aircraft body relative to the airfoil section on a high pressure side thereof, the unducted fan propulsor having a centerline (CL) and a plurality of blades arranged in one or more arrays, each of the blades having a root and the plurality of blades defining a maximum outer diameter (D), the unducted fan propulsor having a point (P) defined as one of: (a) wherein the plurality of blades is arranged in a single array, the point P is located at an intersection of the CL and a line perpendicular to the CL that passes through a midpoint between edges at the root of one of the plurality of blades, and (b) wherein the plurality of blades is arranged in a forward array and a rearward array, the point P is located at an intersection of the CL and midpoint between a rearward trailing edge (TE) of the rearward array and leading edge (LE) of the forward array when a blade of the forward and rearward arrays are aligned with each other; and an ellipse origin positioning line (EOR) having a length (EORL) extending from the QC to an ellipse origin (OR) and at an angle θ as measured from a vector from the QC to the TE of the airfoil section to the line EOR, where, when viewed with the LE to the left of TE, a positive θ (1) increases in a counter-clockwise direction when the high pressure side of the airfoil section is below the airfoil section, and (2) increases in a clockwise direction when the high pressure side of the airfoil section is above the airfoil section, and wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7.

The method of Clause 9, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The method of Clause 9, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The method of Clause 9, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

Clause 10: An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°.

Clause 11: An aircraft comprising:

a fuselage;

a pair of horizontal stabilizers extending relative to the fuselage, two or more unducted fan propulsors, each of the unducted fan propulsors is mounted relative to one of the horizontal stabilizers on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; and an airfoil section having an effective quarter chord point QC;

a positioning line (R) having a length (RL) and extending from the QC to the point P of the unducted fan propulsor at an angle θ measured positive in a clockwise direction when the high pressure side of the airfoil section is above the airfoil section when viewed looking from an outboard position towards an inboard position of the wing; wherein 0.07≤RL/D≤2.0 and θ is between 187° and 342°.

In any of the preceding clauses, the unducted fan propulsor is undermounted to the airfoil, such as a wing, with one or more intermediate structures.

In any of the preceding clauses, the P of the unducted fan propulsor is variable to accommodate different operating conditions.

In any of the preceding clauses the drive mechanism may be a gas turbine engine and associated transmission to delivers torque from the drive mechanism to the propeller assembly.

In any of the preceding clauses, the unducted fan propulsor is incorporated into an airplane or other aircraft having a cruise flight Mach $M_0$ of between 0.70 and 0.85, between 0.75 and 0.85, between 0.75 and 0.79, between 0.5 and 0.9, between 0.7 and 0.9, or between 0.75 and 0.9.

In any of the preceding clauses, the unducted fan propulsors is connected to the wing (or horizontal stabilizer) through a pylon.

In any of the preceding clauses, the rotating blades diameter (D) may be between 8 to 16 feet or 12 to 16 feet.

In any of the preceding clauses, each of the propulsors including a drive mechanism comprising a gas turbine engine assembly comprising in serial order a compressor, combustor, high pressure turbine and power turbine.

In any of the preceding clauses, the propulsor having a pitch angle between −5 and +5 degrees, or −3 and 0 degrees.

In any of the preceding clauses, the propulsor having an inward toe angle of between 0 and 5 degrees, or 1 and 3 degrees.

In any of the preceding clauses, the rotating blades diameter is between 8 to 16 feet or between 12 to 16 feet.

In any of the preceding clauses, the aircraft having a wing defining the airfoil and one or two unducted fan propulsors are mounted to the wing.

In any of the preceding clauses, wherein the aircraft are aircraft types A, B, C or G as defined in Tables 1 and 2.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency ($f_1$) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.); wherein an effective transmission loss (ETL) for the heat exchanger positioned within the annular duct is between 5 decibels and 1 decibels for a high power operating condition, wherein ETL equals $$C_1 e^{-C_2\left(\frac{EOC-UA}{C_3}\right)};$$

wherein when the operating condition is the high power operating condition, $C_1$ equals 21.02, $C_2$ equals 0.027, $C_3$ equals 107, and EOC is between 50,347 and 12,587; wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

The gas turbine engine of one or more of these clauses, wherein $$\left(\sin\left(\frac{2\times\pi\times f_1}{a_1}\times L_i\right)\right)^2$$

is equal to 1.

The gas turbine engine of one or more of these clauses, wherein the heat transfer section defines a HX flow area ($A_{HX}$), wherein the annular duct defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2\times\pi\times f_2}{a_2}\times L_{i,2}\right)\right)^2$$

is greater than or equal to 0.75, and $a_2$ is equal to 12,900 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2\times\pi\times f_3}{a_3}\times L_{i,3}\right)\right)^2$$

is greater than or equal to 0.75, and $a_3$ is equal to 11,640 inches per second during the medium power operating condition.

The gas turbine engine of one or more of these clauses, wherein the third blade passing frequency ($f_3$) is greater than the second blade passing frequency ($f_2$) and less than the first blade passing frequency ($f_1$).

The gas turbine engine of one or more of these clauses, wherein when the operating condition is a low power operating condition, $C_1$ equals 19.22, $C_2$ equals 0.222, $C_3$ equals 956.3, and EOC is between 41,467 and 19,965.

The gas turbine engine of one or more of these clauses, wherein the gas turbine engine defines a mass flowrate through the heat exchanger during the low power operating condition less than or equal to 50 lbm/s, and wherein ETL equals:

$$19.22e^{-0.222\left(\frac{EOC-UA}{956.3}\right)};$$

wherein EOC is between 41,467 and 19,965.

The gas turbine engine of one or more of these clauses, wherein when the operating condition is a medium power operating condition, $C_1$ equals 19.64, $C_2$ equals 0.67, $C_3$ equals 298, and EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02e^{-0.027\left(\frac{EOC-UA}{107}\right)};$$

wherein EOC is between 50,347 and 12,587.

The gas turbine engine of one or more of these clauses, wherein the heat exchanger defines an overall length between 3 inches and 15 inches and a porosity between 20% and 80%.

The gas turbine engine of one or more of these clauses, wherein the overall length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the annular duct is a third stream defined by the turbomachine and including an inlet, wherein the compressor section comprises a fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein $$\left(\sin\left(\frac{2\times\pi\times f_1}{a_1}\times L_{i,2}\right)\right)^2$$

is less than or equal to 0.25.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine and operable at a first blade passing frequency ($f_1$) greater than or equal to 600 hertz and less than or equal to 12,500 hertz during a high power operating condition, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, wherein an effective transmission loss (ETL) for the heat exchanger positioned within the annular duct is between 5 decibels and 1 decibels for a high power operating condition, and wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

A method of operating a gas turbine engine gas turbine engine defining a centerline and a circumferential direction, the method comprising:

operating a rotor assembly of the gas turbine engine driven by a turbomachine gas turbine engine and at a first blade passing frequency ($f_1$) greater than or equal to 600 hertz and less than or equal to 12,500 hertz during a high power operating condition; the rotor assembly, the turbomachine, or both comprising a substantially annular duct relative to the centerline of the gas turbine engine, the substantially annular duct defining a flowpath;

operating a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.);

providing an effective transmission loss (ETL) for the heat exchanger positioned within the annular duct between 5 decibels and 1 decibels for the high power operating condition, wherein ETL equals $$C_1 e^{-C_2\left(\frac{EOC-UA}{C_3}\right)};$$

wherein when the operating condition is the high power operating condition, $C_1$ equals 21.02, $C_2$ equals 0.027, $C_3$ equals 107, and EOC is between 50,347 and 12,587; wherein the heat exchanger comprises a heat transfer section defining an acoustic length ($L_i$), and wherein an Operational Acoustic Reduction Ratio (OARR) is greater than or equal to 0.75 to achieve the ETL at the high power operating condition, the OARR equal to:

$$\left(\sin\left(\frac{2\times\pi\times f_1}{a_1}\times L_i\right)\right)^2$$

wherein $a_1$ is equal to 13,200 inches per second during the high power operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the substantially annular duct defining a flowpath; a heat exchanger positioned within the annular duct and extending substantially continuously along the circumferential direction, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.); wherein an effective transmission loss (ETL) for the heat exchanger positioned within the annular duct is between 5 decibels and 1 decibels for an operating condition, the operating condition being one of a low power operating condition, a medium power operating condition, or a high power operating condition, wherein ETL equals $$C_1 e^{-C_2\left(\frac{EOC-UA}{C_3}\right)};$$

wherein when the operating condition is the low power operating condition, C1 equals 19.22, C2 equals 0.222, C3 equals 956.3, and EOC is between 41,467 and 19,965; wherein when the operating condition is the medium power operating condition, C1 equals 19.64, C2 equals 0.67, C3 equals 298, and EOC is between 52,809 and 16,677; and wherein when the operating condition is the high power operating condition, C1 equals 21.02, C2 equals 0.027, C3 equals 107, and EOC is between 50,347 and 12,587.

The gas turbine engine of one or more of these clauses, wherein the heat exchanger defines a length between 3 inches and 15 inches and a porosity between 20% and 80%, wherein the gas turbine engine defines a blade passing frequency within the turbomachine, the rotor assembly, or both between 600 Hz and 12.5 Khz during the operating condition.

The gas turbine engine of one or more of these clauses, wherein the length of the heat exchanger is between 4 inches and 9 inches.

The gas turbine engine of one or more of these clauses, wherein the heat exchanger defines a pressure drop of 15% or less during operation of the gas turbine engine.

The gas turbine engine of one or more of these clauses, wherein the gas turbine engine defines a mass flowrate through the heat exchanger during the low power operating condition less than or equal to 50 lbm/s, and wherein ETL equals:

$$19.22e^{-0.222\left(\frac{EOC-UA}{956.3}\right)};$$

wherein EOC is between 41,467 and 19,965.

The gas turbine engine of one or more of these clauses, wherein the gas turbine engine defines a mass flowrate through the heat exchanger during the medium power operating condition greater than or equal to 50 pound mass per second (lbm/s) and less than or equal to 150 lbm/s, and wherein ETL equals:

$$19.64e^{-0.67\left(\frac{EOC-UA}{298}\right)};$$

wherein EOC is between 52,809 and 16,677.

The gas turbine engine of one or more of these clauses, wherein the gas turbine engine defines a mass flowrate through the heat exchanger during the high power operating condition greater than or equal to 150 pound mass per second (lbm/s) and less than or equal to 300 lbm/s, and wherein ETL equals:

$$21.02e^{-0.027\left(\frac{EOC-UA}{107}\right)};$$

wherein EOC is between 50,347 and 12,587.

The gas turbine engine of one or more of these clauses, wherein the annular duct is a third stream defined by the turbomachine and including an inlet, wherein the compressor section comprises a fan located upstream of the inlet of the third stream, wherein the gas turbine engine defines a blade passing frequency within the turbomachine, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the single stage of rotor blades defines a blade diameter greater than or equal to 10 feet and less than or equal to 28 feet, optionally less than 18 feet, optionally less than 15 feet.

The gas turbine engine of one or more of these clauses, wherein the heat exchanger has one of the following architectures: fin-based, pin-fin, tube, tube-shell, tube-sheet, counter-flow, or a combination thereof.

The gas turbine engine of one or more of these clauses, wherein the heat exchanger extends substantially continuously within the flowpath.

The gas turbine engine of one or more of these clauses, wherein the flowpath is a turbomachine flowpath, and wherein the duct is positioned at least in part in the compressor section, the combustion section, the turbine section, or a combination thereof.

The gas turbine engine of one or more of these clauses, wherein the heat exchanger is a waste heat recovery heat exchanger.

The gas turbine engine of one or more of these clauses, wherein the rotor assembly defines a blade passing frequency between 600 Hz and 12.5 Khz during the operating condition, and wherein the heat exchanger is located downstream of the rotor assembly.

The gas turbine engine of one or more of these clauses, wherein the gas turbine engine defines a blade passing frequency within the turbomachine between 600 Hz and 12.5 Khz during the operating condition, and wherein the heat exchanger is located within the turbomachine.

The gas turbine engine of one or more of these clauses, wherein the heat exchanger has the ETL of between 5 decibels and 1 decibel during the operating condition.

A gas turbine engine defining a centerline and a circumferential direction, the gas turbine engine comprising: a turbomachine comprising a compressor section, a combustion section, and a turbine section arranged in serial flow order; a rotor assembly driven by the turbomachine, the rotor assembly, the turbomachine, or both comprising a substantially annular duct relative to the centerline of the gas turbine engine, the annular duct defining a flowpath; a heat exchanger positioned within the annular duct and extending substantially continuously along the circumferential direction, the heat exchanger defining a length between 3 inches and 15 inches and a porosity between 20% and 80%, the heat exchanger comprising a first material defining a heat exchange surface exposed to the flowpath, wherein the first material defines a heat exchange coefficient and wherein the heat exchange surface defines a surface area (A), wherein a product of the heat exchange coefficient and the surface area, UA, is between 7500 British thermal units per hour per degrees Fahrenheit (Btu/(hr-° F.)) and 45000 Btu/(hr-° F.), wherein the gas turbine engine defines a blade passing frequency within the turbomachine, the rotor assembly, or both between 600 kHz and 12.5 Khz during an operating condition, and wherein the heat exchanger has an effective transmission loss (ETL) of between 5 decibels and 1 decibel for the operating condition.

The gas turbine engine of one or more of these clauses, wherein ETL equals:

$$C_1e^{-C_2\left(\frac{X-UA}{C_3}\right)};$$

wherein when the operating condition is a low power operating condition, C1 equals 19.22, C2 equals 0.222, C3 equals 956.3, and EOC is between 41,467 and 19,965; wherein when the operating condition is a medium power operating condition, C1 equals 19.64, C2 equals 0.67, C3 equals 298, and EOC is between 52,809 and 16,677; and wherein when the operating condition is a high power operating condition, C1 equals 21.02, C2 equals 0.027, $C_3$ equals 107, and EOC is between 50,347 and 12,587.

The gas turbine engine of one or more of these clauses, wherein UA is greater than 7500 Btu/(hr-° F.) and less than 45000 Btu/(hr-° F.), such as greater than 10000 Btu/(hr-° F.) and less than 35000 Btu/(hr-° F.) when the operating condition is a low power operating condition, such as greater than 14000 Btu/(hr-° F.) and less than 5000 Btu/(hr-° F.) when the operating condition is a medium power operating condition, or greater than 15000 Btu/(hr-° F.) and less than 44000 Btu/(hr-° F.) when the operating condition is a high power operating condition.

The gas turbine engine of one or more of these clauses, wherein the pressure drop is less than 15%, such as less than 10%, such as less than 8%, such as greater than 1%.

The gas turbine engine of one or more of these clauses, wherein the pressure drop is less than or equal to about 5%, such as less than or equal to about 2.5% when the operating condition is a low power operating condition.

The gas turbine engine of one or more of these clauses, wherein the pressure drop is less than or equal to about 15% when the operating condition is a medium power operating condition.

The gas turbine engine of one or more of these clauses, wherein the pressure drop is less than or equal to about 15%, wherein the ETL is between 1 and 3 dB, and wherein the operating condition is a high power operating condition.

The gas turbine engine of one or more of these clauses, wherein the length of the heat exchanger is between 3 inches and 15 inches, such as between 4 inches and 9 inches.

The gas turbine engine of one or more of these clauses, wherein the porosity of the heat exchanger is 20% to 80%, such as 30% to 55%.

A gas turbine engine defining a centerline, a radial direction, and a circumferential direction, the gas turbine engine comprising: a turbomachine comprising a compressor section, a combustion section, and a turbine section arranged in serial flow order; a rotor assembly driven by or incorporated into the turbomachine and operable at a blade passing frequency (f) greater than or equal to 300 hertz and less than or equal to 12,500 hertz during an operating condition, the gas turbine engine comprising a substantially annular duct relative to the centerline, the substantially annular duct defining a flowpath and a duct height along the radial direction; and a heat exchanger positioned within the substantially annular duct and extending substantially continuously along the circumferential direction, the heat exchanger defining a heat exchanger height equal to at least 10% of the duct height; wherein an effective transmission loss (ETL) for the heat exchanger positioned within the substantially annular duct is between 5 decibels and 1 decibels for the operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2$$

wherein a is greater than or equal to 11,600 inches per second and less than or equal to 30,924 inches per second during the operating condition.

The gas turbine engine of one or more of these clauses, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein a is a first speed of sound $a_1$ greater than or equal to 13,200 inches per second and less than or equal to 25,360 inches per second during the high power operating condition, and wherein OARR is equal to:

$$\left(\sin\left(\frac{2\times\pi\times f_1}{a_1}\times L_i\right)\right)^2.$$

The gas turbine engine of one or more of these clauses, wherein the heat exchanger is positioned in a cold location of the gas turbine engine, and wherein $a_1$ is $a_{1,Cold}$ and is equal to 24,528 inches per second.

The gas turbine engine of one or more of these clauses, wherein the rotor assembly is operable at a second blade passing frequency ($f_2$) during a low power operating condition, wherein the heat transfer section is a first heat transfer section and the acoustic length is a first acoustic length, wherein the heat exchanger further comprises a second heat transfer section defining a second acoustic length ($L_{i,2}$), wherein $$\left(\sin\left(\frac{2\times\pi\times f_2}{a_2}\times L_{i,2}\right)\right)^2$$

is greater than or equal to 0.75, and $a_2$ is greater than or equal to 12,900 inches per second and less than or equal to 24,756 inches per second during the low power operating condition.

The gas turbine engine of one or more of these clauses, wherein the second blade passing frequency ($f_2$) is greater than or equal to 300 hertz and less than or equal to 6,300 hertz.

The gas turbine engine of one or more of these clauses, wherein the rotor assembly is operable at a third blade passing frequency ($f_3$) during a medium power operating condition, wherein the heat exchanger further comprises a third heat transfer section defining a third acoustic length ($L_{i,3}$), wherein $$\left(\sin\left(\frac{2\times\pi\times f_3}{a_3}\times L_{i,3}\right)\right)^2$$

is greater than or equal to 0.75, and $a_3$ is greater than or equal to 11,640 inches per second and less than or equal to 30,924 inches per second during the medium power operating condition.

The gas turbine engine of one or more of these clauses, wherein the third blade passing frequency ($f_3$) is greater than or equal to 500 hertz and less than or equal to 12,500 hertz, wherein the third blade passing frequency ($f_3$) is greater than the second blade passing frequency ($f_2$) and less than the first blade passing frequency ($f_1$).

The gas turbine engine of one or more of these clauses, wherein $$\left(\sin\left(\frac{2\times\pi\times f}{a}\times L_i\right)\right)^2$$

is equal to 1.

The gas turbine engine of one or more of these clauses, wherein the heat transfer section defines a HX flow area ($A_{HX}$), wherein the substantially annular defines a duct flow area ($A_d$) upstream of the heat exchanger, and wherein a ratio of the HX flow area ($A_{HX}$) to the duct flow area ($A_d$) is greater than 1.

The gas turbine engine of one or more of these clauses, wherein the substantially annular duct comprises spaced-apart peripheral walls extending between an inlet and an outlet and defining a flowpath, wherein the flowpath includes a diverging portion downstream of the inlet, in which a flow area is greater than a flow area at the inlet, and wherein the heat exchanger comprises: a plurality of spaced-apart fins disposed in the flowpath, each of the fins having opposed side walls extending between an upstream leading edge and a downstream trailing edge, wherein the fins divide at least the diverging portion of the flowpath into a plurality of side-by-side flow passages; and a heat transfer structure disposed within at least one of the fins.

The gas turbine engine of one or more of these clauses, wherein the leading edges of the fins are staggered relative to a direction of flow through the flowpath such that a flow area blockage attributable to frontal area of the fins is offset by a corresponding increase of flow area in the flowpath within the divergent portion.

The gas turbine engine of one or more of these clauses, wherein the peripheral walls define a belly downstream of the inlet at which a flow area of the flowpath is at a maximum, and wherein the flowpath includes a converging portion downstream of the diverging portion.

The gas turbine engine of one or more of these clauses, wherein the peripheral walls and the fins are configured such that a total open flow area between the peripheral walls continuously increases from the inlet to the belly.

The gas turbine engine of one or more of these clauses, wherein a flow area of each of flow passages increases in a downstream direction, and the flow passages have equal diffusion rates.

The gas turbine engine of one or more of these clauses, wherein the fins are configured to turn a flow passing through the flowpath in at least one plane.

The gas turbine engine of one or more of these clauses, wherein the heat exchanger defines an overall length between 3 inches and 15 inches and a porosity between 20% and 80%.

The gas turbine engine of one or more of these clauses, wherein the heat exchanger defines a pressure drop of 15% or less during operation of the gas turbine engine.

The gas turbine engine of one or more of these clauses, wherein the substantially annular duct is a third stream defined by the turbomachine and including an inlet, wherein the compressor section comprises a mid-fan located upstream of the inlet of the third stream, wherein the blade passing frequency is of the mid-fan, and wherein the heat exchanger is positioned within the third stream.

The gas turbine engine of one or more of these clauses, wherein the rotor assembly of the gas turbine engine is configured as an unducted rotor assembly comprising a single stage of rotor blades.

The gas turbine engine of one or more of these clauses, wherein the blade passing frequency (f) greater than or equal to 2,500 hertz and less than or equal to 5,000 hertz during the operating condition, wherein the operating condition is a high power operating condition, and wherein a is equal to 13,200 inches per second during the high power operating condition.

An aircraft comprising: a fuselage; a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial mid-point between a rearward trailing edge at a root of a blade of the rearward array and a forward leading edge at a root of a blade of the forward array when the forward leading edge and rearward trailing edge of the respective blades are aligned with each other; an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°; wherein the unducted fan propulsor comprises a substantially annular duct relative to its center-line (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2,$$

wherein a is greater than or equal to 11,600 inches per second and less than or equal to 30,924 inches per second during the operating condition.

The aircraft of claim 1, wherein the substantially annular duct defines a flowpath and a duct height along a radial direction of the unducted fan propulsor, the heat exchanger defining a heat exchanger height equal to at least 10% of the duct height.

The aircraft of claim 1, wherein the unducted fan propulsor comprises a turbomachine and a rotor assembly driven by or incorporated into the turbomachine and operable at a blade passing frequency (f) greater than or equal to 300 hertz and less than or equal to 12,500 hertz during the operating condition.

The aircraft of claim 3, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein a is a first speed of sound $a_1$ greater than or equal to 13,200 inches per second and less than or equal to 25,360 inches per second during the high power operating condition, and wherein OARR is equal to:

$$\left(\sin\left(\frac{2\times\pi\times f_1}{a_1}\times L_i\right)\right)^2.$$

The aircraft of claim 4, wherein the heat exchanger is positioned in a cold location of the unducted fan propulsor, and wherein $a_1$ is $a_{1,Cold}$ and is equal to 24,528 inches per second.

The aircraft of claim 3, wherein the heat transfer section defines a HX flow area ($A_{HX}$), wherein the substantially annular defines a duct flow area ($A_d$) upstream of the heat exchanger, and wherein a ratio of the HX flow area ($A_{HX}$) to the duct flow area ($A_d$) is greater than 1.

The aircraft of claim 1, wherein the substantially annular duct comprises spaced-apart peripheral walls extending between an inlet and an outlet and defining a flowpath, wherein the flowpath includes a diverging portion downstream of the inlet, in which a flow area is greater than a flow area at the inlet, and wherein the heat exchanger comprises: a plurality of spaced-apart fins disposed in the flowpath, each of the fins having opposed side walls extending between an upstream leading edge and a downstream trailing edge, wherein the fins divide at least the diverging portion of the flowpath into a plurality of side-by-side flow passages; and a heat transfer structure disposed within at least one of the fins The aircraft of claim 1, wherein 0.15≤RL/D.

The aircraft of claim 1, wherein 0.35≤RL/D.

The aircraft of claim 1, wherein RL/D is about 0.72.

The aircraft of claim 1, wherein θ is between 198° and 310°, and preferably between 205° and 285°.

The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

The aircraft of claim 1, wherein the unducted fan propulsor is undermounted to the airfoil with one or more intermediate structures.

The aircraft of claim 1, wherein the P of the unducted fan propulsor is variable to accommodate different operating conditions.

An aircraft, comprising: a fuselage; an airfoil extending from the fuselage, the airfoil having an airfoil section defining an effective quarter chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein the unducted fan propulsor comprises a substantially annular duct relative to its centerline (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2,$$

wherein a is greater than or equal to 11,600 inches per second and less than or equal to 30,924 inches per second during the operating condition.

The aircraft of Claim 16, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

The aircraft of Claim 16, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

The aircraft of Claim 16, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

An aircraft, comprising: a fuselage; an airfoil extending from the fuselage, the airfoil having an airfoil section defining an effective quarter-chord point (QC); an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D); a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other; a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D}+\frac{\left(\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}>0$$

and $$\frac{RL}{D}+\frac{\left(-\sqrt{1.4161*\left[1.88978*\sin^2(\theta)-0.0875*\cos^2(\theta)+0.477*\sin(\theta)*\cos(\theta)\right]}+1.764*\sin(\theta)+0.19146*\cos(\theta)\right)}{1.96*\sin^2(\theta)+0.7225*\cos^2(\theta)}<0;$$

and wherein the unducted fan propulsor comprises a substantially annular duct relative to its centerline (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition; wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2,$$

wherein a is greater than or equal to 11,600 inches per second and less than or equal to 30,924 inches per second during the operating condition.

The invention claimed is:

1. An aircraft comprising:

a fuselage;

a pair of wings extending from the fuselage, two or more unducted fan propulsors, each of the unducted fan propulsors is mounted relative to one of the wings on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an airfoil section having an effective quarter chord point QC; and a positioning line (R) having a length (RL) and extending from the QC to the point P of the unducted fan propulsor at an angle θ measured positive in a counter-clockwise direction when the high pressure side of the airfoil section is below the airfoil section when viewed looking from an outboard position towards an inboard position of the wing; wherein 0.07≤RL/D≤2.0 and θ is between 187° and 342°;

wherein the unducted fan propulsor comprises a substantially annular duct relative to its centerline (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition;

wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2,$$

wherein a is greater than or equal to 11,600 inches per second and less than or equal to 30,924 inches per second during the operating condition.

2. The aircraft of claim 1, wherein the substantially annular duct defines a flowpath and a duct height along a radial direction of the unducted fan propulsor, the heat exchanger defining a heat exchanger height equal to at least 10% of the duct height.

3. The aircraft of claim 1, wherein the unducted fan propulsor comprises a turbomachine and a rotor assembly driven by or incorporated into the turbomachine and operable at a blade passing frequency (f) greater than or equal to 300 hertz and less than or equal to 12,500 hertz during the operating condition.

4. The aircraft of claim 3, wherein the operating condition is a high power operating condition, wherein the blade passing frequency (f) is a first blade passing frequency ($f_1$) greater than or equal to 600 hertz and less than or equal to 12,500 hertz during the high power operating condition, and wherein a is a first speed of sound $a_1$ greater than or equal to 13,200 inches per second and less than or equal to 25,360 inches per second during the high power operating condition, and wherein OARR is equal to:

$$\left(\sin\left(\frac{2\times\pi\times f_1}{a_1}\times L_i\right)\right)^2.$$

5. The aircraft of claim 4, wherein the heat exchanger is positioned in a cold location of the unducted fan propulsor, and wherein $a_1$ is $a_{1,Cold}$ and is equal to 24,528 inches per second.

6. The aircraft of claim 3, wherein the heat transfer section defines a HX flow area ($A_{HX}$), wherein the substantially annular defines a duct flow area ($A_d$) upstream of the heat exchanger, and wherein a ratio of the HX flow area ($A_{HX}$) to the duct flow area ($A_d$) is greater than 1.

7. The aircraft of claim 1, wherein the substantially annular duct comprises spaced-apart peripheral walls extending between an inlet and an outlet and defining a flowpath, wherein the flowpath includes a diverging portion downstream of the inlet, in which a flow area is greater than a flow area at the inlet, and wherein the heat exchanger comprises:

a plurality of spaced-apart fins disposed in the flowpath, each of the fins having opposed side walls extending between an upstream leading edge and a downstream trailing edge, wherein the fins divide at least the diverging portion of the flowpath into a plurality of side-by-side flow passages; and a heat transfer structure disposed within at least one of the fins.

8. The aircraft of claim 1, wherein 0.15≤RL/D.

9. The aircraft of claim 1, wherein 0.35≤RL/D.

10. The aircraft of claim 1, wherein RL/D is about 0.72.

11. The aircraft of claim 1, wherein θ is between 198° and 310°, and preferably between 205° and 285°.

12. The aircraft of claim 1, wherein the two or more unducted fan propulsors are configured to operate at a cruise flight Mach $M_0$ of between 0.7 and 0.9, and more preferably between 0.75 and 0.9; or the two or more unducted fan propulsors are configured to propel the aircraft at a cruise flight Mach $M_0$ of between 0.7 and 0.9, and more preferably between 0.75 and 0.85.

13. The aircraft of claim 1, wherein the unducted fan propulsor has a dimensionless cruise fan net thrust parameter expressed as follows:

$$0.15 > \frac{F_{net}}{\rho_0 A_{an} V_0^2} > 0.06,$$

wherein $F_{net}$ is cruise fan net thrust, $\rho_0$ is ambient air density, $V_o$ is cruise flight velocity, and $A_{an}$ is annular cross-sectional area perpendicular to an axis of rotation of a rotor axis of rotation.

14. The aircraft of claim 1, wherein the unducted fan propulsor is undermounted to the airfoil with one or more intermediate structures.

15. The aircraft of claim 1, wherein the P of the unducted fan propulsor is variable to accommodate different operating conditions.

16. An aircraft, comprising:

a fuselage;

an airfoil extending from the fuselage, the airfoil having an airfoil section defining an effective quarter chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein only one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

an ellipse origin positioning line (EOR) having a length (EORL) extending from the QC to an ellipse origin (OR) at an angle θ measured positive in a counter-clockwise direction when the high pressure side of the airfoil section is below the airfoil section, and measured positive in a clockwise direction when the high pressure side of the airfoil section is above the airfoil section, when viewed looking for an outboard position towards an inboard position; wherein the P of the unducted fan propulsor is located within a first ellipse having a first major axis length (1MajAL) and a first minor axis length (1MinAL) with a first ellipse origin defined by EORL/D of 0.938 and θ of 253.6°, and where 1MajAL/D is 2.8 and 1MinAL/D is 1.7; and wherein the unducted fan propulsor comprises a substantially annular duct relative to its centerline (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition;

wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2\times\pi\times f}{a}\times L_i\right)\right)^2,$$

wherein a is greater than or equal to 11,600 inches per second and less than or equal to 30,924 inches per second during the operating condition.

17. The aircraft of claim 16, wherein the P of the unducted fan propulsor is located in a second ellipse having a second major axis length (2MajAL) and a second minor axis length (2MinAL) with a second ellipse origin defined by EORL/D of 1.051 and θ of 248.8°, and where 2MajAL/D is 1.86 and 2MinAL/D is 1.56.

18. The aircraft of claim 16, wherein the P of the unducted fan propulsor is located in a third ellipse having a third major axis length (3MajAL) and a third minor axis length (3MinAL) with a third ellipse origin defined by EORL/D of 0.870 and θ of 239.6°, where 3MajAL/D is 1.4 and 3MinAL/D is 0.9.

19. The aircraft of claim 16, wherein the P of the unducted fan propulsor is located in a fourth ellipse having a fourth major axis length (4MajAL) and a fourth minor axis length (4MinAL) with a fourth ellipse origin defined by EORL/D of 0.763 and θ of 235.7°, and where 4MajAL/D is 0.94 and 4MinAL/D is 0.44.

20. An aircraft, comprising:

a fuselage;

an airfoil extending from the fuselage, the airfoil having an airfoil section defining an effective quarter-chord point (QC);

an unducted fan propulsor mounted relative to the airfoil section on a high pressure side thereof, the unducted fan propulsor having a centerline (CL), a plurality of blades arranged in a forward array and a plurality of blades arranged in a rearward array, wherein one of the forward and rearward array of blades are rotating blades and the rotating blades define a maximum outer diameter (D);

a point (P) located at an intersection of the CL and a line HP perpendicular to the CL that passes through an axial midpoint between a rearward trailing edge at a root of a blade of the rearward array and a forward leading edge at a root of a blade of the forward array when the forward leading edge and rearward trailing edge of the respective blades are aligned with each other;

a positioning line (R) having a length (RL) and extending from the QC to the point P of the unducted fan propulsor at an angle θ measured positive in a counter-clockwise direction when the high pressure side of the airfoil section is below the airfoil section, and measured positive in a clockwise direction when the high pressure side of the airfoil section is above the airfoil section, when viewed looking from an outboard position towards an inboard position (e.g. the fuselage) OR when viewed with the LE to the left of the TE; wherein 0.065<RL/D<1.98 and θ is between 187° and 340°; and wherein RL/D and θ of the P of the unducted fan propulsor adhere to the following expressions:

$$\frac{RL}{D} + \frac{\left(\sqrt{1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} > 0,$$

and $$\frac{RL}{D} + \frac{\left(-\sqrt{1.4161 * \left[1.88978 * \sin^2(\theta) - 0.0875 * \cos^2(\theta) + 0.477 * \sin(\theta) * \cos(\theta)\right]} + 1.764 * \sin(\theta) + 0.19146 * \cos(\theta)\right)}{1.96 * \sin^2(\theta) + 0.7225 * \cos^2(\theta)} < 0;$$

and wherein the unducted fan propulsor comprises a substantially annular duct relative to its centerline (CL) and comprising a heat exchanger positioned within the substantially annular duct and extending substantially continuously along the circumferential direction, wherein the heat exchanger achieves an effective transmission loss (ETL) between 5 decibels and 1 decibels during an operating condition;

wherein the heat exchanger comprises a heat transfer section defining an acoustic length ($L_i$), and wherein an Operational Acoustic Reduction Ratio (OARR) is greater than or equal to 0.75 to achieve the ETL at the operating condition, the OARR equal to:

$$\left(\sin\left(\frac{2 \times \pi \times f}{a} \times L_i\right)\right)^2,$$

wherein a is greater than or equal to 11,600 inches per second and less than or equal to 30,924 inches per second during the operating condition.

* * * * *